US009849789B2

(12) United States Patent
Tomura et al.

(10) Patent No.: US 9,849,789 B2
(45) Date of Patent: Dec. 26, 2017

(54) POWER SUPPLY SYSTEM

(71) Applicants: KABUSHIKI KAISHA TOYOTA CHUO KENKYUSHO, Nagakute-shi, Aichi-ken (JP); TOYOTA JIDOSHA KABUSHIKI KAISHA, Toyota-shi, Aichi-ken (JP)

(72) Inventors: Shuji Tomura, Nagoya (JP); Masanori Ishigaki, Nagakute (JP); Naoki Yanagizawa, Nagakute (JP); Masaki Okamura, Toyota (JP)

(73) Assignees: KABUSHIKI KAISHA TOYOTA CHUO KENKYUSHO, Nagakute-shi (JP); TOYOTA JIDOSHA KABUSHIKI KAISHA, Toyota (JP)

(*) Notice: Subject to any disclaimer, the term of this patent is extended or adjusted under 35 U.S.C. 154(b) by 302 days.

(21) Appl. No.: 14/766,546

(22) PCT Filed: Mar. 27, 2014

(86) PCT No.: PCT/JP2014/058726
§ 371 (c)(1),
(2) Date: Aug. 7, 2015

(87) PCT Pub. No.: WO2014/157442
PCT Pub. Date: Oct. 2, 2014

(65) Prior Publication Data
US 2016/0001660 A1 Jan. 7, 2016

(30) Foreign Application Priority Data
Mar. 28, 2013 (JP) ................................. 2013-069410

(51) Int. Cl.
B60L 11/02 (2006.01)
H02J 1/00 (2006.01)
(Continued)

(52) U.S. Cl.
CPC ........... *B60L 11/02* (2013.01); *B60L 11/1859* (2013.01); *B60L 11/1861* (2013.01);
(Continued)

(58) Field of Classification Search
CPC .................................. B60L 11/02; H02J 1/00
(Continued)

(56) References Cited

U.S. PATENT DOCUMENTS

| 2013/0134786 A1 | 5/2013 | Ishigaki et al. |
| 2013/0187473 A1* | 7/2013 | Deboy .................... H02M 7/49 307/82 |
| 2014/0145694 A1 | 5/2014 | Ishigaki et al. |

FOREIGN PATENT DOCUMENTS

| JP | H07-240212 A | 9/1995 |
| JP | 2004-199911 A | 7/2004 |

(Continued)

OTHER PUBLICATIONS

Jun. 3, 2016 Office Action issued in German Patent Application No. 11 2014 001 669.1.

*Primary Examiner* — Jared Fureman
*Assistant Examiner* — Win Htun
(74) *Attorney, Agent, or Firm* — Oliff PLC

(57) ABSTRACT

An operation mode selection unit selects an efficiency priority mode for minimizing the overall loss in a power supply system based on a load request voltage obtained in accordance with the condition of a load and on the conditions of DC power supplies, and generates a mode selection signal in accordance with the selection result. When SOC and/or output power have/has reached power supply restriction values in any DC power supply, an operation mode modification unit generates a final mode selection instructing signal so as to modify selection of the efficiency priority mode by the mode selection signal to select an operation
(Continued)

mode in which power distribution between the DC power supplies can be controlled.

17 Claims, 34 Drawing Sheets

(51) Int. Cl.
  *H02J 7/00* (2006.01)
  *H02J 7/34* (2006.01)
  *B60L 11/18* (2006.01)
  *H02M 3/158* (2006.01)

(52) U.S. Cl.
  CPC ............ B60L 11/1868 (2013.01); H02J 1/00 (2013.01); H02J 7/0029 (2013.01); H02J 7/34 (2013.01); *B60L 2210/10* (2013.01); *B60L 2240/527* (2013.01); *B60L 2240/545* (2013.01); *B60L 2240/547* (2013.01); *B60L 2240/549* (2013.01); *H02M 3/1582* (2013.01); *Y02T 10/7005* (2013.01); *Y02T 10/7044* (2013.01); *Y02T 10/7066* (2013.01); *Y02T 10/7216* (2013.01)

(58) Field of Classification Search
  USPC ......................................................... 307/10.1
  See application file for complete search history.

(56) References Cited

FOREIGN PATENT DOCUMENTS

| | | |
|---|---|---|
| JP | 2008-067525 A | 3/2008 |
| JP | 2009-171819 A | 7/2009 |
| JP | 2009-207328 A | 9/2009 |
| JP | 2009-262671 A | 11/2009 |
| JP | 2010-057288 A | 3/2010 |
| JP | 2012-070514 A | 4/2012 |
| JP | 2013-013234 A | 1/2013 |
| WO | 2013/001989 A1 | 1/2013 |

* cited by examiner

| OPERATION MODE | USED POWER SUPPLY | OUTPUT VOLTAGE | S1 | S2 | S3 | S4 |
|---|---|---|---|---|---|---|
| PB | 10a AND 10b (IN PARALLEL) | VH→VH* | PWM CONTROL | | | |
| SB | 10a AND 10b (IN SERIES) | VH→VH* | PWM CONTROL | | | |
| aB | ONLY 10a | VH→VH* | PWM CONTROL | | | |
| bB | ONLY 10b | VH→VH* | PWM CONTROL | | | |
| PD | 10a AND 10b | VH=Va=Vb | ON | ON | OFF | ON |
| SD | 10a AND 10b | VH=Va+Vb | ON | OFF | ON | OFF |
| aD | ONLY 10a | VH=Va (Va>Vb) | ON | ON | OFF | OFF |
| bD | ONLY 10b | VH=Vb (Vb>Va) | ON | OFF | OFF | ON |

| | CALCULATION EXPRESSION |
|---|---|
| SG1 | /SDa or /SDb |
| SG2 | /SDa or SDb |
| SG3 | SDa or SDb |
| SG4 | SDa or /SDb |

| | CALCULATION EXPRESSION |
|---|---|
| SG1 | /SDc |
| SG2 | SDc |
| SG3 | FIXED AT H |
| SG4 | SDc |

| OPERATION MODE | POWER DISTRIBUTION RATIO k | VH SETTABLE RANGE |
|---|---|---|
| PB | CONTROLLABLE | $max(Va,Vb) \sim VHmax$ |
| SB | $\dfrac{Va}{Va+Vb}$ | $Va+Vb \sim VHmax$ |
| aB | 1.0 | $max(Va,Vb) \sim VHmax$ |
| bB | 0 | $max(Va,Vb) \sim VHmax$ |
| PD | $\dfrac{Rb}{Ra+Rb}$ | $=Va(=Vb)$ |
| SD | $\dfrac{Va}{Va+Vb}$ | $=Va+Vb$ |
| aD | 1.0 | $=Va$ |
| bD | 0 | $=Vb$ |

| VOLTAGE RANGE | VR1 | VR2 | VR3 |
|---|---|---|---|
| APPLICABLE OPERATION MODE GROUP | aD,bD,PD<br>(Va>Vb→ONLY aD)<br>(Vb>Va→ONLY bD) | aB<br>bB<br>PB<br>SD | PB<br>SB<br>aB<br>bB |
| MD1 | PD<br>(Va=Vb) | TOTAL LOSS EVALUATION (FIG. 19) | SB OR TOTAL LOSS EVALUATION (FIG. 50) |

| VOLTAGE RANGE | MD1 | MD* |
|---|---|---|
| VR1 | aD,bD,PD | → PB |
| VR2 | aB,bB | → PB |
| | SD | → PB |
| VR3 | SB | → PB |

FIG.32

| OPERATING CONDITION | CONDITION OF DC POWER SUPPLY 10a — CONDITION OF DC POWER SUPPLY 10b | WAVEFORMS OF I(L1) AND I(L2) | REDUCTION OF TURN-ON LOSS | REDUCTION OF TURN-OFF LOSS | REDUCTION OF CONDUCTION LOSS | REDUCTION OF CONDUCTION LOSS |
|---|---|---|---|---|---|---|
| A | POWERING – POWERING | | S2 AT Tb | S4 AT Tb | S4 IN Ta–Tb | S2 IN Tb–Tc |
| B | REGENERATIVE – REGENERATIVE | | S4 AT Tb | S2 AT Tb | S2 IN Ta–Tb | S4 IN Tb–Tc |
| C | REGENERATIVE – POWERING | | S3 AT Ta | S1 AT Ta | S1 IN Ta–Tb | S3 IN Tc–Ta |
| D | POWERING – REGENERATIVE | | S1 AT Tc | S3 AT Tc | S1 IN Tb–Tc | S3 IN Tc–Ta |

|  | PB MODE | SB MODE |
|---|---|---|
| SG1 | /SDa or /SDb | /SDc→/SDa or /SDb |
| SG2 | /SDa or SDb | SDc→SDa and SDb |
| SG3 | SDa or SDb | FIXED AT H→SDa or SDb |
| SG4 | SDa or /SDb | SDc→SDa and SDb |

| MODE | k | Pr | CURRENT FB CONTROL | S1~S4 |
|---|---|---|---|---|
| PB | 0≤k≤1.0 | FREE | BOTH OF Ia, Ib | FIG. 10 |
| aB | 1.0 | 0 | ONLY Ia | S1,S2 /SDa<br>S3,S4   SDa |
| bB | 0 | 0 | ONLY Ib | S1,S4 /SDb<br>S2,S3   SDb |
| SB | Va/(Va+Vb) | 0 | ONLY ONE OF Ia AND Ib | FIG. 37 |

FIG. 46

| MODE | USED POWER SUPPLY | OUTPUT VOLTAGE | CURRENT FB CONTROL | k | Pr | S5 | S6 | S7 | S8 |
|---|---|---|---|---|---|---|---|---|---|
| PB | 10a AND 10b (IN PARALLEL) | VH→VH* | BOTH OF Ia, Ib | 0≤k≤1.0 | FREE | SDa | /SDa | SDb | /SDb |
| aB | ONLY 10a | VH→VH* | ONLY Ia | 1.0 | 0 | SDa | /SDa | OFF | OFF |
| bB | ONLY 10b | VH→VH* | ONLY Ib | 0 | 0 | OFF | OFF | SDb | /SDb |
| PD | 10a AND 10b (IN PARALLEL) | VH=Va=Vb | — | — | 0 | ON | OFF | ON | OFF |
| aD | ONLY 10a | VH=Va(>Vb) | — | — | 0 | ON | OFF | OFF | OFF |
| bD | ONLY 10b | VH=Vb(>Va) | — | — | 0 | OFF | OFF | ON | OFF |

| VOLTAGE RANGE | VR1 | VR2 |
|---|---|---|
| APPLICABLE MODE | aD,bD,PD<br>(Va>Vb→ONLY aD)<br>(Vb>Va→ONLY bD) | aB<br>bB<br>PB |
| MD1 | PD<br>(Va=Vb) | LOSS EVALUATION |

| VOLTAGE RANGE | MD1 | MD* |
|---|---|---|
| VR1 | aD,bD | → PB |
| VR2 | aB,bB | → PB |

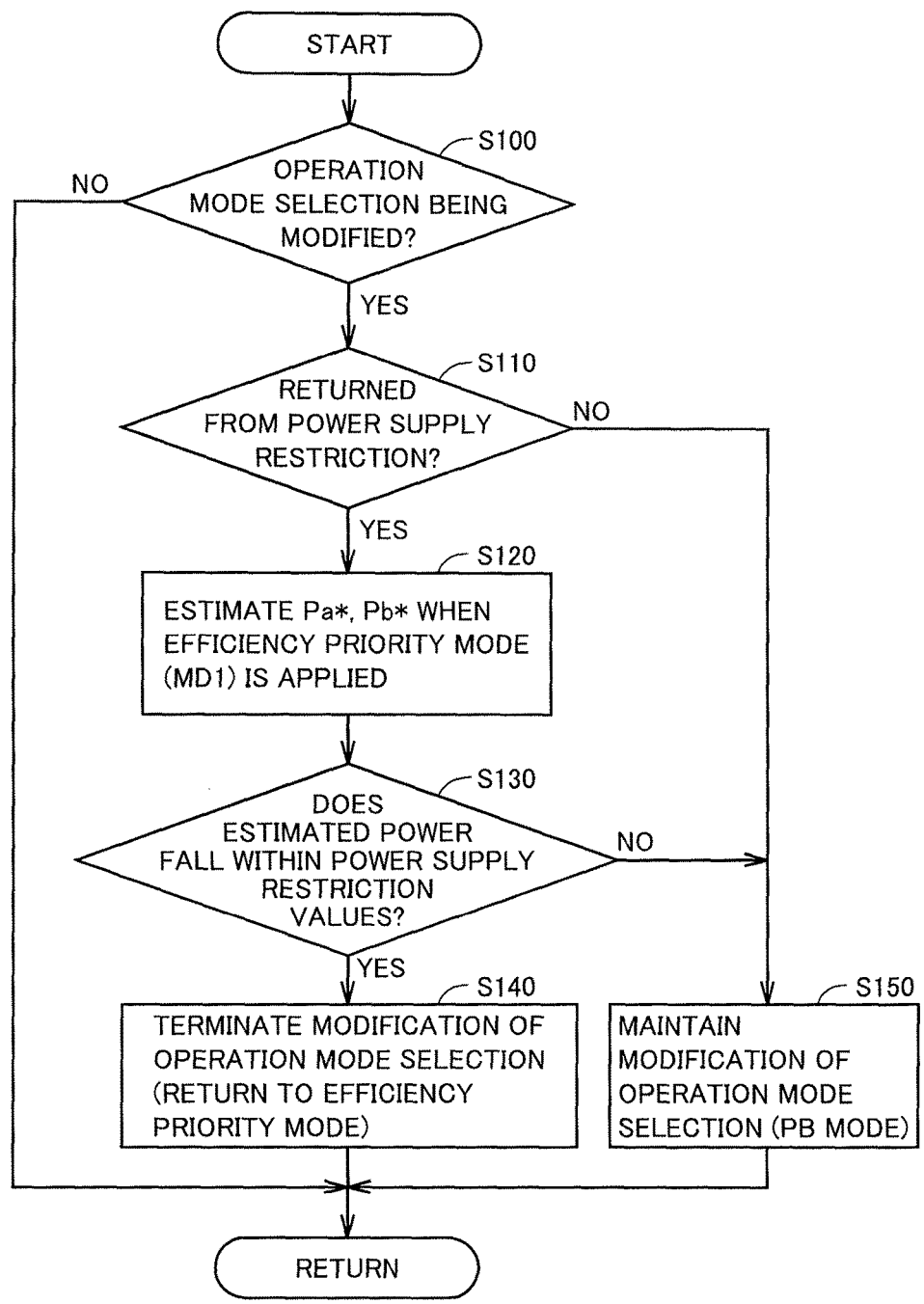

POWER SUPPLY SYSTEM

TECHNICAL FIELD

The present invention relates to a power supply system, and more particularly to control of a power supply system configured to include a power converter connected across a plurality of DC power supplies and an electric power line shared by the plurality of DC power supplies.

BACKGROUND ART

Japanese Patent Laying-Open Nos. 7-240212 (PTD 1) and 2004-199911 (PTD 2) each describe a hybrid power supply system in which a plurality of power supplies are combined to supply power to a load using a power converter connected across the plurality of power supplies and the load. PTD 1 describes that, in the hybrid power supply device in which a fuel cell and a secondary battery are combined, properties of overall efficiency of the system with respect to a fuel cell output are previously calculated, and the output of the fuel cell is instructed to charge the secondary battery such that a range where system overall efficiency is high is selected depending on the remaining power of the secondary battery.

PTD 2 describes that, in a fuel cell system having a secondary battery, control for increasing efficiency in a specific control mode in which a fuel cell is disconnected from a hybrid power supply system is achieved by connecting the secondary battery and a load without a switching operation in the control mode.

Japanese Patent Laying-Open No. 2012-70514 (PTD 3) describes a configuration of a power converter capable of, by means of control of a plurality of switching elements, switching between an operation mode of carrying out DC/DC conversion with two DC power supplies connected in series (series connection mode) and an operation mode of carrying out DC/DC conversion with two DC power supplies used in parallel (parallel connection mode).

CITATION LIST

Patent Document

PTD 1: Japanese Patent Laying-Open No. 7-240212
PTD 2: Japanese Patent Laying-Open No. 2004-199911
PTD 3: Japanese Patent Laying-Open No. 2012-70514

SUMMARY OF INVENTION

Technical Problem

PTD 3 describes that the power converter has a plurality of operation modes, but fails to describe in detail specific processing for selecting these operation modes. PTD 1 and PTD 2 each describe control intended to cause the whole system to operate with high efficiency, but fail to particularly refer to the relation between selection of operation mode and increase in efficiency under the condition where a plurality of operation modes are selectable. Moreover, in a system including a plurality of power supplies, it is also important to pay attention to protection from overpower so as to prevent overcharge and overdischarge of each power supply.

The present invention was made to solve these problems, and an object of the present invention is, in a power supply system including a power converter connected across a plurality of DC power supplies and an electric power line shared by the plurality of DC power supplies, to select the operation mode of the power converter so as to simultaneously achieve improvement in overall efficiency of the system and protection of each DC power supply from overcharge and overdischarge.

Solution to Problem

In an aspect of the present invention, a power supply system includes a load, an electric power line connected to the load, a plurality of DC power supplies, a power converter, and a control device configured to control an operation of the power converter. The power converter is connected across the plurality of DC power supplies and the electric power line. The power converter is configured to include a plurality of switching elements and to operate with one operation mode among a plurality of operation modes being applied, in the plurality of operation modes, power conversion between the plurality of DC power supplies and the electric power line being performed in different manners. The control device includes a request voltage setting unit, an operation mode selection unit, and an operation mode modification unit. The request voltage setting unit is configured to set a request voltage for an output voltage output by the power converter to the electric power line in accordance with an operating condition of the load. The operation mode selection unit is configured to select a first operation mode in which a power loss in the power supply system is minimized from an operation mode group in which the power converter can output an output voltage more than or equal to the request voltage among the plurality of operation modes. The operation mode modification unit is configured to, when at least one of SOC and input/output power of any DC power supply among the plurality of DC power supplies has reached a restriction value, select, from the operation mode group, a second operation mode in which power distribution between the plurality of DC power supplies can be controlled, in replacement of the first operation mode.

Preferably, the first operation mode when the operation mode modification unit has selected the second operation mode is an operation mode in which power distribution between the plurality of DC power supplies cannot be controlled freely.

More preferably, the first operation mode includes an operation mode, among the plurality of operation modes, in which on/off of the plurality of switching elements is controlled to execute DC voltage conversion between one DC power supply of the plurality of DC power supplies and the electric power line and to maintain the remaining DC power supply in a condition electrically disconnected from the electric power line. The second operation mode includes an operation mode, among the plurality of operation modes, in which on/off of the plurality of switching elements is controlled to execute DC voltage conversion in parallel between at least two DC power supplies among the plurality of DC power supplies and the electric power line.

Preferably, the plurality of DC power supplies are formed by first and second DC power supplies. The electric power line includes a first electric power line on a higher voltage side and a second electric power line on a lower voltage side. The plurality of switching elements include first to fourth switching elements. The first switching element is electrically connected across a first node and the first electric power line. The second switching element is electrically connected across a second node and the first node. The third switching element is electrically connected across a third node electrically connected to a negative electrode terminal of the second DC power supply and the second node. The fourth switching element is electrically connected across the third node and the second electric power line electrically connected to a negative electrode terminal of the first DC power supply. The power converter further includes first and second reactors. The first reactor is electrically connected in series to the first DC power supply across the second node and the second electric power line. The second reactor is electrically connected in series to the second DC power supply across the first node and the third node.

More preferably, the plurality of operation modes include first and second modes. In the first mode, the power converter executes DC voltage conversion in parallel between the first and second DC power supplies and the first and second electric power lines by controlling on/off of the first to fourth switching elements. In the second mode, the power converter executes DC voltage conversion between the first and second DC power supplies connected in series and the first and second electric power lines by keeping the third switching element on and controlling on/off of the first, second and fourth switching elements. When the request voltage is higher than the sum of output voltages of the first and second DC power supplies, the first operation mode is the second mode, and the second operation mode is the first mode.

Moreover, the plurality of operation modes include first to third modes. In the first mode, the power converter executes DC voltage conversion in parallel between the first and second DC power supplies and the first and second electric power lines by controlling on/off of the first to fourth switching elements. In the second mode, the power converter executes DC voltage conversion between the first and second DC power supplies connected in series and the first and second electric power lines by keeping the third switching element on and controlling on/off of the first, second and fourth switching elements. In the third mode, the power converter maintains the state where the first and second DC power supplies are connected in series to the first and second electric power lines by keeping the first to fourth switching elements on/off. When the request voltage is less than or equal to the sum of output voltages of the first and second DC power supplies, the first operation mode is the third mode, and the second operation mode is the first mode.

More preferably, the plurality of operation modes further include a fourth mode. In the fourth mode, the power converter executes DC voltage conversion between one of the first and second DC power supplies and the electric power lines by controlling on/off of the first to fourth switching elements. When the request voltage is higher than a higher one of output voltages of the first and second DC power supplies, the first operation mode is the fourth mode, and the second operation mode is the first mode.

Still more preferably, the plurality of operation modes further include fifth and sixth modes. In the fifth mode, the power converter maintains the state where one of the first and second DC power supplies is electrically connected to the first and second electric power lines and the other one of the first and second DC power supplies is electrically disconnected from the first and second electric power lines by keeping the first to fourth switching elements on/off. In the sixth mode, the power converter maintains the state where the first and second DC power supplies are connected in parallel to the first and second electric power lines by keeping the first to fourth switching elements on/off. When the request voltage is lower than a higher one of the output voltages of the first and second DC power supplies, the first operation mode is one of the fifth and sixth modes, and the second operation mode is the first mode.

Alternatively, still more preferably, the control device calculates a first duty ratio for controlling output from the first DC power supply and a second duty ratio for controlling output from the second DC power supply, and generates signals for controlling on/off of the first to fourth switching elements based on first and second control pulse signals respectively obtained in accordance with pulse width modulations by comparing a first carrier wave with the first duty ratio and comparing a second carrier wave with the second duty ratio. Furthermore, a phase difference between the first carrier wave and the second carrier wave is controlled to be variable in accordance with the first and second duty ratios such that transition timing of a pulse of the first control pulse signal coincides with transition timing of a pulse of the second control pulse signal.

Preferably, the power supply system is mounted on a hybrid vehicle including an engine and a motor for producing vehicle driving force. The hybrid vehicle is configured to allow a user to select a predetermined driving mode of giving first priority to use efficiency of accumulated energies in the plurality of DC power supplies. The load includes the motor electrically connected to the electric power line. When input/output power of any one of the plurality of DC power supplies reaches a restriction value under a condition in which the second or third mode has been selected as the first operation mode by the operation mode selection unit and the predetermined driving mode has been selected, the control device maintains selection of the first operation mode and restricts output of the motor such that the input/output power of each of the DC power supplies becomes smaller than the restriction value.

More preferably, the operation mode modification unit is configured to, when the SOC and the input/output power of each of the DC power supplies become smaller than the restriction value during selection of the second operation mode, and calculate an estimated value of the input/output power of each of the DC power supplies if the first operation mode is applied instead of the second operation mode. The operation mode modification unit is further configured to instruct return to the first operation mode when the estimated value of each of the DC power supplies has not reached the restriction value, and to maintain selection of the second operation mode when the estimated value has reached the restriction value in any one of the plurality of DC power supplies.

Alternatively preferably, in the case where the second operation mode has been selected by the operation mode modification unit when the SOC of any one of the plurality of DC power supplies has reached the restriction value, the control device controls the power converter to charge the DC power supply by setting the sum of the output power from other DC power supplies except the DC power supply whose SOC has reached the restriction value to be higher than request power of the load.

Preferably, the control device calculates overall input/output power from the first and second DC power supplies as a whole to the electric power line based on a deviation between a voltage detection value of the electric power line and a voltage command value, and switches a power distribution ratio between the first and second DC power supplies in accordance with a change of the operation mode. The control device further sets a first power command value for the first DC power supply and a second power command value for the second DC power supply in accordance with the overall input/output power and the power distribution ratio, calculates a first duty ratio for controlling output from the first DC power supply based on a deviation of a current detection value of the first DC power supply relative to a first current command value obtained by dividing the first power command value by the output voltage of the first DC power supply, and calculates a second duty ratio for controlling output from the second DC power supply based on a deviation of a current detection value of the second DC power supply relative to a second current command value obtained by dividing the second power command value by the output voltage of the second DC power supply. The control device further generates signals for controlling on/off of the first to fourth switching elements based on first and second control pulse signals respectively obtained in accordance with pulse width modulations by comparing a first carrier wave with the first duty ratio and comparing a second carrier wave with the second duty ratio.

More preferably, the power distribution ratio is set to be variable in accordance with operating conditions of the first and second DC power supplies in the first mode, and is fixed at a ratio based on voltages of the first and second DC power supplies in the second mode.

More preferably, the control device, in the first mode, calculates the first and second duty ratios for the first and second DC power supplies by current feedback control based on the first current command value, and in the second mode, calculates the first and second duty ratios by executing current feedback control based on the second current command value in one of the first and second DC power supplies, while in the other one of the first and second DC power supplies, executing feedforward control based on the output voltage of the DC power supply and the voltage command value, without executing the current feedback control. In each of the first and second modes, the control device further generates the signals for controlling on/off of the first to fourth switching elements based on a first control pulse signal obtained by comparing the first duty ratio with the first carrier wave and a second control pulse signal obtained by comparing the second duty ratio with the second carrier wave. Furthermore, in each of the first and second modes, a phase difference between the first carrier wave and the second carrier wave is controlled to be variable in accordance with the first and second duty ratios having been calculated such that transition timing of a pulse of the first control pulse signal coincides with transition timing of a pulse of the second control pulse signal.

Alternatively, more preferably, the plurality of operation modes further include a fourth mode. In the fourth mode, the power converter executes DC voltage conversion between one of the first and second DC power supplies and the electric power lines by controlling on/off of the first to fourth switching elements, and maintains the state where the other one of the first and second DC power supplies is electrically disconnected from the first and second electric power lines. When the request voltage is lower than the sum of the output voltages of the first and second DC power supplies, the first operation mode is the fourth mode, and the second operation mode is the first mode. The power distribution ratio is set to be variable in accordance with operating conditions of the first and second DC power supplies in the first mode, and is set to ensure overall input/output power with the output from only one of the DC power supplies in the fourth mode.

More preferably, the control device sets a circulation power value for charging/discharging between the first DC power supply and the second DC power supply in the first mode. The first power command value is set to be restricted to fall within a power range set depending on the operating condition of the first DC power supply in accordance with the overall input/output power and the power distribution ratio as well as the circulation power value. The second power command value is set by subtracting the first power command value from the overall input/output power.

Advantageous Effects of Invention

According to the present invention, in a power supply system including a power converter connected across a plurality of DC power supplies and an electric power line shared by the plurality of DC power supplies, an operation mode of the power converter can be selected so as to simultaneously achieve improvement in overall efficiency of the system and protection of each DC power supply from overcharge and overdischarge.

BRIEF DESCRIPTION OF DRAWINGS

FIG. 32 is a table for describing carrier phase control in the PB mode in each operating condition of the DC power supplies.

FIG. 46 is a table describing a plurality of operation modes possessed by the power converter shown in FIG. 45 and settings of control signals and control data in each operation mode.

FIG. 51 is a flowchart describing control processing when terminating modification of operation mode selection.

DESCRIPTION OF EMBODIMENTS

Figure 1:
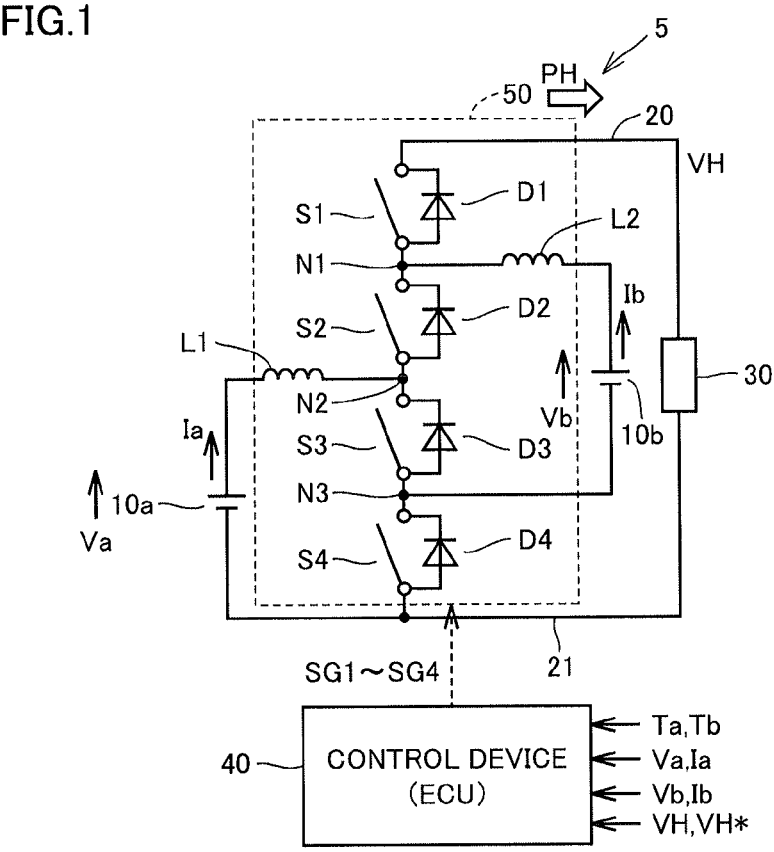
FIG. 1 is a circuit diagram showing a configuration of a power supply system including a power converter according to a first embodiment of the present invention.

Hereinbelow, embodiments of the present invention will be described in detail with reference to the drawings. A plurality of embodiments will be described below. Combination as appropriate of features described in the respective embodiments is originally encompassed. The same or corresponding portions in the drawings have the same reference characters allotted, and detailed description thereof will not be repeated basically below.

First Embodiment (Circuit Configuration of Power Converter)

FIG. 1 is a circuit diagram showing a configuration of a power supply system including a power converter according to a first embodiment of the present invention.

Referring to FIG. 1, power supply system 5 includes a plurality of DC power supplies 10a and 10b, a load 30 and a power converter 50.

In the present embodiment, DC power supplies 10a and 10b are each implemented by a secondary battery, such as a lithium-ion secondary battery or a nickel-metal hydride battery, or a DC voltage source element having excellent output characteristics, such as an electric double layer capacitor or a lithium-ion capacitor. DC power supplies 10a and 10b correspond to a "first DC power supply" and a "second DC power supply", respectively.

DC power supplies 10a and 10b can be implemented by DC power supplies of the same type and the same capacitance, or can be implemented by DC power supplies with different properties and/or capacitance.

Power converter 50 is connected across DC power supplies 10a, 10b and electric power line 20. Power converter 50 controls a DC voltage (hereinafter also referred to as an output voltage VH) on electric power line 20 connected to load 30 in accordance with a voltage command value VH*. That is, electric power line 20 is provided in common for DC power supplies 10a and 10b.

Load 30 operates upon receipt of output voltage VH of power converter 50. Voltage command value VH* is set at a voltage suitable for the operation of load 30. Voltage command value VH* may be set to be variable depending on the operating condition of load 30. Furthermore, load 30 may be configured to be capable of generating electric power for charging DC power supplies 10a and 10b by regenerative power generation or the like.

Power converter 50 includes switching elements S1 to S4 and reactors L1 and L2. In the present embodiment, for the switching elements, IGBTs (Insulated Gate Bipolar Transistors), power MOS (Metal Oxide Semiconductor) transistors, power bipolar transistors, or the like can be used. For switching elements S1 to S4, antiparallel diodes D1 to D4 are arranged, respectively. On/off of switching elements S1 to S4 can be controlled in response to control signals SG1 to SG4, respectively. That is, switching elements S1 to S4 are respectively turned on when control signals SG1 to SG4 are at a high level (hereinafter referred to as an H level), and are turned off when they are at a low level (hereinafter referred to as an L level).

Switching element S1 is electrically connected across electric power line 20 and a node N1. Switching element S2 is electrically connected across nodes N1 and N2. Switching element S3 is electrically connected across nodes N2 and N3. Switching element S4 is electrically connected across node N3 and a grounded line 21.

Node N3 is electrically connected to a negative electrode terminal of DC power supply 10b. Grounded line 21 is electrically connected to load 30 and a negative electrode terminal of DC power supply 10a. Reactor L1 is electrically connected across node N2 and grounded line 21 in series with DC power supply 10a. Reactor L2 is electrically connected across nodes N1 and N3 in series with DC power supply 10b.

As understood from FIG. 1, power converter 50 is configured to include a step-up chopper circuit in correspondence with each of DC power supplies 10a and 10b. That is, for DC power supply 10a, a bidirectional current first step-up chopper circuit is formed in which switching elements S1 and S2 serve as an upper arm element and switching elements S3 and S4 serve as a lower arm element. Similarly, for DC power supply 10b, a bidirectional current second step-up chopper circuit is formed in which switching elements S1 and S4 serve as the upper-arm element and switching elements S2 and S3 serve as the lower arm element.

Switching elements S1 to S4 are included in both of a power conversion path formed across DC power supply 10a and electric power line 20 by the first step-up chopper circuit and a power conversion path formed across DC power supply 10b and electric power line 20 by the second step-up chopper circuit.

Control device 40 generates control signals SG1 to SG4 for controlling on/off of switching elements S1 to S4, respectively, in order to control output voltage VH to load 30. It is noted that although not shown in FIG. 1, detectors (voltage sensor, current sensor) for the voltage (hereinafter referred to as Va) and current (hereinafter referred to as Ia) of DC power supply 10a, the voltage (hereinafter referred to as Vb) and current (hereinafter referred to as Ib) of DC power supply 10b, as well as output voltage VH are provided. Furthermore, detectors (temperature sensors) for the temperatures (hereinafter referred to as Ta and Tb) of DC power supplies 10a and 10b are also preferably provided. The outputs of these detectors are given to control device 40.

In the configuration of FIG. 1, switching elements S1 to S4 correspond to "a first switching element" to "a fourth switching element", respectively, and reactors L1 and L2 correspond to "a first reactor" and "a second reactor", respectively.

Figure 2:
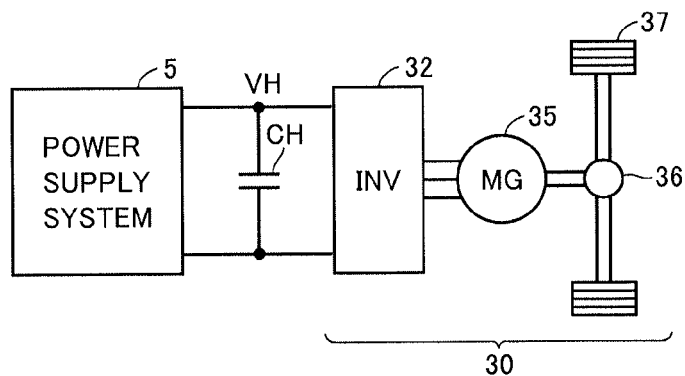
FIG. 2 is a schematic view showing an exemplary configuration of a load shown in FIG. 1.

FIG. 2 is a schematic view showing an exemplary configuration of load 30.

Referring to FIG. 2, load 30 is configured to include a traction motor for an electric powered vehicle, for example. Load 30 includes a smoothing capacitor CH, an inverter 32, a motor-generator 35, a motive power transmission gear 36, and a driving wheel 37.

Motor-generator 35 is a traction motor for generating vehicle driving force, and implemented by, for example, a multiple-phase permanent-magnet type synchronous motor. Output torque of motor-generator 35 is transferred to driving wheel 37 by way of motive power transmission gear 36 formed by a reduction gear and a power split device. The electric powered vehicle runs with the torque transferred to driving wheel 37. Motor-generator 35 generates electric power with rotary force of driving wheel 37 during regenerative braking of the electric powered vehicle. This generated power is subjected to AC/DC conversion by inverter 32. This DC power can be used as electric power for charging DC power supplies 10a and 10b included in power supply system 5.

In a hybrid vehicle equipped with an engine (not shown) in addition to the motor-generator, vehicle driving force necessary for the electric powered vehicle is generated by operating this engine and motor-generator 35 cooperatively. On this occasion, it is also possible to charge DC power supplies 10a and 10b with electric power generated by rotation of the engine.

In this manner, the electric powered vehicle collectively represents a vehicle equipped with a traction motor, and includes both of a hybrid vehicle that generates vehicle driving force by an engine and a motor, as well as an electric vehicle and a fuel-cell vehicle not equipped with an engine.

(Operation Mode in Power Converter)

Power converter 50 has a plurality of operation modes different in the mode of DC power conversion between DC power supplies 10a, 10b and electric power line 20.

Figures 3, 4:
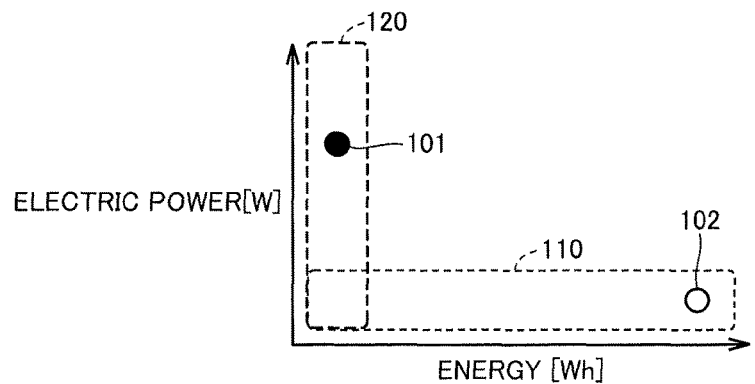
FIG. 3 is a table for describing a plurality of operation modes possessed by the power converter shown in FIG. 1.
FIG. 4 is a conceptual view showing an example of properties of two DC power supplies shown in FIG. 1 when implemented by power supplies of different types.

FIG. 3 shows a plurality of operation modes possessed by power converter 50.

Referring to FIG. 3, the operation modes are roughly divided into a "boosting mode (B)" of boosting output voltage(s) of DC power supply 10a and/or DC power supply 10b following periodic on/off control of switching elements S1 to S4 and a "direct connection mode (D)" of electrically connecting DC power supply 10a and/or DC power supply 10b to electric power line 20 with switching elements S1 to S4 kept on/off.

The boosting mode includes a "parallel boosting mode (hereinafter referred to as a PB mode)" of carrying out parallel DC/DC conversion between DC power supplies 10a and 10b and electric power line 20 and a "series boosting mode (hereinafter referred to as a SB mode)" of carrying out DC/DC conversion between DC power supplies 10a and 10b connected in series and electric power line 20. The PB mode corresponds to the "parallel connection mode" in PTD 3, and the SB mode corresponds to the "series connection mode" in PTD 3.

The boosting mode further includes an "independent mode with DC power supply 10a (hereinafter referred to as an aB mode)" of carrying out DC/DC conversion between only DC power supply 10a and electric power line 20 and an "independent mode with DC power supply 10b (hereinafter referred to as a bB mode)" of carrying out DC/DC conversion between only DC power supply 10b and electric power line 20. In the aB mode, DC power supply 10b is unused while being maintained in the state electrically disconnected from electric power line 20 as long as output voltage VH is controlled to be higher than voltage Vb of DC power supply 10b. Similarly, in the bB mode, DC power supply 10a is unused while being maintained in the state electrically disconnected from electric power line 20 as long as output voltage VH is controlled to be higher than voltage Va of DC power supply 10a.

In each of the PB mode, SB mode, aB mode, and bB mode included in the boosting mode, output voltage VH of electric power line 20 is controlled in accordance with voltage command value VH*. Control of switching elements S1 to S4 in each of these modes will be described later. The direct connection mode includes a "parallel direct connection mode (hereinafter referred to as a PD mode)" of maintaining the state in which DC power supplies 10a and 10b are connected in parallel to electric power line 20 and a "series direct connection mode (hereinafter referred to as an SD mode)" of maintaining the state in which DC power supplies 10a and 10b are connected in series to electric power line 20.

In the PD mode, switching elements S1, S2 and S4 are kept on, while switching element S3 is kept off. Accordingly, output voltage VH becomes equivalent to output voltages Va and Vb of DC power supplies 10a and 10 (strictly, a higher one of Va and Vb). Since the voltage difference between Va and Vb will generate a short-circuit current at DC power supplies 10a and 10b, the PD mode can be applied limitedly when the voltage difference is small.

In the SD mode, switching elements S2 and S4 are kept off, while switching elements S1 and S3 are kept on. Accordingly, output voltage VH becomes equivalent to the sum of output voltages Va and Vb of DC power supplies 10a and 10b $$(VH=Va+Vb).$$

Further, the direct connection mode includes a "direct connection mode of DC power supply 10a (hereinafter referred to as an aD mode)" of electrically connecting only DC power supply 10a to electric power line 20 and a "direct connection mode of DC power supply 10b (hereinafter referred to as a bD mode)" of electrically connecting only DC power supply 10b to electric power line 20.

In the aD mode, switching elements S1 and S2 are kept on, while switching elements S3 and S4 are kept off. Accordingly, DC power supply 10b is brought into the state disconnected from electric power line 20, and output voltage VH becomes equivalent to voltage Va of DC power supply 10a (VH=Va). In the aD mode, DC power supply 10b is unused while being maintained in the state electrically disconnected from electric power line 20. It is noted that if the aD mode is applied when Vb>Va holds, a short-circuit current will flow from DC power supply 10b to 10a by way of switching element S2. Thus, Va>Vb is a necessary condition for applying the aD mode.

Similarly, in the bD mode, switching elements S1 and S4 are kept on, while switching elements S2 and S3 are kept off. Accordingly, DC power supply 10a is brought into the state disconnected from electric power line 20, and output voltage VH becomes equivalent to voltage Vb of DC power supply 10b (VH=Vb). In the bD mode, DC power supply 10a is unused while being maintained in the state electrically disconnected from electric power line 20. It is noted that when the bD mode is applied when Va>Vb holds, a short-circuit current will flow from DC power supply 10a to 10b by way of diode D2. Thus, Vb>Va is a necessary condition for applying the bD mode.

In each of the PD mode, SD mode, aD mode, and bD mode included in the direct connection mode, output voltage VH of electric power line 20 is determined depending on voltages Va and Vb of DC power supplies 10a and 10b, and therefore, cannot be directly controlled. Thus, in each mode included in the direct connection mode, output voltage VH can no longer be set at a voltage suitable for the operation of load 30, so that power loss in load 30 may be increased.

On the other hand, in the direct connection mode, power loss in power converter 50 is significantly suppressed because switching elements S1 to S4 are not turned on/off. Therefore, depending on the operating condition of load 30, there is a possibility that power loss in power supply system 5 as a whole can be suppressed because the amount of decrease in power loss in power converter 50 becomes larger than the amount of increase in power loss in load 30 by applying the direct connection mode.

In FIG. 3, the PB mode corresponds to a "first mode", the SB mode corresponds to a "second mode", and the PD mode corresponds to a "third mode." Moreover, the aB mode and bB mode correspond to a "fourth mode", the aD mode and bD mode correspond to a "fifth mode", and the SD mode corresponds to a "sixth mode."

FIG. 4 is a conceptual view showing an example of properties of DC power supplies 10a and 10b when implemented by power supplies of different types. FIG. 4 shows a so-called Ragone plot in which energy is plotted on the horizontal axis and electric power is plotted on the vertical axis. In general, output power and stored energy of a DC power supply have a trade-off relationship. Therefore, a high output is difficult to obtain with a high-capacity type battery, while stored energy is difficult to increase with a high-output type battery.

Therefore, preferably, one of DC power supplies 10a and 10b is implemented by a so-called high-capacity type power supply having high stored energy, and the other one of them is implemented by a so-called high-output type power supply providing high output power. Then, energy stored in the high-capacity type power supply is used as a constant supply for a long time, and the high-output type power supply can be used as a buffer for compensating for a shortage in the output from the high-capacity type power supply.

In the example of FIG. 4, DC power supply 10a is implemented by a high-capacity type power supply, while DC power supply 10b is implemented by a high-output type power supply. Therefore, an active region 110 of DC power supply 10a has a narrower range of electric power that can be output than an active region 120 of DC power supply 10b. On the other hand, active region 120 has a narrower range of energy that can be stored than active region 110.

At an operating point 101 of load 30, high power is requested for a short time. For example, in an electric powered vehicle, operating point 101 corresponds to abrupt acceleration caused by a user's accelerator operation. In contrast to this, at an operating point 102 of load 30, relatively low power is requested for a long time. For example, in an electric powered vehicle, operating point 102 corresponds to continuous high-speed steady running.

For operating point 101, the output from high-output type DC power supply 10b can mainly be applied. On the other hand, for operating point 102, the output from high-capacity type DC power supply 10a can mainly be applied. Accordingly, in an electric powered vehicle, the running distance with electrical energy can be extended through use of energy stored in the high-capacity type battery for a long time, and acceleration performance in correspondence with a user's accelerator operation can be ensured promptly.

When the DC power supplies are implemented by batteries, there are possibilities that output characteristics decrease at a low temperature and charge/discharge is restricted at a high temperature in order to suppress progress of deterioration. Particularly in an electric powered vehicle, a case arises in which a temperature difference occurs between DC power supplies 10a and 10b because of the difference in mounting position. Therefore, in power supply system 5, there is a case in which it is more effective to use only either one of the DC power supplies in accordance with the operating condition (particularly, the temperature) of DC power supplies 10a and 10b or in accordance with requests of load 30 as described above. These cases can be handled by providing modes of using only one of DC power supplies 10a and 10b (aB mode, bB mode, aD mode, and bD mode) as described above.

That is, in power converter 50 according to the present first embodiment, any operation mode is selected from among the plurality of operation modes shown in FIG. 3 depending on the operating conditions of DC power supplies 10a, 10b and/or load 30. Details of processing for selecting an operation mode will be described later.

(Circuit Operation in Each Operation Mode)

Next, the circuit operation of power converter 50 in each operation mode will be described. First, a circuit operation in the PB mode in which parallel DC/DC conversion is performed between DC power supplies 10a, 10b and electric power line 20 will be described with reference to FIGS. 5A to 8B.

(Circuit Operation in PB Mode)

As shown in FIGS. 5A to 6B, DC power supplies 10a and 10b can be connected in parallel to electric power line 20 by turning on switching element S4 or S2. In the parallel connection mode, an equivalent circuit is formed differently according to the relationship in magnitude between voltage Va of DC power supply 10a and voltage Vb of DC power supply 10b.

Figure 5A:
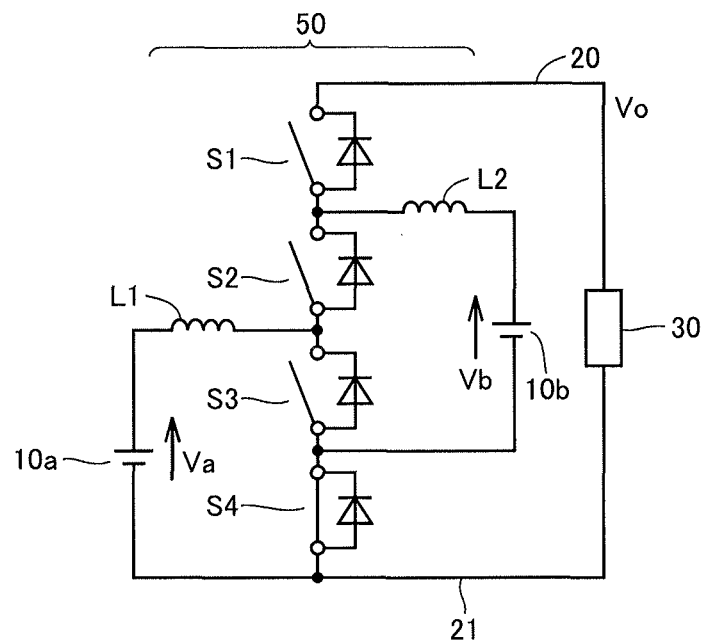
FIG. 5A is a first circuit diagram describing a first circuit operation in a PB mode.

As shown in FIG. 5A, DC power supplies 10a and 10b are connected in parallel via switching elements S2 and S3 by turning on switching element S4, when Vb>Va holds. The equivalent circuit in this instance is shown in FIG. 5B.

Figure 5B:
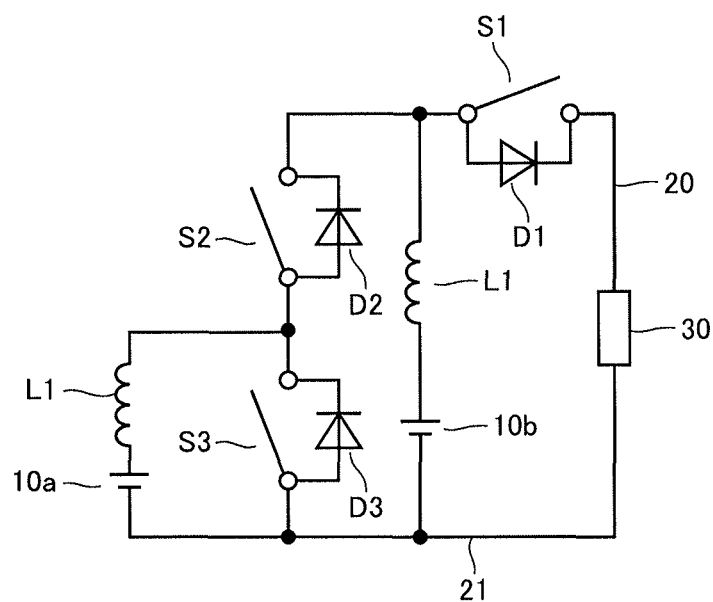
FIG. 5B is a second circuit diagram describing the first circuit operation in the PB mode.

With reference to FIG. 5B, it is possible to achieve on-period and off-period of the lower arm element alternately, by controlling on/off of switching element S3, between DC power supply 10a and electric power line 20. Similarly, it is possible to achieve on-period and off-period of the lower arm element of the boost chopper circuit alternately, by commonly controlling on/off of switching elements S2 and S3, between DC power supply 10b and electric power line 20. Switching element S1 operates as a switch for controlling regeneration from load 30.

Figure 6A:
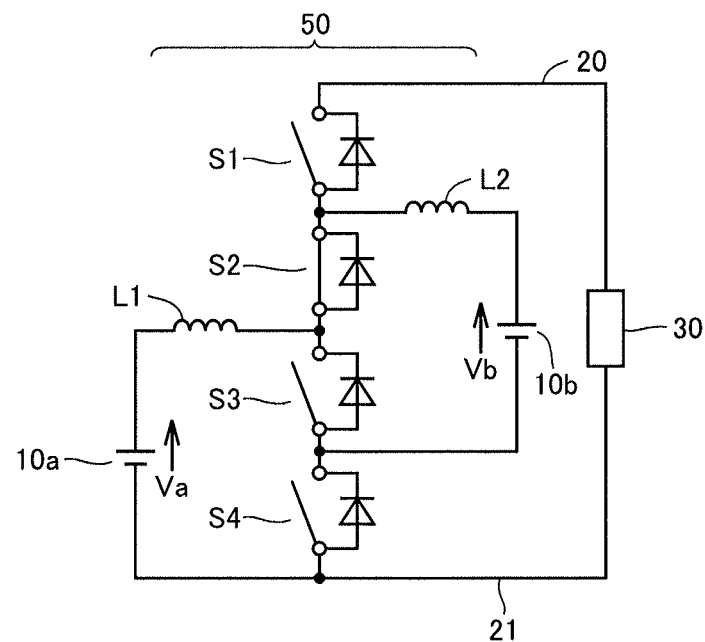
FIG. 6A is a first circuit diagram describing a second circuit operation in the PB mode.

Meanwhile, as shown in FIG. 6A, it is possible to connect DC power supplies 10a and 10b in parallel via switching elements S3 and S4 by turning on switching element S2, when Va>Vb holds. The equivalent circuit in this instance is shown in FIG. 6B.

Figure 6B:
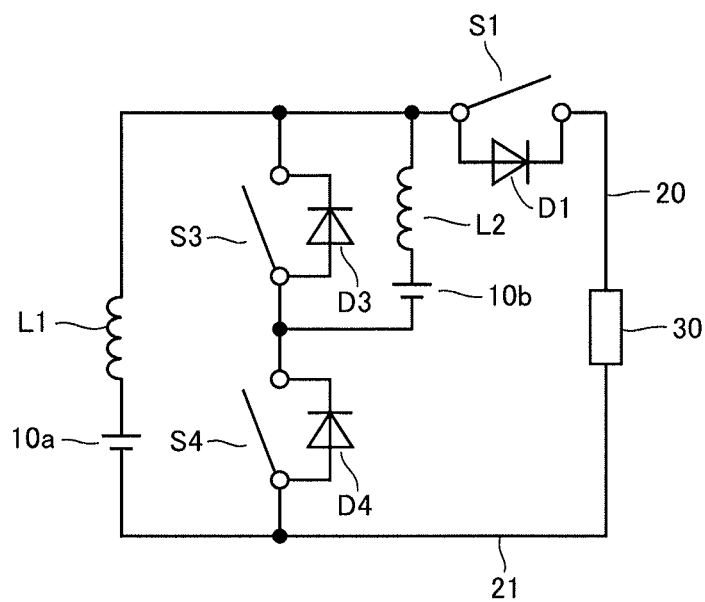
FIG. 6B is a second circuit diagram describing the second circuit operation in the PB mode.

With reference to FIG. 6B, it is possible to achieve on-period and off-period of the lower arm element alternately, by controlling on/off of switching element S3, between DC power supply 10b and electric power line 20. Similarly, it is possible to achieve on-period and off-period of the lower arm element of the boost chopper circuit alternately, by commonly controlling on/off of switching elements S3 and S4, between DC power supply 10a and electric power line 20. Switching element S1 operates as a switch for controlling regeneration from load 30.

Next, the boost operation of power converter 50 in the PB mode of power converter 50 will be described in detail, with reference to FIG. 7A to FIG. 8B.

Figure 7A:
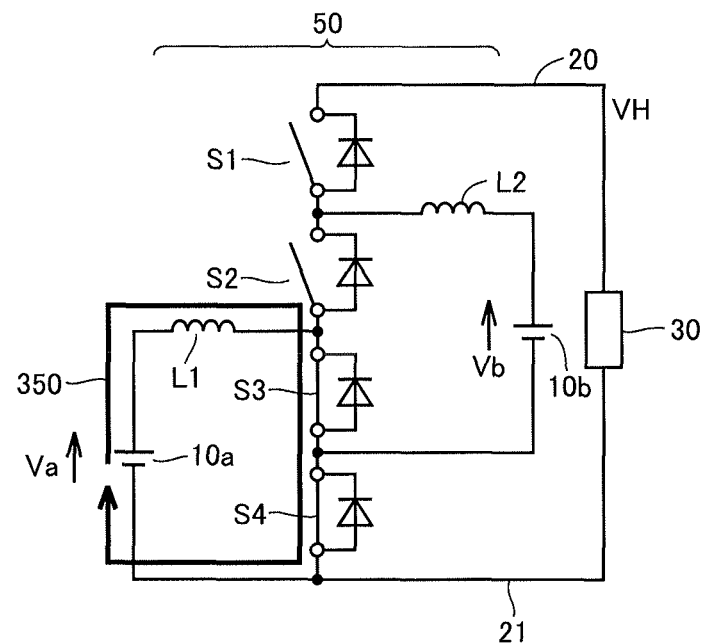
FIG. 7A is a first circuit diagram describing DC/DC conversion (boost operation) for a first DC power supply in the PB mode.
Figure 7B:
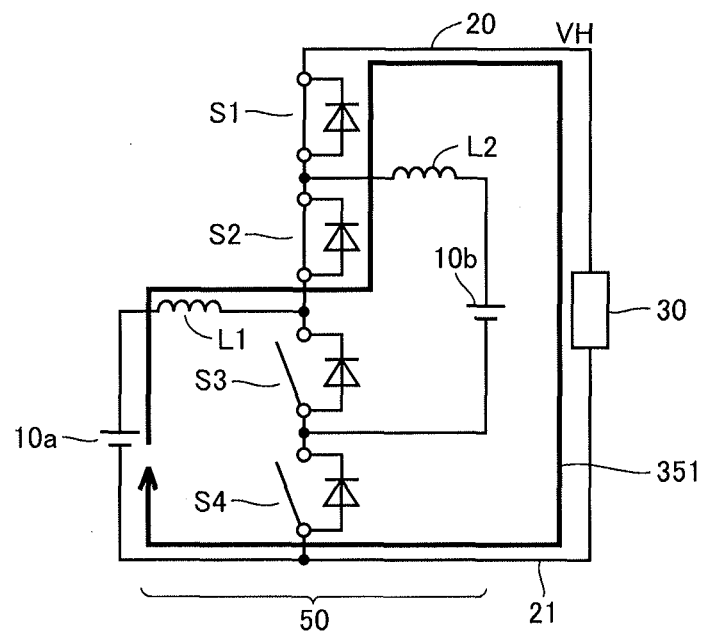
FIG. 7B is a second circuit diagram describing DC/DC conversion (boost operation) for the first DC power supply in the PB mode.

FIGS. 7A and 7B show DC/DC conversion (boost operation) for DC power supply 10a in the PB mode.

With reference to FIG. 7A, an electric current path 350 for accumulating energy in reactor L1 is formed by turning on the pair of switching elements S3 and S4 while turning off the pair of switching elements S1 and S2, achieving the on-condition of the lower arm element of the boost chopper circuit.

Meanwhile, with reference to FIG. 7B, an electric current path 351 for outputting the accumulated energy of reactor L1 together with the energy of DC power supply 10a is formed by turning off the pair of switching elements S3 and S4 while turning on the pair of switching elements S1 and S2, achieving the on-condition of the upper arm element of the boost chopper circuit.

Electric current path 350 shown in FIG. 7A and electric current path 351 shown in FIG. 7B are formed by alternately repeating a first period in which the pair of switching elements S3 and S4 is turned on while at least one of switching elements S1 and S2 is turned off and a second period in which the pair of switching elements S1 and S2 is turned on while at least one of switching elements S3 and S4 is turned off.

As a result, the boost chopper circuit which includes the pair of switching elements S1 and S2 equivalently serving as the upper arm element and the pair of switching elements S3 and S4 equivalently serving as the lower arm element is formed for DC power supply 10a. In the DC/DC conversion operation shown in FIGS. 7A and 7B, DC power supplies 10a and 10b do not interfere with each other, because of the absence of an electric current flowing path to DC power supply 10b. Namely, it is possible to individually control input/output of electric power to/from DC power supplies 10a and 10b.

In such a DC/DC conversion, the relationship represented by Expression (1) below holds between voltage Va of DC power supply 10a and output voltage VH of electric power line 20. In Expression (1), Da represents a duty ratio of a period during which the pair of switching elements S3 and S4 is turned on.

$$VH=1/(1-Da)\cdot Va \quad (1)$$

Figure 8A:
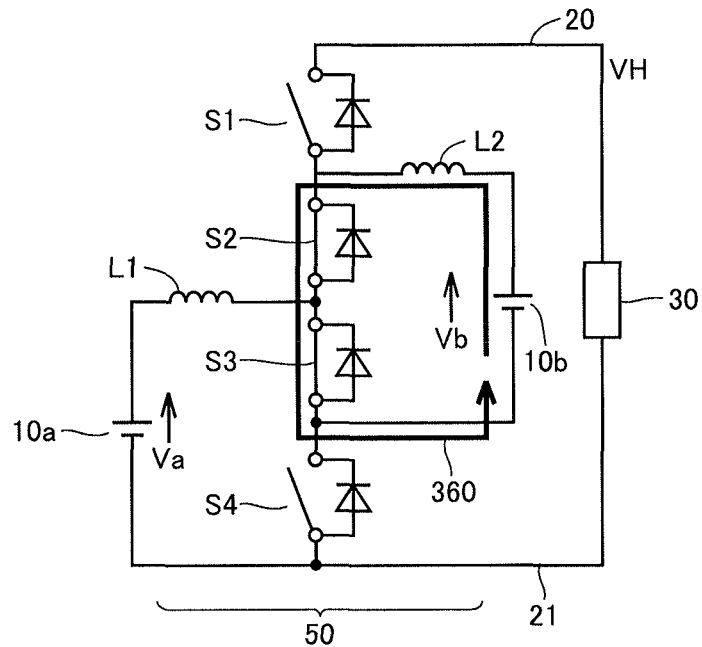
FIG. 8A is a first circuit diagram describing DC/DC conversion (boost operation) for a second DC power supply in the PB mode.
Figure 8B:
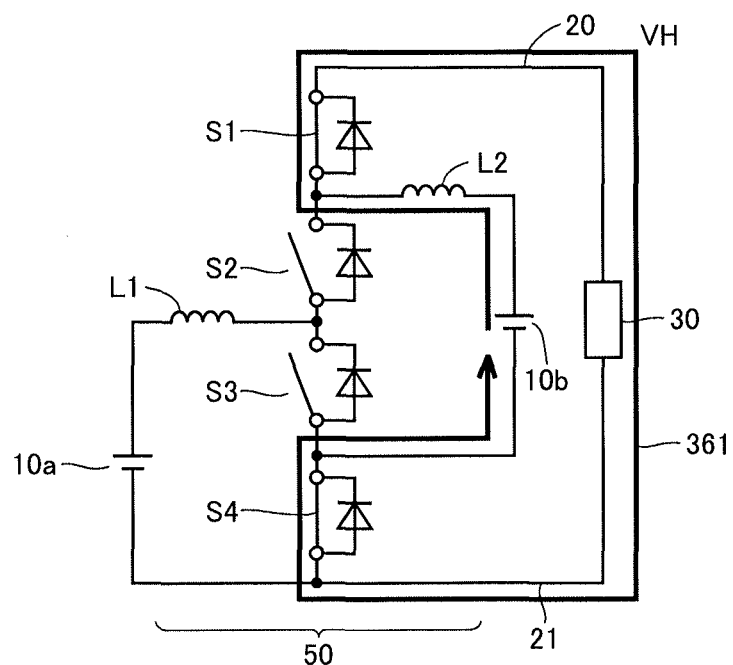
FIG. 8B is a second circuit diagram describing DC/DC conversion (boost operation) for the second DC power supply in the PB mode.

FIGS. 8A and 8B show DC/DC conversion (boost operation) for DC power supply 10b in the PB mode.

With reference to FIG. 8A, an electric current path 360 for accumulating energy in reactor L2 is formed by turning on the pair of switching elements S2 and S3 while turning off the pair of switching elements S1 and S4, achieving the on-condition of the lower arm element of the boost chopper circuit.

Meanwhile, with reference to FIG. 8B, an electric current path 361 for outputting the energy accumulated in reactor L2 together with the energy of DC power supply 10b is formed by turning off the pair of switching elements S2 and S3 while turning on the pair of switching elements S1 and S4, achieving the on-condition of the upper arm element of the boost chopper circuit.

Electric current path 360 shown in FIG. 8A and electric current path 361 shown in FIG. 8B are alternately formed by alternately repeating the first period in which the pair of switching elements S2 and S3 is turned on while at least one of switching elements S1 and S4 is turned off and the second period in which the pair of switching elements S1 and S4 is turned on while at least one of switching elements S2 and S3 is turned off.

As a result, the boost chopper circuit which includes the pair of switching elements S1 and S4 equivalently serving as the upper arm element and the pair of switching elements S2 and S3 equivalently serving as the lower arm element is formed for DC power supply 10b. In DC/DC conversion operation shown in FIGS. 8A and 8B, DC power supplies 10a and 10b do not interfere with each other, because of the absence of an electric current flowing path including DC power supply 10a. Namely, it is possible individually control input/output of electric power to/from DC power supplies 10a and 10b.

In such a DC/DC conversion, the relationship represented by Expression (2) below holds between voltage Vb of DC power supply 10b and output voltage VH of electric power line 20. In Expression (2), Db represents a duty ratio of a period during which the pair of switching elements S2 and S3 is turned on.

$$VH=1/(1-Db)\cdot Vb \quad (2)$$

As understood from FIGS. 7A to 8B, in the PB mode, an electric current obtained by DC/DC conversion between DC power supply 10a and electric power line 20 as well as an electric current obtained by DC/DC conversion between DC power supply 10b and electric power line 20 both flow through switching elements S1 to S4.

Therefore, if the electric currents flown as a result of both power conversions are directed oppositely in each switching element, for example, if electric current path 350 in FIG. 7A and electric current path 360 in FIG. 8A are formed simultaneously, the electric currents in the both electric current paths counteract each other. Therefore, the electric current flowing through switching element S3 decreases. With such a phenomenon, it may be possible to make the losses in switching elements S1 to S4 in the PB mode smaller than in the aB mode or bB mode in which DC/DC conversion is executed using an independent DC power supply. A technique for minimizing the losses in switching elements S1 to S4 in the PB mode will be described later in detail as a variation.

Figures 9, 10:
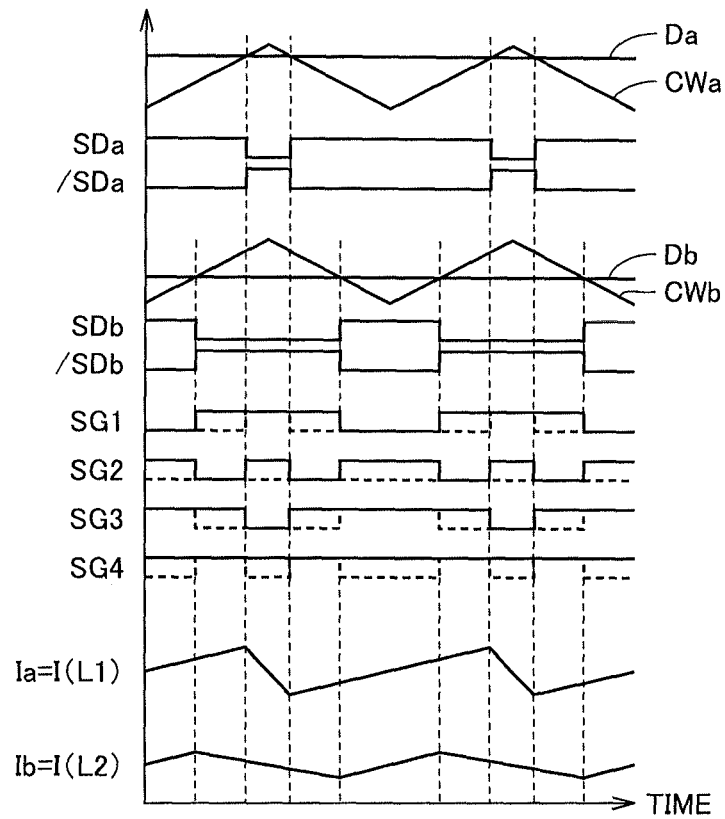
FIG. 9 is a waveform diagram showing an example of control operation for switching elements of the power converter in the PB mode.
FIG. 10 is a table for describing logical calculation expressions for setting a control signal for each switching element in the PB mode.

FIG. 9 shows a waveform diagram for describing an example of control operation for switching elements in the PB mode. Shown in FIG. 9 is an example when carrier wave CWa utilized in PWM control of DC power supply 10a has the same frequency and same phase as carrier wave CWb utilized in PWM control of DC power supply 10b.

Referring to FIG. 9, in the PB mode, for example, it is possible to control the output of one of DC power supplies 10a and 10b to compensate for a voltage deviation ΔVH (ΔVH=VH*−VH) of output voltage VH (voltage control), and to control the output of the other one of DC power supplies 10a and 10b to compensate for a current deviation between electric currents Ia and Ib (current control), as described in PTD 3. On this occasion, the command value for current control (Ia* or Ib*) can be set to control the output power of a power supply concerned.

As an example, when subjecting the output of DC power supply 10b to voltage control while subjecting the output of DC power supply 10a to current control, duty ratio Da is calculated based on a current deviation ΔIa (ΔIa=Ia*−Ia), while duty ratio Db is calculated based on voltage deviation ΔVH (ΔVH=VH*−VH).

A control pulse signal SDa is generated based on voltage comparison between duty ratio Da for controlling the output of DC power supply 10a and carrier wave CWa. Similarly, a control pulse signal SDb is generated based on comparison between duty ratio Db for controlling the output of DC power supply 10b and carrier wave CWb. Control pulse signals /SDa and /SDb are inversion signals of control pulse signals SDa and SDb, respectively.

As shown in FIG. 10, control signals SG1 to SG4 are set based on the logical operation of control pulse signals SDa (/SDa) and SDb (/SDb).

Switching element S1 forms the upper arm element in each of the boost chopper circuits shown in FIGS. 7A to 8B. Therefore, control signal SG1 for controlling on/off of switching element S1 is generated by the logical sum of control pulse signals /SDa and /SDb. As a result, on/off of switching element S1 is controlled so as to achieve both of a function of the upper arm element of the boost chopper circuit (DC power supply 10a) shown in FIGS. 7A and 7B and that of the upper arm element of the boost chopper circuit (DC power supply 10b) shown in FIGS. 8A and 8B.

Switching element S2 forms the upper arm element in the boost chopper circuit shown in FIGS. 7A and 7B, and the lower arm element in the boost chopper circuit shown in FIGS. 8A and 8B. Therefore, control signal SG2 for controlling on/off of switching element S2 is generated according to the logical sum of control pulse signals /SDa and SDb. Accordingly, on/off of switching element S2 is controlled so as to achieve both of a function of the upper arm element of the boost chopper circuit (DC power supply 10a) shown in FIGS. 7A and 7B and that of the lower arm element of the boost chopper circuit (DC power supply 10b) shown in FIGS. 8A and 8B.

Similarly, control signal SG3 for switching element S3 is generated according to the logical sum of control pulse signals SDa and SDb. Accordingly, on/off of switching element S3 is controlled so as to achieve both of a function of the lower arm element of the boost chopper circuit (DC power supply 10a) shown in FIGS. 7A and 7B and that of the lower arm element of the boost chopper circuit (DC power supply 10b) shown in FIGS. 8A and 8B.

In addition, control signal SG4 for switching element S4 is generated according to the logical sum of control pulse signals SDa and /SDb. Accordingly, on/off of switching element S4 is controlled so as to achieve both of a function of the lower arm element of the boost chopper circuit (DC power supply 10a) shown in FIGS. 7A and 7B and that of the upper arm element of the boost chopper circuit (DC power supply 10b) shown in FIGS. 8A and 8B.

In the PB mode, because control signals SG2 and SG4 are set to complementary level, switching elements S2 and S4 are turned on/off complementarily. Accordingly, it is possible to naturally switch between the operation when Vb>Va holds as shown in FIGS. 5A and 5B and the operation when Va>Vb holds as shown in FIGS. 6A and 6B. In addition, it is possible to execute DC power conversion in accordance with duty ratios Da and Db for DC power supplies 10a and 10b by complementarily turning switching elements S1 and S3 on/off.

Referring again to FIG. 9, control signals SG1 to SG4 are set based on control pulse signals SDa (/SDa) and SDb (/SDb), in accordance with logical calculation expressions shown in FIG. 10. Electric current I(L1) flowing through reactor L1 and electric current I(L2) flowing through reactor L2 are controlled by turning switching elements S1 to S4 on/off in accordance with control signals SG1 to SG4. Electric current I(L1) corresponds to electric current Ia of DC power supply 10a, while electric current I(L2) corresponds to electric current Ib of DC power supply 10b.

In this way, in the PB mode, output voltage VH can be controlled to be voltage command value VH* upon executing DC/DC conversion in which DC power is input/output in parallel between DC power supplies 10a, 10b and electric power line 20. Furthermore, in accordance with the current command value for a DC power supply which is subject to current control, input/output power to/from that DC power supply can be controlled.

In the PB mode, a shortage in the output power from the DC power supply which is subject to current control with respect to input/output power to/from load 30 (hereinafter also referred to as load power PL) will be compensated for by the DC power supply which is subject to voltage control. Therefore, the power distribution ratio between the DC power supplies can be controlled indirectly by setting of the current command value in current control. As a result, in the PB mode, the power distribution between DC power supplies 10a and 10b in total electric power PH (PH=Pa+Pb) that DC power supplies 10a and 10b as a whole receive/output from/to electric power line 20 can be controlled. By setting of the current command value, it is also possible to perform an operation of charging one of the DC power supplies with output power from the other DC power supply. Hereinbelow, as to output power Pa, output power Pb, total electric power PH, and load power PL, electric power values during discharging of each of DC power supplies 10a, 10b and in the power running operation of load 30 will be indicated by positive values, and electric power values during charging of each of DC power supplies 10a, 10b and in the regeneration operation of load 30 will be indicated by negative values.

(Circuit Operation in aB Mode and bB Mode)

The circuit operations in boosting modes (aB mode and bB mode) in which only one of DC power supplies 10a and 10b is used are common to the circuit operations shown in FIGS. 7A to 8B.

In the aB mode, by the switching operation shown in FIGS. 7A and 7B, bidirectional DC/DC conversion is executed between DC power supply 10a and electric power line 20 (load 30) without using DC power supply 10b. Therefore, in the aB mode, switching elements S1 to S4 are controlled in accordance with control pulse signal SDa based on duty ratio Da for controlling the output of DC power supply 10a.

Specifically, on/off of switching elements S3 and S4 constituting the lower arm element of the boost chopper circuit shown in FIGS. 7A and 7B is controlled in common in accordance with control pulse signal SDa. Similarly, on/off of switching elements S1 and S2 constituting the upper arm element of the boost chopper circuit is controlled in common in accordance with control pulse signal /SDa.

Similarly, in the bB mode, by the switching operation shown in FIGS. 8A and 8B, bidirectional DC/DC conversion is executed between DC power supply 10b and electric power line 20 (load 30) without using DC power supply 10a. Therefore, in the bB mode, switching elements S1 to S4 are controlled in accordance with control pulse signal SDb based on duty ratio Db for controlling the output of DC power supply 10b.

Specifically, on/off of switching elements S2 and S3 constituting the lower arm element of the boost chopper circuit shown in FIGS. 8A and 8B is controlled in common in accordance with control pulse signal SDb. Similarly, on/off of switching elements S1 and S4 constituting the upper arm element of the boost chopper circuit is controlled in common in accordance with control pulse signal /SDb.

(Circuit Operation in Direct Connection Mode)

In the direct connection mode, it is understood that any one of the PD mode, SD mode, aD mode, and bD mode is achieved by keeping switching elements S1 to S4 on/off in accordance with FIG. 3.

(Circuit Operation in SB Mode)

Next, the circuit operation in the SB mode will be described with reference to FIGS. 11A to 12B.

Figure 11A:
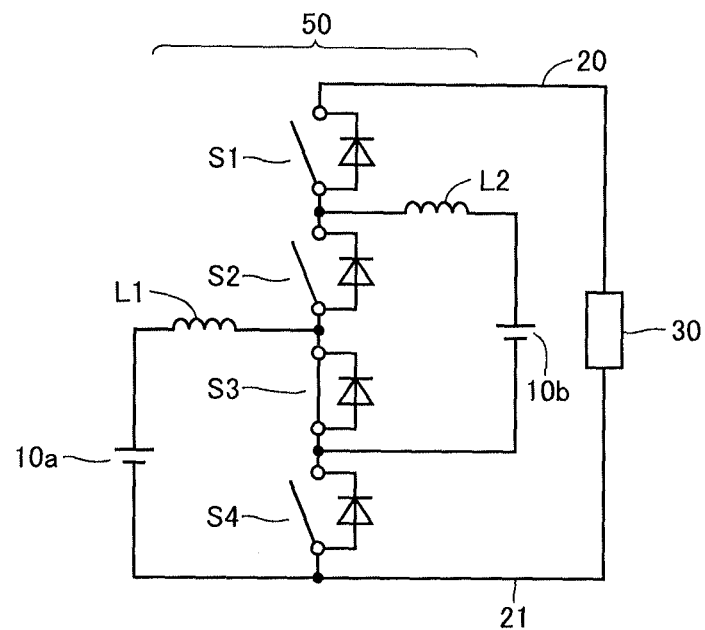
FIG. 11A is a first circuit diagram describing a circuit operation in the SB mode.
Figure 11B:
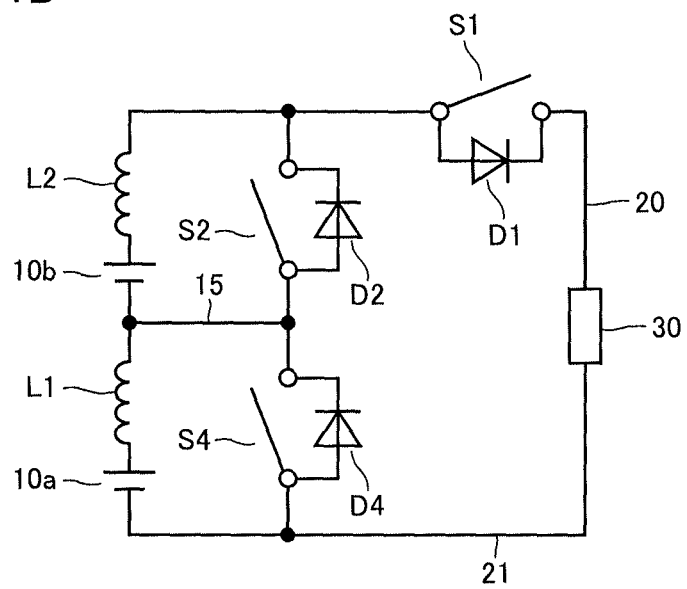
FIG. 11B is a second circuit diagram describing a circuit operation in the SB mode.

As shown in FIG. 11A, DC power supplies 10a and 10b can be connected in series to electric power line 20 by keeping switching element S3 on. FIG. 11B shows the equivalent circuit in this condition.

Referring to FIG. 11B, in the SB mode, it is possible to achieve the on-period and off-period of the lower arm element of the boost chopper circuit alternately between DC power supplies 10a and 10b and electric power line 20 which are connected in series, by commonly controlling on/off of switching elements S2 and S4. Switching element S1 operates as a switch for controlling regeneration from load 30 by being turned on during the off-period of switching elements S2 and S4. Switching element S3 kept on enables it to equivalently form a line 15 which connects reactor L1 with switching element S4.

Next, DC/DC conversion (boost operation) in the SB mode will be described with reference to FIGS. 12A and 12B.

Figure 12A:
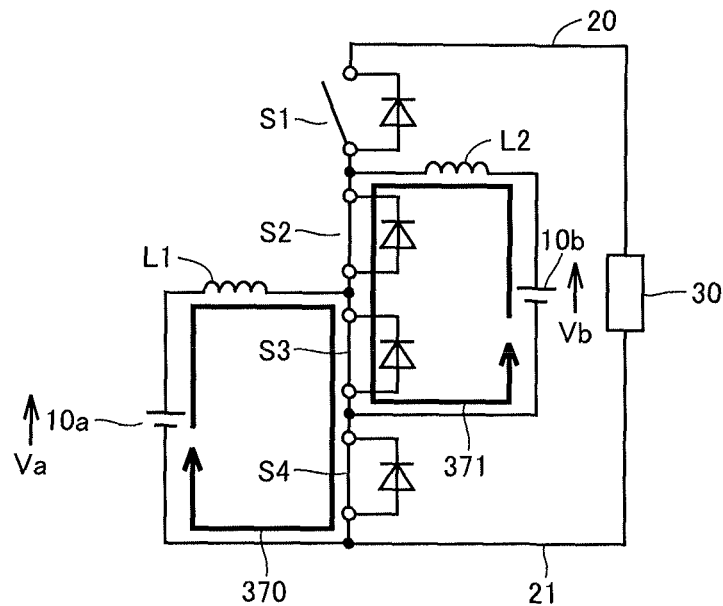
FIG. 12A is a first circuit diagram describing DC/DC conversion (boost operation) in the SB mode.

Referring to FIG. 12A, switching element S3 is kept on for connecting DC power supplies 10a and 10b in series, while the pair of switching elements S2, S4 is turned on and switching element S1 is turned off. As such, electric current paths 370 and 371 for accumulating energies in reactors L1 and L2 are formed. As a result, it is possible to achieve the on-condition of the lower arm element of the boost chopper circuit for DC power supplies 10a and 10b which are connected in series.

Figure 12B:
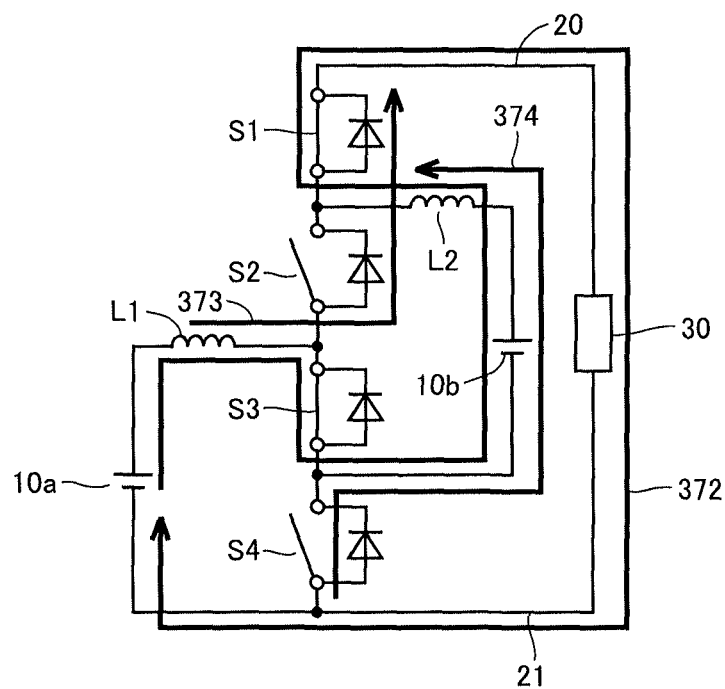
FIG. 12B is a second circuit diagram describing DC/DC conversion (boost operation) in the SB mode.

Meanwhile, referring to FIG. 12B, while switching element S3 is kept on, the pair of switching elements S2 and S4 is turned off and switching element S1 is turned on, contrary to FIG. 12A. As such, it is possible to form an electric current path 372. Electric current path 372 allows the total of energies from DC power supplies 10a and 10b connected in series and energies accumulated in reactors L1 and L2 to be output to electric power line 20. As a result, it is possible to achieve the on-condition of the upper arm element of the boost chopper circuit for DC power supplies 10a and 10b connected in series.

It is possible to form electric current paths 370 and 371 shown in FIG. 12A and electric current path 372 shown in FIG. 12B alternately, by alternately repeating the first period in which the pair of switching elements S2 and S4 is turned on while switching element S1 is turned off and the second period in which switching element S1 is turned on while the pair of switching elements S2 and S4 is turned off, with switching element S3 kept on.

In DC/DC conversion in the SB mode, the relationship represented by Expression (3) below holds among voltage Va of DC power supply 10a, voltage Vb of DC power supply 10b, and output voltage VH of electric power line 20. In Expression (3), Dc refers to a duty ratio during the first period in which the pair of switching elements S2 and S4 is turned on.

$$VH=1/(1-Dc)\cdot(Va+Vb) \quad (3)$$

However, the electric current values of reactors L1 and L2 are different at the end of the operation shown in FIG. 12A, if Va and Vb are different, and/or if inductances of reactors L1 and L2 are different. Accordingly, just after transition to the operation shown in FIG. 12B, a differential electric current will flow via an electric current path 373 if the electric current of reactor L1 is larger. Meanwhile, a differential current will flow via an electric current path 374 if the electric current of reactor L2 is larger.

Figures 13, 14:
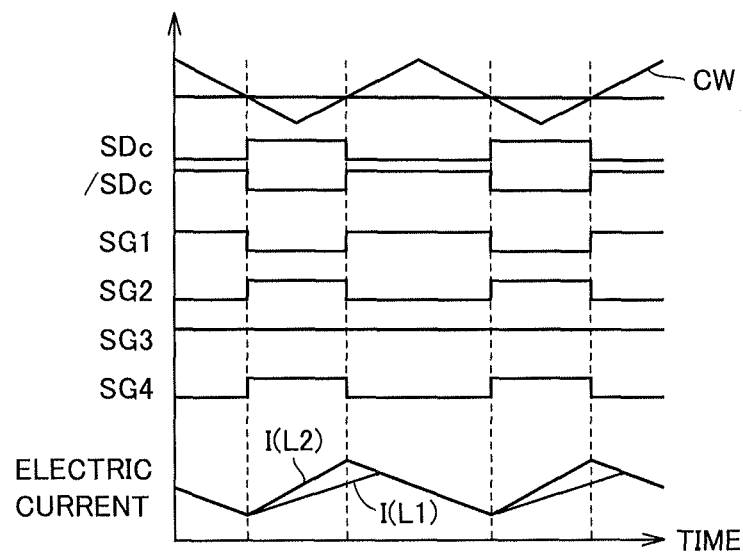
FIG. 13 is a waveform diagram showing an example of control operation for switching elements of the power converter in the SB mode.
FIG. 14 is a table for describing logical calculation expressions for setting a control signal for each switching element in the SB mode.

FIG. 13 shows a waveform diagram for describing an example of control operation for switching elements in the SB mode.

In the SB mode, as described in PTD 3, duty ratio Dc in Expression (3) is calculated so as to compensate for voltage deviation ΔVH (ΔVH=VH*−VH) of output voltage VH. Then, a control pulse signal SDc is generated based on voltage comparison between carrier wave CW and duty ratio Dc. A control pulse signal /SDc is an inversion signal of control pulse signal SDc. In the SB mode, DC/DC conversion between the DC voltage (Va+Vb) and output voltage VH is executed by the boost chopper circuit shown in FIG. 10.

As shown in FIG. 14, control signals SG1 to SG4 can be set based on the logical calculation of control pulse signal SDc (/SDc).

Control pulse signal SDc serves as control signals SG2 and SG4 for the pair of switching elements S2 and S4 constituting the lower arm element of the boost chopper circuit. Similarly, control signal SG1 for switching element S1 constituting the upper arm element of the boost chopper circuit is obtained by control pulse signal /SDc. As a result, the period during which the pair of switching elements S2 and S4 constituting the lower arm element is turned on and the period during which switching element S1 constituting the upper arm element is turned on are complementarily provided.

In the SB mode, bidirectional DC/DC conversion with electric power line 20 (load 30) is executed with DC power supplies 10a and 10b being connected in series. Therefore, output power Pa of DC power supply 10a and output power Pb of DC power supply 10b cannot be controlled directly. That is, the ratio between output power Pa and output power Pb of DC power supplies 10a and 10b is automatically determined by the ratio between voltages Va and Vb in accordance with Expression (4) below.

$$Pa:Pb=Va:Vb \quad (4)$$

The sum of output power from DC power supplies 10a and 10b (Pa+Pb) is input/output supplied to load 30, similarly to the PB mode.

(Processing of Selecting Control Mode)

Next, processing of selecting a control mode in the power converter control according to the present first embodiment will be described in detail.

Figures 15, 16:
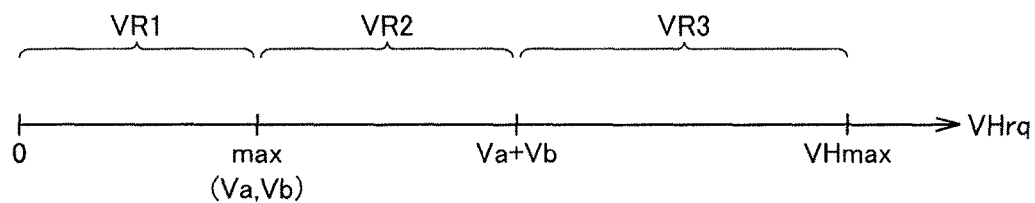
FIG. 15 is a table for comparing applicability of controlling a power distribution ratio between the DC power supplies in each operation mode shown in FIG. 3 and settable ranges of output voltage.
FIG. 16 is a conceptual view for describing the definition of a voltage range of a load request voltage.

FIG. 15 shows applicability of controlling a power distribution ratio (k) between DC power supplies 10a and 10b in each operation mode shown in FIG. 3 and settable ranges of output voltage VH.

Referring to FIG. 15, in the PB mode, power distribution ratio k between DC power supplies 10a and 10b can be controlled by setting the current command value for a DC power supply which is subject to current control. Power distribution ratio k is defined by the ratio of output power Pa of DC power supply 10a to total electric power PH (PH=Pa+Pb) (k=Pa/PH). That is, in the PB mode, power distribution ratio k can be set at any value within the range of 0 to 1.0. In the PB mode, output voltage VH can be controlled within the range from max (Va, Vb) which is the maximum value of voltages Va and Vb to upper limit voltage VHmax which is the control upper limit value of output voltage VH (max (Va, Vb)≤VH≤VHmax). As to max (Va, Vb), max (Va, Vb)=Va holds when Va>Vb holds, and max (Va, Vb)=Vb holds when Vb>Va holds. Upper limit voltage VHmax is the upper limit value determined taking the withstand voltages of components, and the like into consideration.

In the SB mode, power distribution ratio k is automatically determined by voltages Va and Vb as shown in Expression (4). Thus, output power Pa and output power Pb of DC power supplies 10a and 10b cannot be controlled independently. Output voltage VH cannot be set to be lower than (Va+Vb). In the SB mode, output voltage VH can be controlled within the range from (Va+Vb) to upper limit voltage VHmax (Va+Vb<VH≤VHmax).

Since only DC power supply 10a is used in the aB mode, power distribution ratio k is fixed at 1.0. Then, by controlling the boost chopper circuit shown in FIGS. 8A and 8B based on duty ratio Da in Expression (1), output voltage VH can be controlled within the range from max (Va, Vb) to upper limit voltage VHmax (max (Va, Vb)<VH≤VHmax).

Since only DC power supply 10b is used in the bB mode, power distribution ratio k is fixed at 0. Then, by controlling the boost chopper circuit shown in FIGS. 8A and 8B based on duty ratio Db in Expression (2), output voltage VH can be controlled within the range of max (Va, Vb) to VHmax (max (Va, Vb)<VH≤VHmax).

In the PD mode, DC power supplies 10a and 10b are connected in parallel to electric power line 20. Thus, power distribution ratio k is determined uniquely depending on the internal resistances of DC power supplies 10a and 10b. Therefore, output power Pa and output power Pb of DC power supplies 10a and 10b cannot be controlled independently. Specifically, using an internal resistance value Ra of DC power supply 10a and an internal resistance value Rb of DC power supply 10b, k=Rb/(Ra+Rb) holds. Moreover, since VH is fixed such that VH=Va (VH=Vb) holds, output voltage VH cannot be controlled depending on voltage command value VH*. As described above, the PD mode can be applied limitedly when the voltage difference between voltages Va and Vb is small.

In the SD mode, DC power supplies 10a and 10b are electrically connected in series to electric power line 20. Therefore, output voltage VH is fixed at Va+Vb. That is, output voltage VH cannot be controlled depending on voltage command value VH*. Power distribution ratio k cannot be controlled freely as it is automatically determined in accordance with voltages Va and Vb similarly to the SB mode.

Since the relation Va>Vb needs to be satisfied as described above when the aD mode is applied, DC power supply 10b is disconnected from electric power line 20, while DC power supply 10a is connected to electric power line 20. Therefore, output voltage VH is fixed at Va. Since electric power supply is executed only from DC power supply 10a, power distribution ratio k is fixed at 1.0.

Similarly, since the relation Vb>Va needs to be satisfied as described above when the bD mode is applied, DC power supply 10a is disconnected from electric power line 20, while DC power supply 10b is connected to electric power line 20. Therefore, output voltage VH is fixed at Vb. Since electric power supply is executed only from DC power supply 10b, power distribution ratio k is fixed at 0.

As understood from FIG. 15, in each operation mode, output voltage VH that can be output from power converter 50 has different ranges. In the PB mode, power distribution between DC power supplies 10a and 10b can be controlled, while in the remaining SB mode, SD mode, aB mode, bB mode, aD mode, bD mode, and PD mode, power distribution between DC power supplies 10a and 10b cannot be controlled freely.

Here, it is necessary to set output voltage VH supplied to load 30 to be more than or equal to a certain voltage depending on the operating condition of load 30. In the case where load 30 is configured to include motor-generator 35 as illustrate in FIG. 2, output voltage VH corresponding to the DC link side voltage of inverter 32 needs to be more than or equal to an induced voltage generated in coil winding (not shown) of motor-generator 35.

The range of torque that can be output by motor-generator 35 varies in accordance with output voltage VH. Specifically, as output voltage VH increases, the torque that can be output also increases. Therefore, for example, output voltage VH needs to fall within a voltage range in which motor-generator 35 can output torque corresponding to a torque command value determined by running control of the electric powered vehicle.

From these viewpoints, a load minimum voltage VHmin corresponding to the minimum value of output voltage VH for operating load 30 can be previously determined in accordance with the operating condition of load 30 (in the exemplary configuration of FIG. 2, the torque and the number of revolutions of motor-generator 35). Therefore, a load request voltage VHrq can be determined in correspondence with load minimum voltage VHmin.

Furthermore, when controlling torque of motor-generator 35, the phase of current for outputting the same torque varies with the DC link voltage (output voltage VH) of inverter 32. The ratio of output torque to the current amplitude in motor-generator 35, that is, motor efficiency, varies with the phase of current. Therefore, once the torque command value for motor-generator 35 is set, the optimum phase of current at which the efficiency in motor-generator 35 is maximized, that is, the power loss in motor-generator 35 is minimized, as well as output voltage VH for achieving this optimum phase of current can be determined in correspondence with the torque command value. In the present embodiment, it is preferable to set load request voltage VHrq taking the efficiency in load 30 into further consideration.

Taking these elements into consideration, load request voltage VHrq with respect to output voltage VH is set in accordance with the operating condition of load 30 (e.g., the torque and number of revolutions). Taking the induced voltage of motor-generator 35 into consideration as described above, VH needs to at least fall within the range where VH≥VHrq holds for controlling load 30. Furthermore, when setting such that VH=VHrq holds, the loss in load 30 can be suppressed. For the operating condition of load 30, it is also possible to set load request voltage VHrq using the operating condition of the electric powered vehicle on which motor-generator 35 is mounted (the vehicle speed, accelerator pedal position, etc).

It is therefore understood that the relation VH≥VHrq can be achieved depending on the range of load request voltage VHrq set in accordance with the operating condition of load 30, that is, the applicable operation mode differs.

Figures 17, 18:
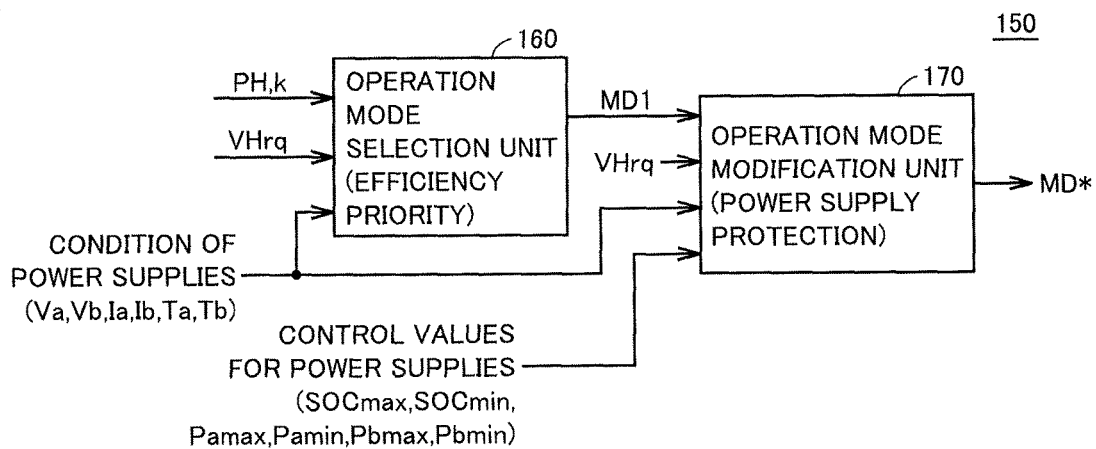
FIG. 17 is a table for describing selection of operation mode in each voltage range.
FIG. 18 is a functional block diagram showing a control configuration for selection of operation mode in the power converter in the power supply system according to the first embodiment of the present invention.

FIG. 16 shows the definition of voltage ranges VR1 to VR3 of load request voltage VHrq. FIG. 17 is a table for describing selection of operation mode in each voltage range.

Referring to FIG. 16, load request voltage VHrq is set to fall within any one of voltage range VR1 (VHrq≤max (Va, Vb)), VR2 (max (Va, Vb)<VHrq≤Va+Vb) and VR3 (Va+Vb<VHrq≤VHmax).

Referring to FIG. 17, it is not possible to match output voltage VH with load request voltage VHrq when load request voltage VHrq is in voltage range VR1 since power converter 50 cannot output a voltage lower than max (Va, Vb). Therefore, in voltage range VR1, the aD mode, the bD mode and the PD mode are selected as "an applicable operation mode group" in order to bring VH as close as possible to VHrq in the range where VH≥VHrq holds.

The applicable operation mode also differs in accordance with the relation between voltages Va and Vb, as described above. That is, when Va>Vb holds, only the aD mode is applicable, while the bD mode and the PD mode are not applicable. Similarly, when Vb>Va holds, only the bD mode is applicable, while the aD mode and the PD mode are not applicable. On the other hand, in the case where the voltage difference between Va and Vb is small so that it can be considered that Va=Vb holds, the aD mode, the bD mode and the PD mode can be applied.

In the aB mode, the bB mode and the PB mode belonging to the boosting mode, output voltage VH can be controlled in accordance with voltage command value VH* within the range of max (Va, Vb) to VHmax. On the other hand, in the SB mode, output voltage VH cannot be controlled to be lower than (Va+Vb). That is, within the range of (Va+Vb) to VHmax, output voltage VH can be controlled in accordance with voltage command value VH*.

In voltage range VR2, the aB mode, the bB mode and the PB mode are selected as an applicable operation mode group in light of the controllable range of output voltage VH in each operation mode described above. When these operation modes are applied, it is possible to match output voltage VH with load request voltage VHrq by setting VH* at VHrq. On the other hand, the aD mode, the bD mode and the PD mode are not applicable.

Furthermore, the SD mode is applicable in voltage range VR2 since the requirement of VH≥VHrq is satisfied. In the SD mode, the loss in power converter 50 is suppressed significantly, although it is not possible to match output voltage VH (VH=Va+Vb) with load request voltage VHrq. Therefore, it may be possible to suppress the overall loss in power supply system 5 more than in the case of applying the aB mode, the bB mode and the PB mode. Therefore, the SD mode can also be included in the applicable operation mode group in voltage range VR2. Conversely saying, the SB mode is excluded from the applicable operation mode group in voltage range VR2 since the difference between output voltage VH and load request voltage VHrq as well as the loss in power converter 50 are larger in the SB mode than in the SD mode.

In voltage range VR3, the PB mode, the SB mode, the aB mode, the bB mode, and the PB mode are selected as an applicable operation mode group in light of the controllable range of output voltage VH in each operation mode described above. When these operation modes are applied, it is possible to match output voltage VH with load request voltage VHrq by setting VH* at VHrq. On the other hand, each of the direct connection modes (aD mode, bD mode, PD mode, and SB mode) is not applicable.

FIG. 18 is a functional block diagram showing a control configuration for selection of operation mode in power converter 50 in the power supply system according to the first embodiment of the present invention.

The function of each block shown in each of the functional block diagrams including FIG. 18 which will be described below shall be implemented by software processing by control device 40 executing a predetermined program and/or hardware processing achieved by the operation of an exclusive electronic circuit.

Referring to FIG. 18, an operation mode control unit 150 for controlling operation mode selection in power converter 50 includes an operation mode selection unit 160 and an operation mode modification unit 170.

Operation mode selection unit 160 selects an operation mode for minimizing the overall loss in power supply system 5 (hereinafter, an "efficiency priority mode") based on load request voltage VHrq obtained in accordance with the operating condition of load 30 and based on the operating conditions of DC power supplies 10a and 10b (power supply condition), and generates a mode selection signal MD1 in accordance with the selection result. That is, mode selection signal MD1 is a signal indicating which one of the eight modes shown in FIG. 15 has been selected as the "efficiency priority mode." The power supply condition includes, for example, voltages Va, Vb, electric currents Ia, Ib, temperatures Ta, Tb, and the like. Output power Pa and output power Pb of DC power supplies 10a and 10b can be obtained from total electric power PH and power distribution ratio k. In this way, the efficiency priority mode corresponds to a "first operation mode."

Total electric power PH can be calculated in accordance with electric power for boosting/stepping-down which is determined depending on the voltage difference between output voltage VH of electric power line 20 and voltage command value VH*. Alternatively, it is also possible to calculate total electric power PH by further adding load power PL consumed by load 30. In the exemplary configuration of FIG. 2, load power PL can be estimated based on the operating condition (the number of revolutions and torque) of motor-generator 35. During power generation of load 30 (during regeneration of motor-generator 35), PL<0 is shown.

Operation mode modification unit 170 generates a mode selection instructing signal MD* indicating a selection result of a final operation mode based on mode selection signal MD1 received from operation mode selection unit 160 as well as the operating conditions of and limiting values for DC power supplies 10a and 10b. Mode selection instructing signal MD* is a signal indicating which one of the eight modes shown in FIG. 15 has been selected as the final operation. With the operation mode in accordance with mode selection instructing signal MD* being applied, power converter 50 executes DC/DC conversion between DC power supply 10a and/or DC power supply 10b and electric power line 20.

The restriction values (power supply restriction values) for DC power supplies 10a and 10b include a power upper limit value Pamax and a power lower limit value Pamin of DC power supply 10a, a power upper limit value Pbmax and a power lower limit value Pbmin of DC power supply 10b, as well as SOCmax indicating SOC upper limit values and SOCmin indicating SOC lower limit values of DC power supplies 10a and 10b. Although SOCmax and SOCmin will each be described below as a value common to DC power supplies 10a and 10b, the SOC upper and lower limit values may be determined individually for each DC power supply. Each power upper limit value indicates the upper limit value of discharging power, and is set at 0 or a positive value. When the power upper limit value is set at 0, it means that discharging from the DC power supply is forbidden. Similarly, each power lower limit value indicates the upper limit value of charging power, and is set at 0 or a negative value. When the power lower limit value is set at 0, it means that charging of the DC power supply is forbidden.

For example, power upper limit value Pamax and power lower limit value Pamin are set based on the SOC (State of Charge) and/of temperature Ta of DC power supply 10a and the like. For DC power supply 10b, power upper limit value Pbmax and power lower limit value Pbmin can also be set similarly.

Furthermore, power upper limit value PHmax and power lower limit value PHmin of DC power supplies 10a and 10b as a whole can be set. For example, setting can be made such that PHmax=Pamax+Pbmax and PHmin=Pamin+Pbmin hold. Load power PL also needs to be restricted to fall within the range of PHmax to PHmin. That is, an operation command value for load 30 to perform a regeneration operation or a power running operation is generated limitedly within the range where load power PL satisfies the relation PHmin≤PL≤PHmax. For example, in the exemplary configuration of FIG. 2, since load power PL generated by motor-generator 35 is determined by the product of torque and rotational speed, the torque command value is restricted according to necessity.

When SOC and/or output power have/has reached the power supply restriction values in at least one of DC power supplies 10a and 10b, operation mode modification unit 170 cancels selection of the operation mode in accordance with mode selection signal MD1 (efficiency priority mode), and generates mode selection instructing signal MID* to select an operation mode (PB mode) in which power distribution between DC power supplies 10a and 10b can be controlled. That is, setting is made such that MD*≠MD1 holds.

On the other hand, when SOC and output power have not reached the power supply restriction values in both of DC power supplies 10a and 10b, operation mode modification unit 170 maintains selection of the operation mode in accordance with mode selection signal MD1 (efficiency priority mode), and generates mode selection instructing signal MD*. That is, setting is made such that MD*=MD1 holds. The operation mode selected in replacement of the efficiency priority mode by operation mode modification unit 170 corresponds to a "second operation mode."

Next, selection of the efficiency priority mode in each of voltage ranges VR1 to VR3 will be described.

Figure 19:
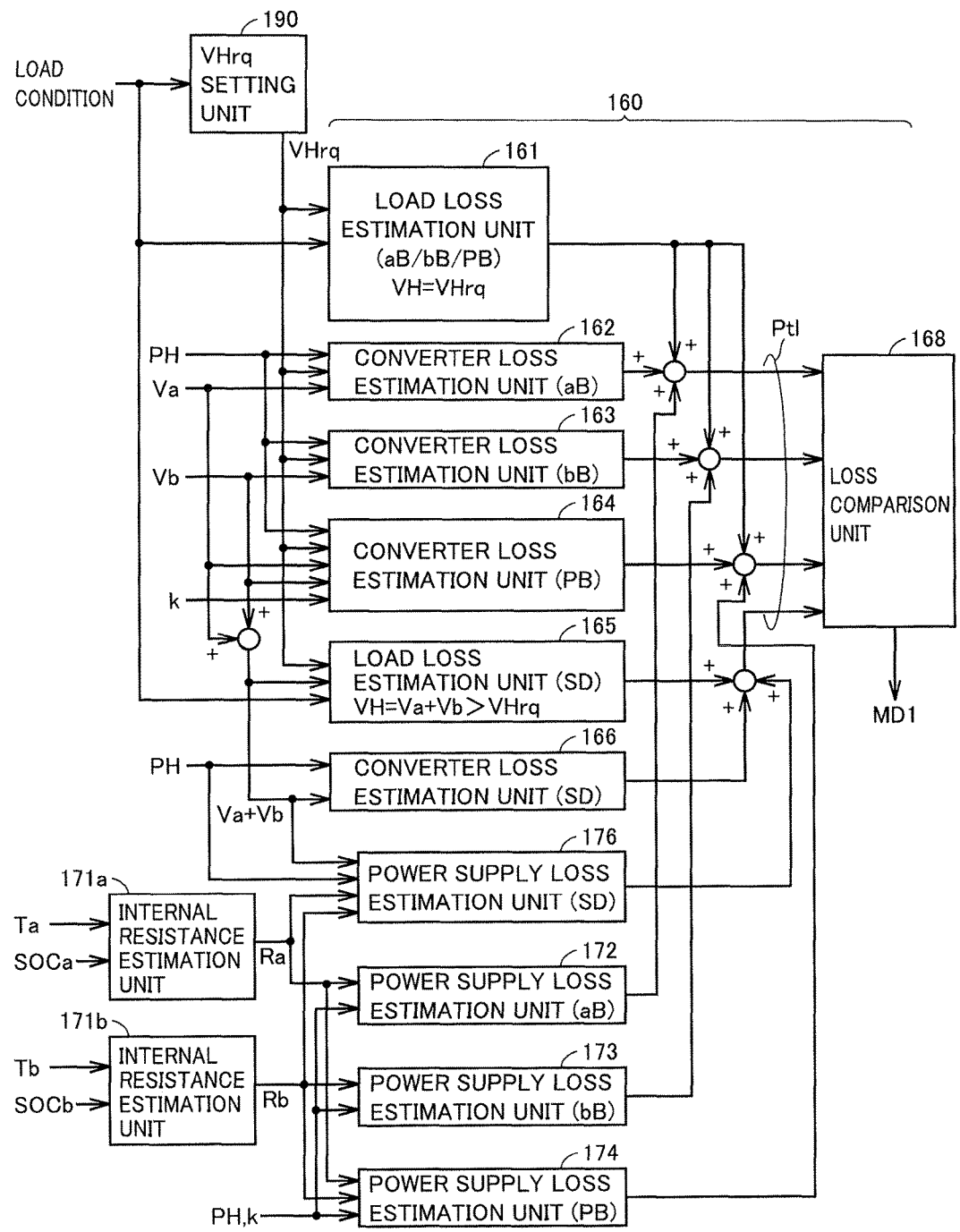
FIG. 19 is a first functional block diagram for describing functions of an operation mode selection unit.

FIG. 19 shows a functional block diagram for describing the functions of operation mode selection unit 160 in voltage range VR2.

Referring to FIG. 19, operation mode selection unit 160 includes load loss estimation units 161, 165, converter loss estimation units 162 to 164, 166, internal resistance estimation units 171a, 171b, power supply loss estimation units 172 to 174, 176, and a loss comparison unit 168.

A VHrq setting unit 190 sets load request voltage VHrq in accordance with the operating condition of load 30. When load 30 includes motor-generator 35 as in the exemplary configuration of FIG. 2, load request voltage VHrq can be determined based on the number of revolutions and torque of motor-generator 35. As described above, in power supply system 5, output voltage VH needs to be controlled to be more than or equal to load request voltage VHrq. VHrq setting unit 190 corresponds to a "request voltage setting unit."

As shown in FIG. 17, in voltage range VR2, the aB mode, the bB mode, the PB mode, and the SD mode are included in the applicable operation mode group. Operation mode selection unit 160 selects the efficiency priority mode from this operation mode group. In the aB mode, the bB mode and the PB mode in this operation mode group, output voltage VH can be controlled to be load request voltage VHrq by setting VH* at VHrq. On the other hand, in the SD mode, output voltage VH becomes (Va+Vb) which is higher than load request voltage VHrq.

Converter loss estimation unit 162 estimates a converter loss Plcv in power converter 50 when the aB mode is applied. Converter loss estimation unit 163 estimates converter loss Plcv in power converter 50 when the bB mode is applied.

Converter loss estimation unit 162 calculates an estimated value of converter loss Plcv in the aB mode as a function of voltage Va of DC power supply 10a, load request voltage VHrq (VHrq=VH in the aB mode), and total electric power PH (PH=Pa in the aB mode) in accordance with a preset map or calculation expression.

Similarly, converter loss estimation unit 163 calculates an estimated value of converter loss Plcv in the bB mode as a function of voltage Vb of DC power supply 10b, load request voltage VHrq (VHrq=VH in the bB mode), and total electric power PH (PH=Pb in the bB mode) in accordance with a preset map or calculation expression.

Converter loss estimation unit 164 estimates converter loss Plcv in power converter 50 when the PB mode is applied. An estimated value of converter loss Plcv in the PB mode can be calculated as a function of load request voltage VHrq (VHrq=VH in the PB mode) as well as voltages Va, Vb and output power Pa, output power Pb of DC power supplies 10a and 10b in accordance with a preset map or calculation expression. Output power Pa and output power Pb can be obtained from total electric power PH and power distribution ratio k. Power distribution ratio k on this occasion can be determined with reference to a map generated previously or the like based on, for example, the conditions of DC power supplies 10a and 10b (e.g., balance between SOCs or balance between upper limit power and lower limit power), the output power level (PH) or the like.

Converter loss estimation unit 166 estimates converter loss Plcv in power converter 50 when the SD mode is applied. Since on/off losses in the switching elements do not occur in the SD mode, converter loss Plcv will be proportional to electric current passing through power converter 50. Therefore, converter loss estimation unit 166 can calculate the converter loss as a function of total electric power PH (PH=Pa+Pb) and the voltage (Va+Vb) corresponding to output voltage VH in accordance with a preset map or calculation expression. The map or calculation expression used in each of load loss estimation units 161, 165 and converter loss estimation units 162 to 164 can be obtained previously based on experimental results, simulation results, or the like.

Figure 20:
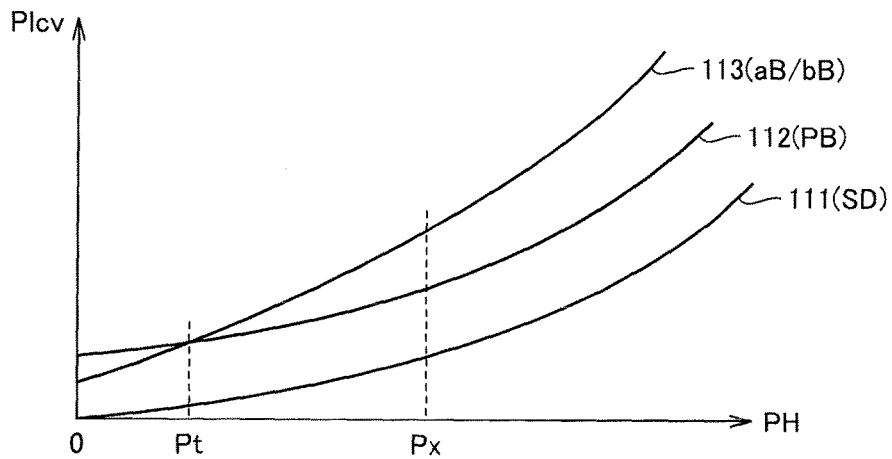
FIG. 20 is a conceptual view describing comparison of converter losses among the operation modes estimated by the configuration of FIG. 19.

FIG. 20 is a conceptual view for describing comparison of converter losses among the operation modes. In FIG. 20, the converter losses in voltage range VR2 estimated by the configuration of FIG. 19 are compared.

In FIG. 20, the horizontal axis indicates total electric power PH, and the vertical axis indicates converter loss Plcv. In the example of FIG. 20, power distribution ratio k in the PB mode is set at 0.5 (Pa=Pb), and Va, Vb (Va=Vb) and VHrq are set at predetermined constant values in each operation mode. The comparison among the operation modes is made setting such that Va+Vb>VHrq>Va (Vb) holds. That is, output voltage VH in the SD mode (VH=Va+Vb) is higher than output voltage VH in the aB mode, the bB mode and the PB mode (VH=VHrq). That is, in FIG. 20, converter loss Plcv is equivalent in the aB mode and the bB mode.

Referring to FIG. 20, converter loss Plcv increases with increase in total electric power PH, but differs in properties among the operation modes. Characteristic lines 111 to 113 respectively indicate changes in converter loss Plcv in the SD mode, PB mode, and the aB or bB mode with respect to changes in total electric power PH.

From the comparison among characteristic lines 111 to 113, converter loss Plcv is suppressed in the SD mode in which the on/off losses in the switching elements do not occur, as compared to the other operation modes. On the contrary, in the PB mode and the aB/bB mode, the power loss increases by turning switching elements S1 to S4 on/off.

Between the PB mode and the aB/bB mode, the magnitude of converter loss Plcv changes in accordance with the level of total electric power PH. Converter loss Plcv is likely to be smaller in the PB mode than in the aB/bB mode because of the effect that electric currents in DC/DC conversion performed by DC power supplies 10a and 10b as also described with reference to FIGS. 7A to 8B counteract each other, excluding a low load region (the region where PH<Pt holds in FIG. 20). On the other hand, in the PB mode, iron losses occur both in reactors L1 and L2, while in the aB/bB mode, an iron loss occurs only in one of reactors L1 and L2. Therefore, since the influence on total electric power PH caused by the iron losses in the reactors is larger in the low load region, converter loss Plcv is likely to be smaller in the aB/the bB mode than in the PB mode.

In this way, converter loss Plcv in each operation mode can be estimated based on voltages Va, Vb of DC power supplies 10a, 10b, output voltage VH (VHrq), and total electric power PH.

Referring again to FIG. 19, load loss estimation unit 161 estimates a load loss Plld when the aB mode, the bB mode and the PB mode have been selected. In these operation modes, output voltage VH can be controlled to be load request voltage VHrq by setting VH* at VHrq. Therefore, load loss estimation unit 161 calculates an estimated value of load loss Plld when VH=VHrq holds as a function of the operating condition of load 30 including load request voltage VHrq, in accordance with a preset map or calculation expression.

Load loss estimation unit 165 estimates load loss Plld when the SD mode has been selected. In the SD mode, output voltage VH becomes (Va+Vb) which is higher than load request voltage VHrq. Therefore, load loss estimation unit 165 calculates an estimated value of load loss Plld when VH=Va+Vb holds as a function of the operating condition of load 30 and voltage (Va+Vb), in accordance with a preset map or calculation expression.

Figure 21:
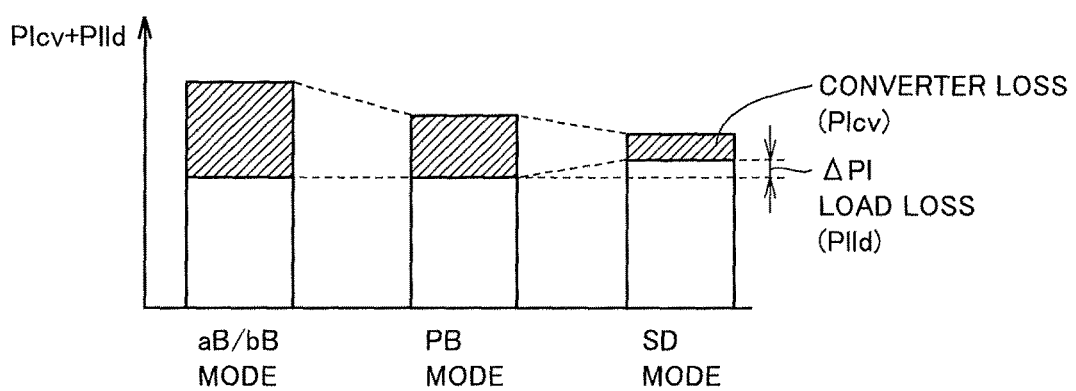
FIG. 21 is a conceptual view describing comparison of overall system losses among the operation modes estimated by the configuration of FIG. 19.

FIG. 21 is a schematic diagram for comparing the sum of converter loss and load loss among the operation modes. In FIG. 21, a total loss Ptl when PH=Px holds in FIG. 20 in voltage range VR2 is compared among the operation modes.

Since Va+Vb>VHrq holds in voltage range VR2, the loss in load 30 increases when the SD mode is applied as compared to the cases where the aB/bB mode and the PB mode are applied. An increment ΔPlld of load loss Plld in the SD mode increases as the voltage difference between voltage (Va+Vb) and load request voltage VHrq increases.

On the other hand, converter loss Plcv is minimized in the SD mode, as shown in FIG. 20. Therefore, if the decrement of converter loss Plcv exceeds increment ΔPlld of the load loss by applying the SD mode, the sum of converter loss Plcv and load loss Plld is minimized in the SD mode. As a result, in the example of FIG. 21, the SD mode is dominant as the efficiency priority mode.

Since converter loss Plcv and load loss Plld change with changes in the operating conditions of load 30 and DC power supplies 10a, 10b, it is understood that the efficient operation mode in which the sum of these losses is minimized also changes. Therefore, in order to select the efficiency priority mode accurately, it is preferable to estimate converter loss Plcv and load loss Plld for each operation mode in accordance with the operating conditions at present, as shown in FIG. 19. Even if total electric power PH is identical, losses produced in DC power supplies 10a and 10b (power supply losses) due to internal resistances change depending on operation mode selection. Particularly in the PB mode, it is expectable that the power supply losses are reduced by the effect of distribution of electric currents Ia and Ib. Therefore, it is also preferable to estimate power supply loss Plps for each operation mode in accordance with the operating conditions at present.

Referring again to FIG. 19, internal resistance estimation unit 171a estimates internal resistance value Ra of DC power supply 10a in accordance with temperature Ta and SOCa indicating the condition of DC power supply 10a. Similarly, internal resistance estimation unit 171b estimates internal resistance value Rb of DC power supply 10b in accordance with temperature Tb and SOCb indicating the condition of DC power supply 10b. The functions of internal resistance estimation units 171a and 171b can be achieved by previously creating a map reflecting the property relation of the temperature and SOC with the internal resistance values, obtained by, for example, prototype tests or the like.

Power supply loss estimation unit 176 estimates power supply loss Plps when the SD mode is applied. The estimated value of power supply loss Plps in the SD mode can be calculated as a function of estimated internal resistance values Ra, Rb (Ra+Rb), total electric power PH, and voltage (Va+Vb), in accordance with a preset map or calculation expression. Power supply loss estimation unit 172 estimates power supply loss Plps when the aB mode is applied. The estimated value of power supply loss Plps in the aB mode can be calculated as a function of estimated internal resistance value Ra and output power Pa (Pa=PH·k), in accordance with a preset map or calculation expression. Similarly, power supply loss estimation unit 173 estimates power supply loss Plps when the bB mode is applied. The estimated value of power supply loss Plps in the bB mode can be calculated as a function of estimated internal resistance value Rb and output power Pb (Pb=PH·(1−k)), in accordance with a preset map or calculation expression. Power supply loss estimation unit 174 estimates power supply loss Plps when the PB mode is applied. The estimated value of power supply loss Plps in the PB mode can be calculated as a function of estimated internal resistance values Ra, Rb as well as output power Pa and output power Pb calculated from PH and k, in accordance with a preset map or calculation expression.

Total loss Ptl when the aB mode selection has been selected is estimated in accordance with the sum of load loss Plld estimated by load loss estimation unit 161, converter loss Plcv calculated by converter loss estimation unit 162, and power supply loss Plps calculated by power supply loss estimation unit 172. Similarly, total loss Ptl when the bB mode has been selected is estimated in accordance with the sum of load loss Plld calculated by load loss estimation unit 161, converter loss Plcv estimated by converter loss estimation unit 163, and power supply loss Plps calculated by power supply loss estimation unit 173.

Total loss Ptl when the PB mode has been selected is calculated in accordance with the sum of load loss Plld estimated by load loss estimation unit 161, converter loss Plcv estimated by converter loss estimation unit 164, and power supply loss Plps calculated by power supply loss estimation unit 174. Furthermore, total loss Ptl when the SD mode has been selected is calculated in accordance with the sum of load loss Plld estimated by load loss estimation unit 165, converter loss Plcv estimated by converter loss estimation unit 166, and power supply loss Plps calculated by power supply loss estimation unit 176.

Loss comparison unit 168 compares total loss Ptl in each of the ab mode, the bB mode, the PB mode, and the SD mode estimated as described above to thereby select an operation mode in which total loss Ptl is minimized as the efficiency priority mode. Furthermore, loss comparison unit 168 generates mode selection signal MD1 for indicating the efficiency priority mode.

Referring again to FIG. 17, in voltage range VR2, operation mode selection unit 160 selects the efficiency priority mode in accordance with evaluation of total loss with the configuration shown in FIG. 19.

In voltage range VR1, operation mode control unit 150 selects an operation mode from among the aD mode, the bD mode and the PD mode included in the applicable operation mode group. However, if the voltage difference between DC power supplies 10a and 10b is large as described above, the aD mode (when Va>Vb holds) or the bD mode (when Vb>Va holds) is automatically selected as the operation mode. At this time, there is no choice to select the efficiency priority mode, but the aD mode or the bD mode is designated by mode selection instructing signal MD*.

When the voltage difference between DC power supplies 10a and 10b is smaller than a predetermined value (when Va=Vb holds), operation mode selection unit 160 selects the efficiency priority mode from among the aD mode, the bD mode and the PD mode included in the applicable operation mode group. Basically, converter loss Plcv is minimized in the PD mode when identical total electric power PH is supplied from DC power supplies 10a and 10b by the direct connection mode because of the effect of distribution of electric currents. Therefore, the PD mode is selected as the efficiency priority mode when Va=Vb holds in voltage range VR1.

Since VHrq>Va+Vb holds in voltage range VR3, electric currents with respect to identical load power can be suppressed upon setting VH at VHrq by applying the SB mode. Therefore, the SB mode can be basically selected as the efficiency priority mode from among the PB mode, the SB mode, the aB mode, and the bB mode included in the applicable operation mode group.

On the other hand, when the PB mode is applied, power supply loss Plps may be suppressed exceeding the current reduction effect achieved by the SB mode, because of the effect of distribution of electric currents Ia and Ib. Therefore, in voltage range VR3, it is also preferable to estimate total loss Ptl for each operation mode in accordance with the operating conditions at present. In voltage range VR3, output voltage VH can be controlled to be load request voltage VHrq by setting VH* at VHrq in any of the PB mode, the SB mode, the aB mode, and the bB mode included in the applicable operation mode group. Therefore, in voltage VR3, the sum of converter loss Plcv and power supply loss Plps as total loss Ptl can be compared among the FIG. 50 shows a functional block diagram for describing functions of operation mode selection unit 160 in voltage range VR3.

Figure 50:
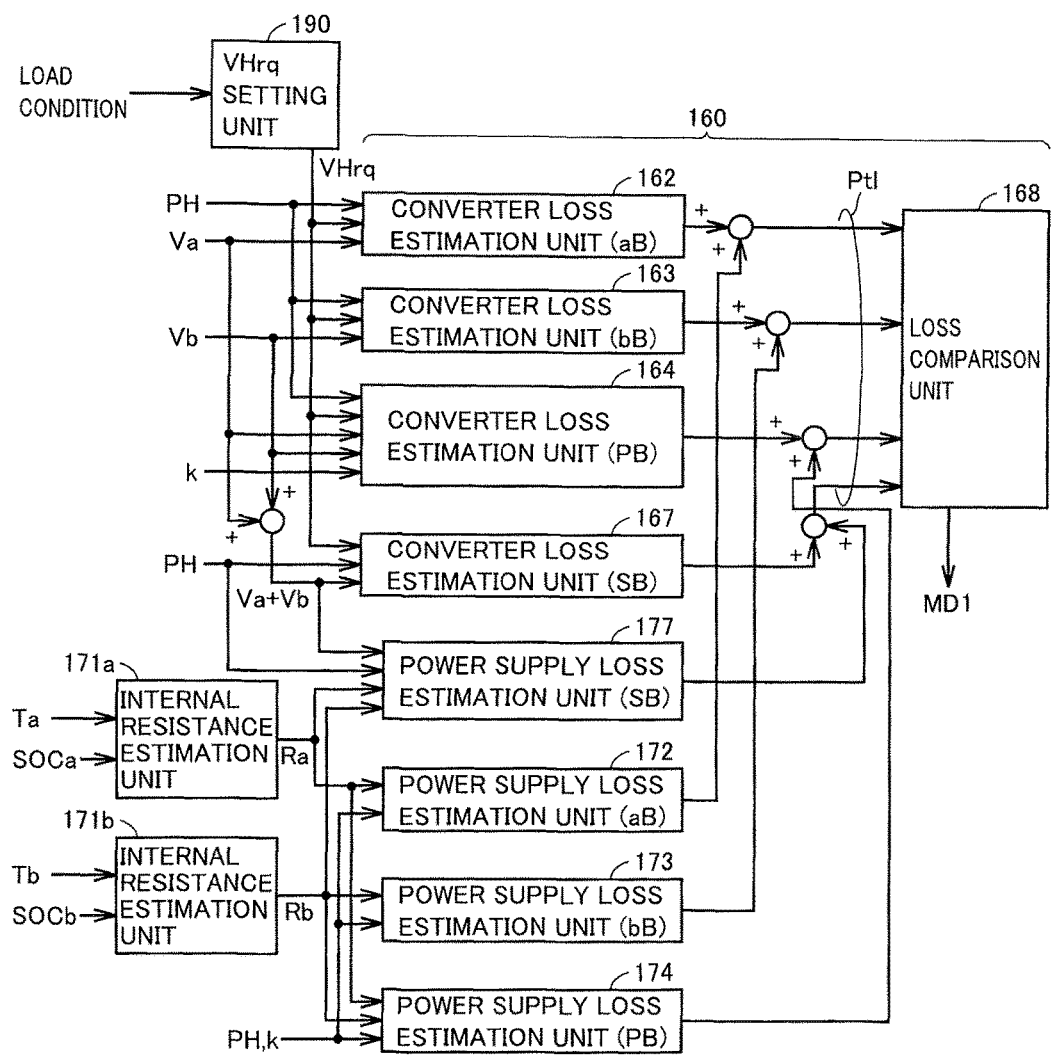
FIG. 50 is a second functional block diagram for describing functions of the operation mode selection unit.

Referring to FIG. 50, operation mode selection unit 160 includes converter loss estimation units 162 to 164, 167, internal resistance estimation units 171a, 171b, power supply loss estimation units 172 to 174, 177, and loss comparison unit 168.

Converter loss Plcv when the aB mode, the bB mode and the PB mode are applied is estimated by converter loss estimation units 162 to 164 similar to those shown in FIG. 19 based on the operating conditions at present, in accordance with a preset map or calculation expression. Converter loss estimation unit 167 calculates an estimated value of converter loss Plcv in the SB mode as a function of voltage Va+Vb, load request voltage VHrq and total electric power PH, in accordance with a preset map or calculation expression.

Power supply loss Plps when the aB mode, the bB mode and the PB mode are applied is estimated by power supply loss estimation units 172 to 174 similar to those shown in FIG. 19 based on the operating conditions at present in accordance with a preset map or calculation expression. Power supply loss estimation unit 177 calculates an estimated value of converter loss Plcv in the SB mode as a function of estimated internal resistance values Ra, Rb (Ra+Rb), voltage Va+Vb and total electric power PH, in accordance with a preset map or calculation expression.

As a result, total loss Ptl when the aB mode has been selected is estimated in accordance with the sum of converter loss Plcv calculated by converter loss estimation unit 162 and power supply loss Plps calculated by power supply loss estimation unit 172. Similarly, total loss Ptl when the bB mode has been selected is estimated in accordance with the sum of converter loss Plcv estimated by converter loss estimation unit 163 and power supply loss Plps calculated by power supply loss estimation unit 173. Total loss Ptl when the PB mode has been selected is calculated in accordance with the sum of converter loss Plcv estimated by converter loss estimation unit 164 and power supply loss Plps calculated by power supply loss estimation unit 174. Total loss Ptl when the SB mode has been selected is calculated in accordance with the sum of converter loss Plcv estimated by converter loss estimation unit 167 and power supply loss Plps calculated by power supply loss estimation unit 177.

Loss comparison unit 168 compares total loss Ptl in each of the ab mode, the bB mode, the PB mode, and the SB mode estimated as described above to thereby select an operation mode in which total loss Ptl is minimized as the efficiency priority mode, and generates mode selection signal MD1 for indicating the selected efficiency priority mode.

Next, the functions exerted by operation mode modification unit 170 will be described with reference to FIGS. 22 to 25.

Figures 22, 23:
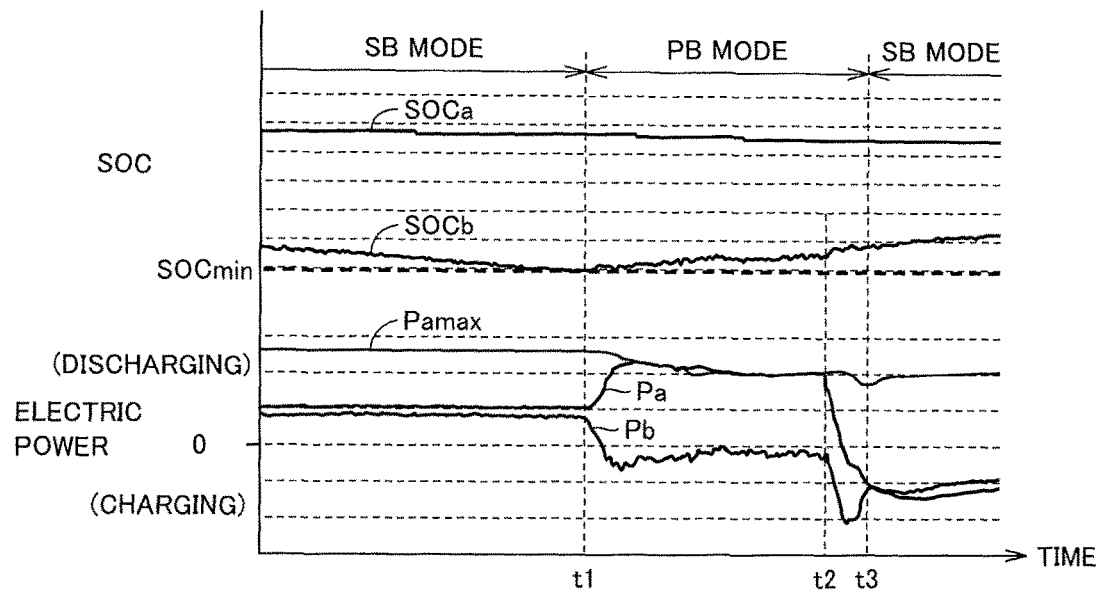
FIG. 22 is a waveform diagram for describing an example of operation of an operation mode modification unit shown in FIG. 18.
FIG. 23 is a table showing modification of operation mode selection performed by the operation mode modification unit in each voltage range.

FIG. 22 is a waveform diagram showing an example of operation of operation mode modification unit 170. FIG. 22 shows an example of operation in voltage range VR3.

Referring to FIG. 22, before time t1, the SB mode selected as the efficiency priority mode in voltage range VR3 is applied, and power converter 50 operates. Therefore, electric power Pa and electric power Pb (Pa>0, Pb>0) are output from DC power supplies 10a and 10b at a constant ratio in accordance with power distribution ratio k determined uniquely by voltages Va and Vb, so that electric power is supplied to load 30. Output power Pa of DC power supply 10a is sufficient with respect to power upper limit value Pamax.

FIG. 22 shows an operation when the full charge capacity of DC power supply 10b is smaller than the full charge capacity of DC power supply 10b. Therefore, SOC (SOCb) of DC power supply 10b drops at a rate faster than SOC (SOCa) of DC power supply 10a while output power Pa and output power Pb are substantially equivalent.

Then, at time t1, SOCb reaches an SOC lower limit value SOCmin which is one of the power supply restriction values. Thus, from the viewpoint of power supply protection, it is necessary to stop discharging from DC power supply 10b. In the SB mode, however, the output power of DC power supply 10b cannot be controlled although the loss in power supply system 5 is suppressed. Therefore, operation mode modification unit 170 sets mode selection instructing signal MD* to select the PB mode in which power distribution between DC power supplies 10a and 10b can be controlled, in replacement of the SB mode which is the efficiency priority mode.

After time t1, the PB mode is applied, and power converter 50 operates. Accordingly, output power Pa of DC power supply 10a increases, while output power Pb of DC power supply 10b decreases. Even if power distribution is modified, total electric power PH required to be supplied to load 30 can be ensured by maintaining PH at Pa+Pb.

Furthermore, by increasing output power Pa such that Pa>PL holds within the range where Pa≤Pamax holds, DC power supply 10b whose SOC has reached the power supply restriction value can be charged with the surplus of Pa with respect to load power PL (Pb<0). Such an operation can be achieved by, for example, setting the current command value for a DC power supply to be subject to current control. Accordingly, SOCb starts to increase while SOCa continues decreasing gradually.

At time t2, the operating condition of load 30 changes, and regenerative power from load 30 is supplied to electric power line 20. In the exemplary configuration of load 30 shown in FIG. 2, regenerative power generation is started by operation of a brake pedal in the electric powered vehicle on which motor-generator 35 is mounted. As a result, DC power supplies 10a and 10b are both charged. Distribution of charging power for DC power supplies 10a and 10b on this occasion can also be controlled in the PB mode.

Since SOCb is recovered further, modification of operation mode selection performed by operation mode modification unit 170 is terminated at time t3. As a result, after time t3, the SB mode which is the efficiency priority mode is selected again, and power converter 50 operates.

When terminating the operation mode selection, it is preferable to prevent occurrence of so-called chattering by which the operation mode is switched again to the PB mode immediately after return to the efficiency priority mode. For example, if output power reaches the power supply restriction value in at least one of DC power supplies 10*a* and 10*b* immediately after return to the efficiency priority mode (SB mode), the PB mode will be selected again for power supply protection, which would result in chattering.

FIG. 51 is a flowchart describing control processing when terminating modification of operation mode selection. For example, sequential control processing in accordance with the flowchart is executed by operation mode modification unit 170 for each control period by control device 40 executing a previously stored program.

Referring to FIG. 51, control device 40 (operation mode modification unit 170) executes operations in steps S110 to S150 which will be described below for preventing chattering during modification of operation mode selection (Yes in S100).

In step S110, operation mode modification unit 170 determines whether or not SOC and output power have reached the power supply restriction values in each of DC power supplies 10*a* and 10*b* with the operation mode at present after modification being applied. In the case where DC power supplies 10*a* and 10*b* have returned from the state where they fall under the power supply restriction values (Yes in S110) and return to the efficiency priority mode is possible, operation mode modification unit 170 calculates in step S120 estimated values of power command values Pa* and Pb* when the efficiency priority mode indicated by mode selection signal MD1 is applied. For example, when the efficiency priority mode is the SB mode, power command values Pa* and Pb* when the efficiency priority mode is applied can be estimated from power distribution ratio k determined uniquely from voltages Va and Vb as well as total electric power PH at present (PH*).

Furthermore, in step S130, operation mode modification unit 170 compares estimated power command values Pa* and Pb* with the power supply restriction values (Pamax, Pbmax, Pamin, and Pbmin). Then, only when estimated power command values Pa* and Pb* have not reached the power supply restriction values (Yes in S130), operation mode modification unit 170 advances the process to step S140 to terminate modification of operation mode selection. Accordingly, the efficiency priority mode is selected next from the subsequent control period.

On the other hand, when DC power supplies 10*a* and 10*b* have not returned from the state where they fall under the power supply restriction values (NO in S110), operation mode modification unit 170 in step S150 maintains modification of operation mode, and selects the PB mode. Furthermore, even if DC power supplies 10*a* and 10*b* have returned from the state where they fall under the power supply restriction values (Yes in S110), operation mode modification unit 170 advances the process to step S150 when trial calculation values of power command values Pa* and Pb* when the efficiency priority mode is applied have reached the power supply restriction values (NO in S130) to maintain modification of operation mode. This is because, in this case, if modification of operation mode selection is terminated and the efficiency priority mode is applied, the operation mode will have to be modified again for power supply protection, which would cause chattering.

In this way, by controlling whether or not operation mode modification unit 170 terminates the operation mode modification to return to the efficiency priority mode in accordance with the flowchart shown in FIG. 51, the operation mode can be prevented from chattering when terminating the operation mode modification.

FIG. 22 illustrates the operation in the case where SOC reaches SOCmin by discharging of the DC power supply. In the case where SOC reaches SOCmax by charging of a DC power supply, the increase in SOC of that DC power supply can be suppressed similarly by selecting the PB mode.

FIG. 23 shows a list of modification of operation modes performed by operation mode modification unit 170 in each voltage range.

Referring to FIG. 23, since VH>VHrq has to hold in voltage range VR1, the aD mode, the bD mode or the PD mode is selected as the efficiency priority mode in accordance with the relation between voltages Va and Vb so as to reduce the voltage difference from load request voltage VHrq. In these efficiency priority modes, however, even if SOC and/or output power reach/reaches the power supply restriction values in one of the DC power supplies, that DC power supply cannot be protected. Therefore, operation mode modification unit 170 generates mode selection instructing signal MD* so as to select the PB mode.

On this occasion, it is necessary to set voltage command value VH* at least to be higher than max (Va, Vb). This is for avoiding a short-circuit current from occurring between DC power supplies 10*a* and 10*b*.

In voltage range VR2, the efficiency priority mode is selected in accordance with the evaluation of total loss described with reference to FIGS. 19 to 21. Then, if SOC and/or input/output power of DC power supply 10*a* reach/reaches the power supply restriction values when the aB mode has been selected, or if SOC and/or input/output power of DC power supply 10*b* reach/reaches the power supply restriction values when the bB mode has been selected, operation mode modification unit 170 generates mode selection instructing signal MD* so as to select the PB mode.

If SOC and/or output power of either of DC power supplies 10*a* and 10*b* in the series-connected condition reach/reaches the power supply restriction values when the SD mode has been selected, operation mode modification unit 170 generates mode selection instructing signal MD* so as to select the PB mode.

In voltage range VR3, the SB mode is selected as the efficiency priority mode as described above. Then, if SOC and/or output power of either of DC power supplies 10*a* and 10*b* reach/reaches the power supply restriction values when the SB mode has been selected, operation mode modification unit 170 generates mode selection instructing signal MD* so as to select the PB mode.

Accordingly, if SOC or output power of either DC power supply reaches the restriction value with the SB mode in which power distribution cannot be freely controlled having been selected, the operation mode can be modified to the PB mode in which the output power of DC power supplies 10*a* and 10*b* can be controlled, thereby protecting each power supply.

Figure 24:
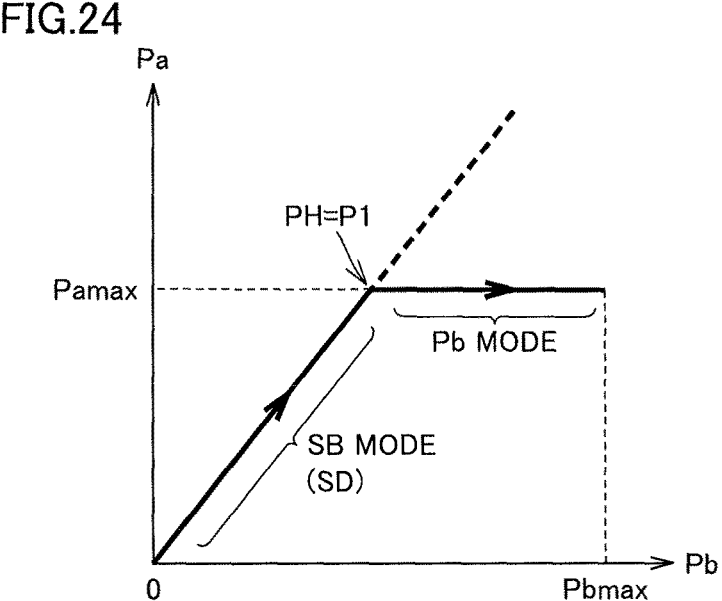
FIG. 24 is a conceptual view for describing a first example of modification of the operation mode selection performed by the operation mode modification unit.

FIG. 24 shows an example of modification from the SB mode or the SD mode to the PB mode as an example of operation performed by operation mode modification unit 170.

Referring to FIG. 24, when the SD mode has been selected as the efficiency priority mode in voltage range VR2, or when the SB mode has been selected as the efficiency priority mode in voltage range VR3, output power Pa and output power Pb each increase at a constant ratio in accordance with the voltage ratio with increase in total electric power PH. Since Pamax<Pbmax holds as shown in FIG. 24, Pa reaches Pamax in a stage where PH becomes equal to P1. For this reason, in order to cope with further increase in total electric power PH, it is necessary to control power distribution between output power Pa and output power Pb. Therefore, operation mode modification unit 170 modifies operation mode selection so as to select the PB mode in replacement of the efficiency priority mode. As a result, total electric power PH can be supplied even in the range where PH>P1 holds while maintaining the relation Pa≤Pamax, that is, while protecting DC power supply 10*a* from overpower.

Figure 25:
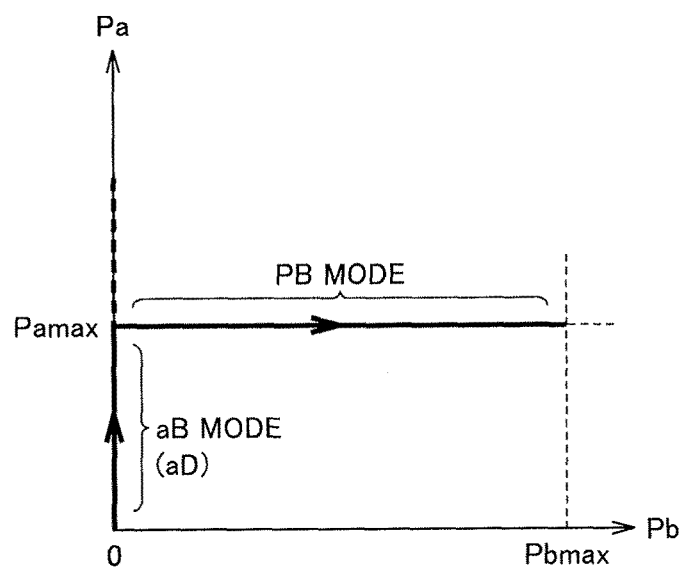
FIG. 25 is a conceptual view for describing a second example of modification of the operation mode selection performed by the operation mode modification unit.

FIG. 25 shows an example of modification from the aB mode or the aD mode to the PB mode as another example of operation performed by operation mode modification unit 170.

Referring to FIG. 25, if the aB mode has been selected as the efficiency priority mode in voltage range VR2, or if the aD mode has been selected as the efficiency priority mode in voltage range VR1, electric power is output to electric power line 20 only with the output of DC power supply 10*a*. Therefore, output power Pa alone increases with increase in total electric power PH.

For this reason, when output power Pa reaches Pamax, it is necessary to output electric power also from DC power supply 10*b* and to control power distribution between DC power supplies 10*a* and 10*b* in order to cope with further increase in total electric power PH.

Therefore, operation mode modification unit 170 modifies operation mode selection so as to select the PB mode in replacement of the efficiency priority mode. As a result, total electric power PH can be supplied even in the range where PH>Pamax holds while maintaining the relation Pa≤Pamax, that is, while protecting DC power supply 10*a* from overpower.

As described above, through control exerted by the power supply system according to the present first embodiment, the operation mode can be selected such that total loss Ptl is minimized in accordance with the operating conditions at present. Furthermore, if SOC and/or output power of a DC power supply reach/reaches the restriction values, the operation mode can be modified so as to avoid further charging/discharging of the DC power supply. As a result, the operation mode in power converter 50 can be appropriately selected so as to simultaneously achieve improvement in overall efficiency of the system and protection of each DC power supply from overcharge and overdischarge.

Selection of the efficiency priority mode made by operation mode selection unit 160 can be achieved with any technique provided that an operation mode in which the overall loss in the power supply system is minimized under the operating conditions at present is selected. For example, it is also possible to configure operation mode selection unit 160 such that the efficiency priority mode is directly determined based on the operating conditions of load 30 and DC power supplies 10*a*, 10*b*, rather than performing estimation calculation of total loss Ptl each time as in the exemplary configuration shown in FIG. 19.

When load 30 shown in FIG. 2 is mounted on a hybrid vehicle including an engine for generating vehicle driving force, vehicle driving force can be ensured by the output from the engine, even if the output of load 30 (motor-generator 35) is reduced. Therefore, when the power supply system according to the present embodiment is mounted on a hybrid vehicle, in the state where either of DC power supplies 10*a* and 10*b* falls under the power supply restriction values during application of the series mode (SB mode or SD mode), protection of DC power supplies 10*a* and 10*b* can also be achieved by reducing load power PL while maintaining the series mode, besides the alternative of modifying the operation mode to the PB mode. This is because, in a hybrid vehicle, the running driving force can be ensured in the vehicle as a whole by increasing the engine output, even if the output of motor-generator 35 is reduced.

Therefore, in a hybrid vehicle in which a user is allowed to select a driving mode of giving first priority to power efficiency (fuel efficiency), when that driving mode has been selected, it is also possible to exert control to restrict load power PL in the series mode instead of the operation mode modification performed by operation mode modification unit 170. In this case, with the series mode being maintained, the output (representatively, the torque) of motor-generator 35 is restricted such that load power PL falls within the range where min(Pamin/k, PLminb/(1−k))≤PL≤max (Pamax/k, Pbmax/(1−k)) holds. Then, the power supply system can be controlled to give priority to improvement in system efficiency over ensuring of the load power, in correspondence with the driving mode selection performed by a user. In other words, from the viewpoint of effectively utilizing DC power supplies 10*a* and 10*b* to ensure the load power, it can be said that the operation mode modification performed by operation mode modification unit 170 is advantageous.

Variation of First Embodiment

In a variation of the first embodiment, phase control of carrier waves (hereinafter, carrier phase control) in pulse width modulation control in the PB mode and SB mode in which both of DC power supplies 10*a* and 10*b* are used will be described.

Figure 26:
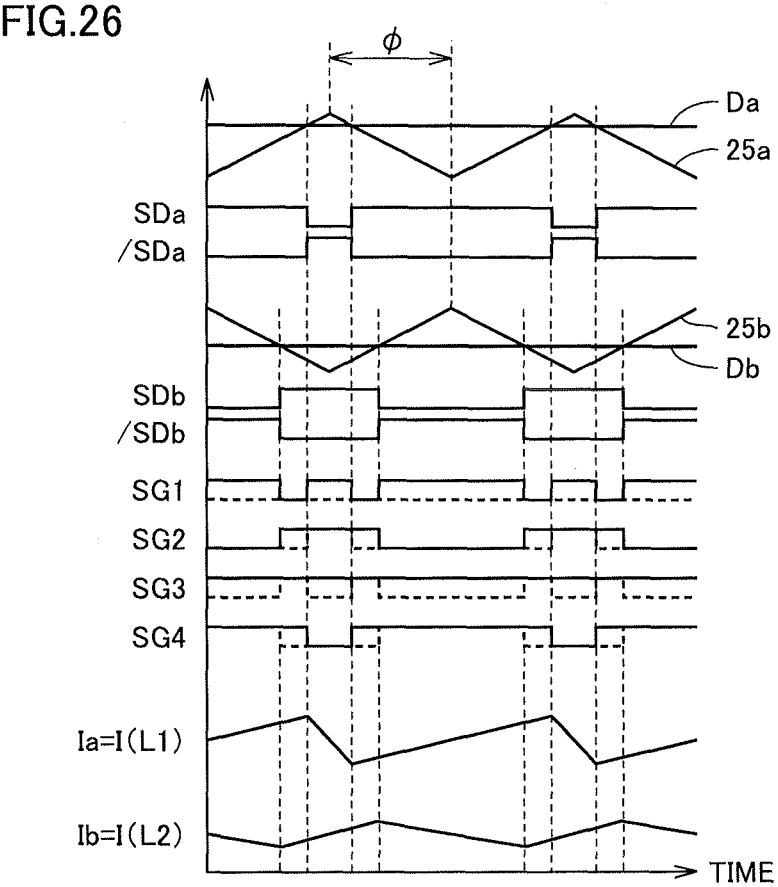
FIG. 26 is a waveform diagram showing an example of control operation in the PB mode when carrier phase control is applied by means of power converter control according to a variation of the present first embodiment.

FIG. 26 shows an example of control operation in the PB mode when intentionally providing a phase difference between carrier waves CWa and CWb.

Referring to FIG. 26, carrier wave CWa and carrier wave CWb have the same frequency, but a phase difference φ is provided therebetween. In the example of FIG. 26, phase difference φ is 180 degrees.

Similarly to the case where φ=0 degree holds as shown in FIG. 9, control pulse signal SDa is generated based on the comparison between carrier wave CWa and duty ratio Da, while control pulse signal SDb is generated based on the comparison between carrier wave CWb and duty ratio Db.

Duty ratios Da and Db shown in FIG. 26 have values equal to those shown in FIG. 9. Accordingly, control pulse signal SDa shown in FIG. 26 has the same length of H-level period as control pulse signal SDa shown in FIG. 9, despite different phase between these signals. Similarly, control pulse signal SDb shown in FIG. 26 has the same length of H-level period as control pulse signal SDb shown in FIG. 9, despite different phase between these signals.

Accordingly, it is possible to achieve control signals SG1 to SG4 shown in FIG. 26 with waveforms different from those of control signals SG1 to SG4 shown in FIG. 9 by providing phase difference φ between carrier waves CWa and CWb. From the comparison between FIGS. 9 and 26, it is understood that the phase relationship (phase of current) between electric current I(L1) and electric current I(L2) is changed by varying phase difference φ between carrier waves CWa and CWb.

Meanwhile, it is understood that average values of electric currents I(L1) and I(L2) are equivalent in FIGS. 9 and 26, with respect to the same duty ratios Da and Db. Namely, the outputs of DC power supplies 10*a* and 10*b* are controlled according to duty ratios Da, Db, and not affected by variation in phase difference φ between carrier waves CWa and CWb.

Accordingly, in the variation of the first embodiment, carrier phase control for appropriately adjusting phase difference $\phi$ between carrier waves CWa and CWb is performed in the PB mode, making it possible to reduce switching losses in switching elements S1 to S4.

A description will hereinafter be made on a typical example of control in a condition that both of DC power supplies 10a and 10b are in powering condition, namely in a condition satisfying relations of electric current I(L1)>0 and electric current I(L2)>0.

Figure 27:
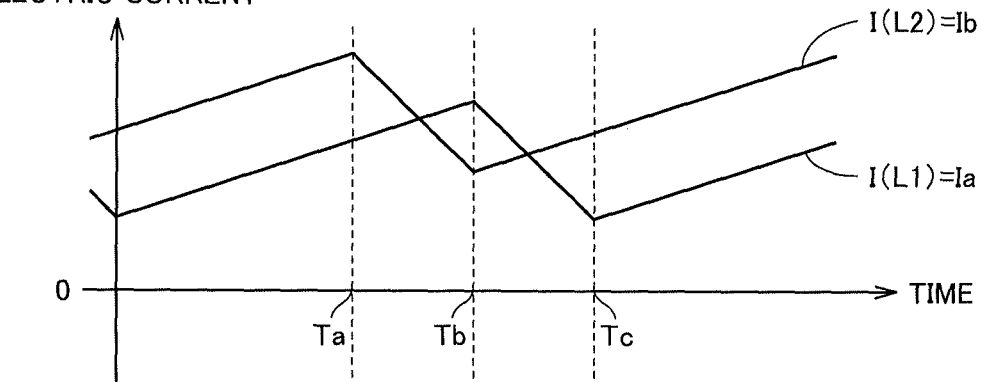
FIG. 27 is a waveform diagram describing a phase of current resulting from carrier phase control in the PB mode.

FIG. 27 is a waveform diagram describing a phase of current achieved by carrier phase control in power converter 50 in the PB mode.

With reference to FIG. 27, switching elements S2 to S4 are turned on until time Ta. Thus, the lower arm element of the boost chopper circuit is turned on for both of DC power supplies 10a and 10b. As such, both of electric currents I(L1) and I(L2) increase.

Switching element S2 is turned off at time Ta, making it possible to achieve a condition that the lower arm element of the boost chopper circuit for DC power supply 10b is turned off, and then start the falling in electric current I(L2). While switching element S2 is turned off, switching element S1 is turned on.

After time Ta, the lower arm element of the boost chopper circuit for DC power supply 10a is turned on, while the lower arm element of the boost chopper circuit for DC power supply 10b is turned off. Namely, electric current I(L2) decreases while electric current I(L1) increases. In this instance, the electric current path of power converter 50 is shown in FIG. 28A.

Figure 28A:
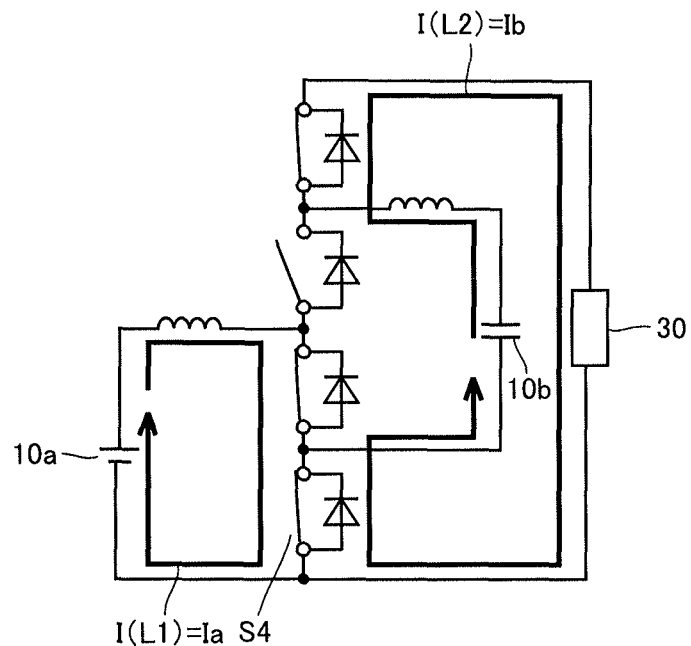
FIG. 28A is a first circuit diagram describing an electric current path in a predetermined period of FIG. 27.

As understood from FIG. 28A, after time Ta, a differential current between electric currents I(L1) and I(L2) flows through switching element S4. Namely, the electric current flowing through switching element S4 decreases.

Referring again to FIG. 27, when switching element S4 is turned off after time Ta, the lower arm element of the boost chopper circuit for DC power supply 10a is turned off, allowing electric current I(L1) to start decreasing. When switching element S2 is turned on, the lower arm element of the boost chopper circuit for DC power supply 10b is turned on, allowing electric current I(L2) to start increasing again. Namely, the electric current path in power converter 50 changes from the condition shown in FIG. 28A into the condition shown in FIG. 28B. In the condition shown in FIG. 28B, the differential current between electric currents I(L1) and I(L2) flows through switching element S2, so that the electric current flowing through switching element S2 decreases.

It is possible to reduce an electric current during turn-off period of switching element S4, namely, the switching loss by turning off switching element S4 in the condition shown in FIG. 28A. In addition, it is possible to reduce an electric current during turn-on period of switching element S2, namely, the switching loss by turning on switching element S2 in the condition shown in FIG. 28B.

Accordingly, the phase of current, namely, phase difference $\phi$ between carrier waves CWa and CWb, can be adjusted such that the falling initiation timing of electric current I(L1) (local maximum) coincides with the rising timing of electric current I(L2) (local minimum). Accordingly, at time Tb shown in FIG. 27, switching element S2 is turned on, while switching element S4 is turned off.

Referring again to FIG. 27, at time Tc, switch element S1 is turned off, while switching element S4 is turned on. This enables it to turn on the lower arm element of the boost chopper circuit for each of DC power supplies 10a and 10b, reproducing the abovementioned state prior to time Ta to increase both of electric currents I(L1) and I(L2).

Figure 29A:
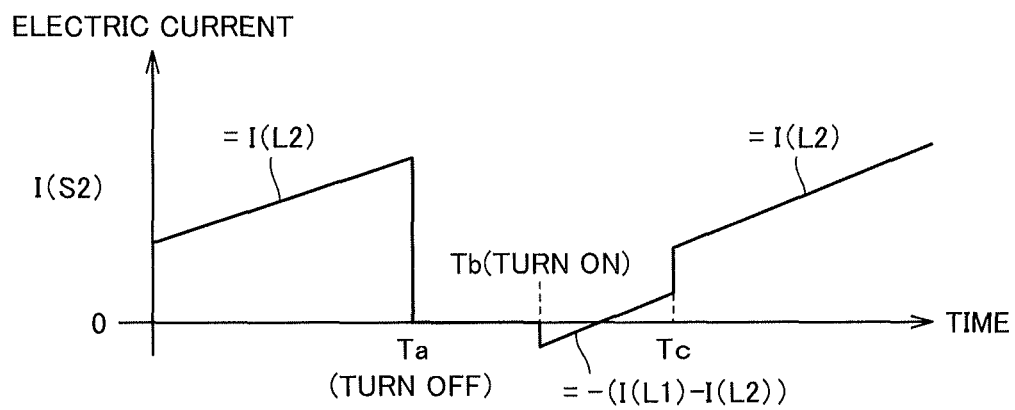
FIG. 29A is a first waveform diagram of an electric current of a switching element under the phase of current shown in FIG. 27.
Figure 29B:
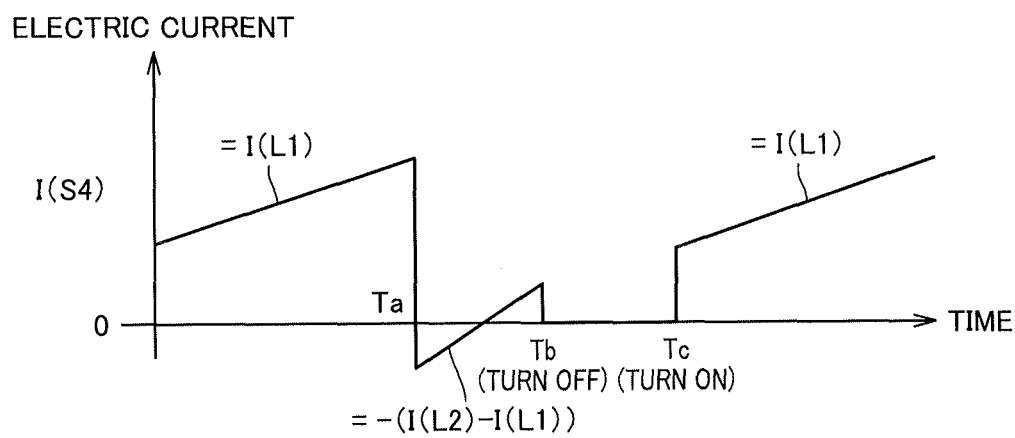
FIG. 29B is a second waveform diagram of an electric current of a switching element under the phase of current shown in FIG. 27.

FIGS. 29A and 29B show electric current waveforms of switching elements S2 and S4 having the phase of current shown in FIG. 27. FIG. 29A shows a waveform of electric current I(S2) of switching element S2. FIG. 29B shows a waveform of electric current I(S4) of switching element S4.

Figure 28B:
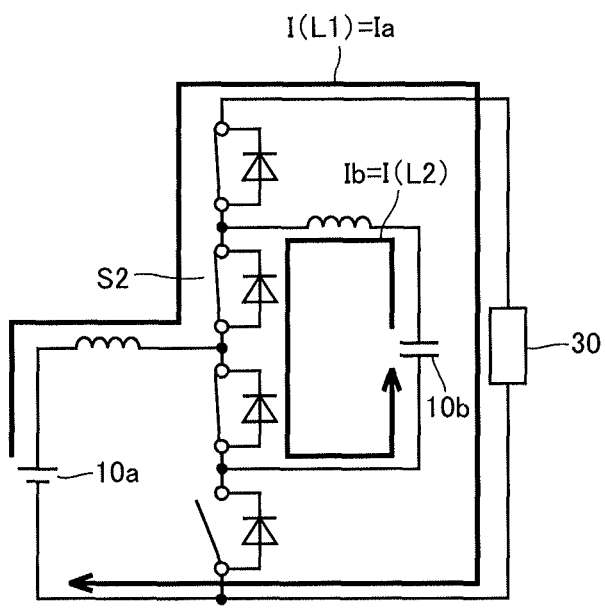
FIG. 28B is a second circuit diagram describing an electric current path in the predetermined period of FIG. 27.

Referring to FIG. 29A, electric current I(S2) satisfies a relation of I(S2)=I(L2) during the period before time Ta and after time Tc. Since switching element S2 is turned off during the period from time Ta to Tb, I(S2)=0 holds. During the period from time Tb to Tc, I(S2)=-(I(L1)-I(L2)) holds as shown in FIG. 28B.

Referring to FIG. 29B, electric current I(S4) satisfies a relation of I(S4)=I(L1) during the period before time Ta and after time Tc. During the period from time Ta to Tb, I(S4)=-(I(L2)-I(L1)) holds as shown in FIG. 28A. Since switching element S4 is turned off during the period from time Tb to Tc, I(S4)=0 holds.

Figure 30:
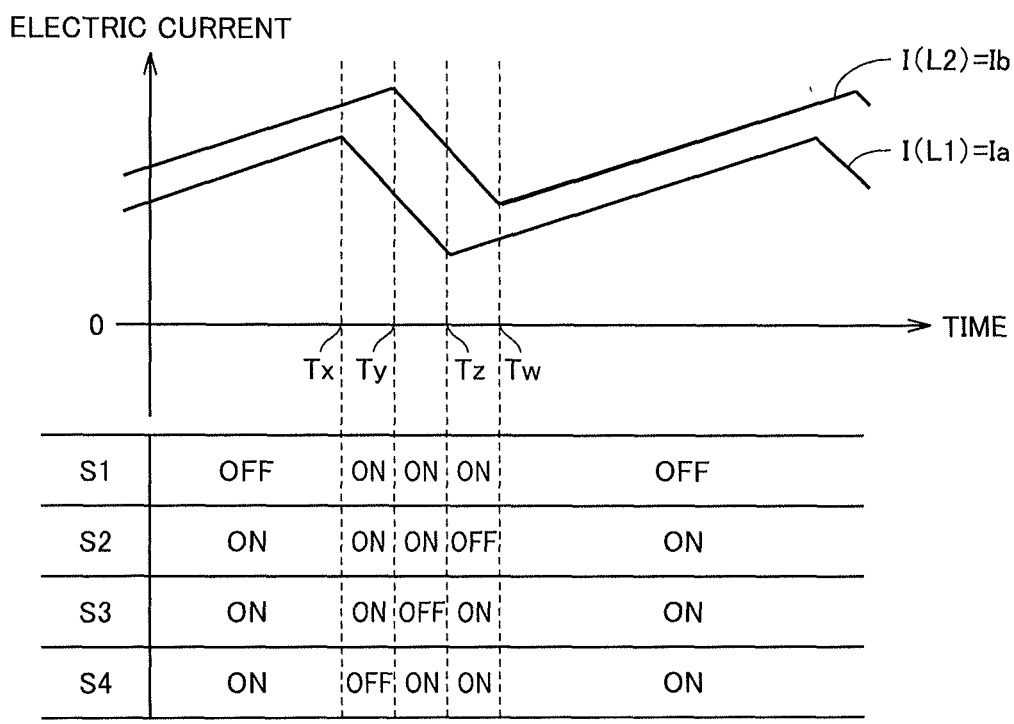
FIG. 30 is a waveform diagram of a phase of current when a phase difference between carrier waves equals to zero.

FIG. 30 shows a phase of current when phase difference $\phi$ between the carrier waves is set at 0 under duty ratios equivalent to those shown in FIG. 27, for comparison with FIG. 27.

Referring to FIG. 30, when phase difference $\phi$ between carrier waves CWa and CWb is equal to 0, electric current I(L1) is different from electric current I(L2) in the rising/falling timing (Tx, Ty, Tz, Tw). Tx, Ty, Tz and Tw are different values.

Specifically, prior to time Tx when switching element S1 is turned off while switching elements S2 to S4 are turned on, both of electric currents I(L1) and I(L2) increase. Then, when switching element S4 is turned off at time Tx, electric current I(L1) starts falling. Switching element S1 is turned on, when switching element S4 is turned off.

Then, when switching element S3 is turned off at time Ty, electric current I(L2) starts falling. Switching element S4 is turned on, when switching element S3 is turned off. Accordingly, both of electric currents I(L1) and I(L2) decrease.

At time Tz, switching element S2 is turned off, while switching element S3 is turned on. Accordingly, the lower arm element of the boost chopper circuit is turned on for DC power supply 10a, so that electric current I(L1) increases again. Furthermore, at time Tw, switching element S1 is turned off, while switching element S2 is turned on. As such, the state prior to time Tx is reproduced to increase both of electric currents I(L1) and I(L2).

Figure 31A:
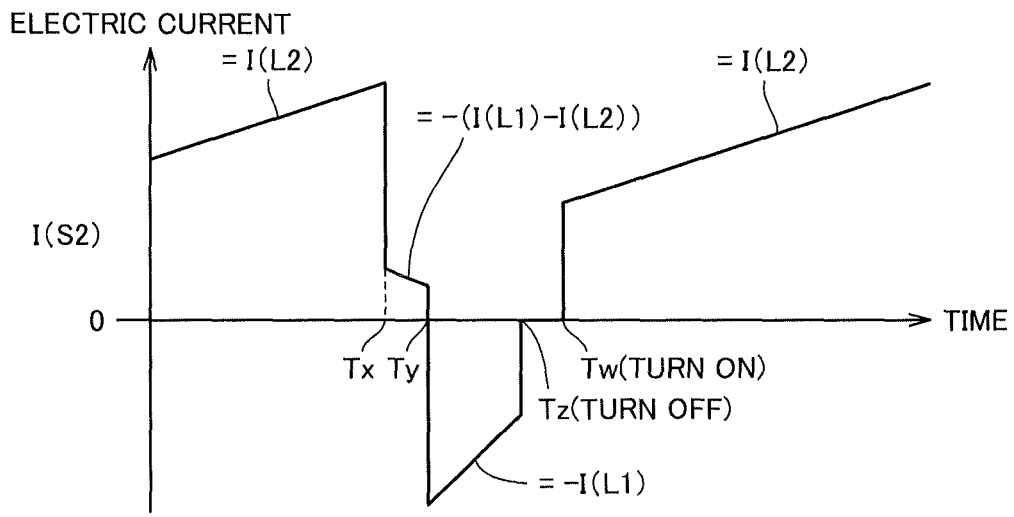
FIG. 31A is a first waveform diagram of an electric current of a switching element under the phase of current shown in FIG. 30.
Figure 31B:
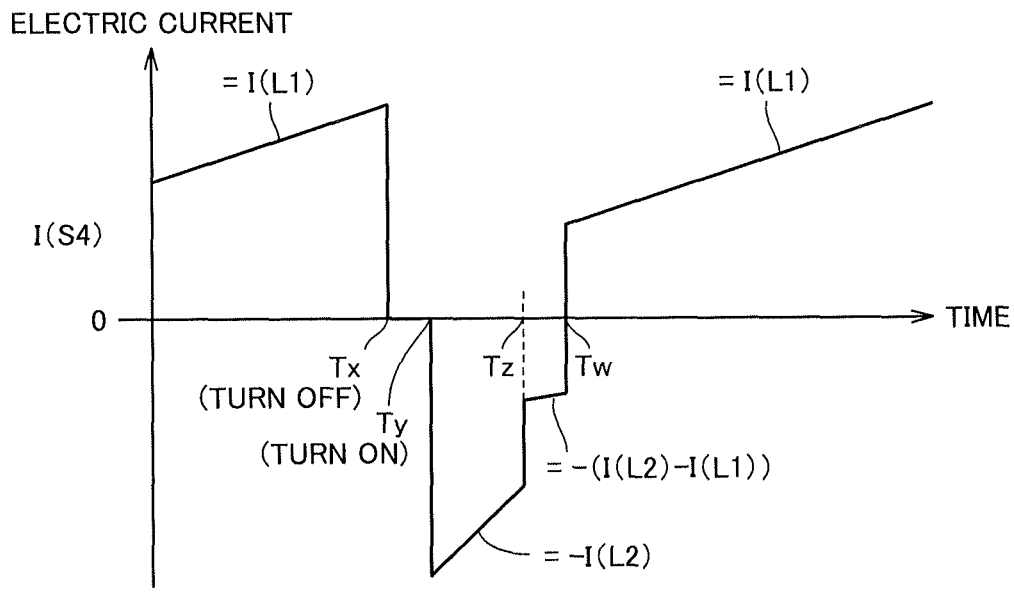
FIG. 31B is a second waveform diagram of an electric current of a switching element under the phase of current shown in FIG. 30.

FIGS. 31A and 31B show the electric current waveforms of switching elements S2 and S4 under the phase of current shown in FIG. 30. FIG. 31A shows a waveform of electric current I(S2) of switching element S2, FIG. 31B shows a waveform of electric current I(S4) of switching element S4.

Referring to FIG. 31A, electric current I(S2) satisfies the relation of I(S2)=I(L2) during the period before time Tx and after time Tw. During the period from time Tx to Ty, an electric current path similar to that shown in FIG. 28B is formed, so that I(S2)=-(I(L1)-I(L2)) holds. During the period from time Ty to Tz, switching element S2 operates as the upper arm element for DC power supply 10a, so that I(S2)=-I(L1) holds. During the period from time Ty to Tz in which both of electric currents I(L1) and I(L2) decrease, switching element S2 operates as the upper arm element for DC power supply 10a, so that I(S2)=-I(L1) holds. During the period from time Tz to Tw, switching element S2 is turned off, so that I(S2)=0 holds.

Referring to FIG. 31B, electric current I(S4) satisfies the relation of I(S4)=I(L1) during the period before time Tx and after time Tw. During the period from time Tx to Ty, switching element S4 is turned off, so that I(S4)=0 holds. During the period from time Ty to Tz in which both of electric currents I(L1) and I(L2) decrease, switching element S4 operates as the upper arm element for DC power supply 10b, so that I(S4)=−I(L2) holds. During the period from time Tz to Tw, an electric current path similar to that shown in FIG. 28A is formed, so that I(S2)=−(I(S2)−I(L1)) holds.

From the comparison of electric current I(S2) generated at time Tb shown in FIG. 31A with electric current I(S2) generated at time Tw shown in FIG. 31A, it is understood that the turn-on electric current of switching element S2, that is, the switching loss during turn-on period is reduced by adjusting phase difference φ to obtain the phase of current shown in FIGS. 29A and 29B. From the comparison of electric current I(S2) during the period from time Tb to Tc shown in FIG. 29A with electric current I(S2) during the period from time Ty to Tz shown in FIG. 31A, it is understood that the conduction loss in switching element S2 is also reduced.

Similarly, from the comparison of electric current I(S4) generated at time Tb shown in FIG. 29B with electric current I(S4) generated at time Tx shown in FIG. 31B, it is understood that the turn-off electric current of switching element S4, that is, the switching loss during turn-off period is reduced by adjusting phase difference φ to obtain the phase of current shown in FIG. 27. From the comparison of electric current I(S4) during the period from time Ta to Tb shown in FIG. 29B with electric current I(S4) during the period from time Ty to Tz shown in FIG. 31B, it is understood that the conduction loss in switching element S4 is also reduced.

With phase difference φ provided between carrier waves CWa and CWb, it is possible to reduce the losses in switching elements S1 to S4. As shown in FIG. 27, when both of DC power supplies 10a and 20 are in powering condition, it is possible to suppress the losses in switching elements S1 to S4 by setting phase difference φ such that the falling initiation timing (local maximum) of electric current I(L1) coincides with the rising initiation timing (local minimum) of electric current I(L2), namely, such that the turn-on timing of switching element S2 coincides with the turn-off timing of switching element S4.

As a result, it is possible to perform DC power conversion with high efficiency between DC power supplies 10a and 20 and electric power line 20 (load 30). Such a phase difference φ allows the falling timing (or rising timing) of control pulse signal SDa to coincide with the rising timing (or falling timing) of control pulse signal SDb. In other words, it is necessary to adjust phase difference φ such that the transition timing of pulse of control pulse signal SDa coincides with the transition timing of pulse of control pulse signal SDb. The transition timing indicates the timing when the H level/L level of pulse.

As understood from FIGS. 9 and 26, control pulse signals SDa and SDb vary in accordance with duty ratios Da and Db. Accordingly, it is understood that phase difference φ that can achieve the phase of current shown in FIG. 27, namely, phase difference φ obtained by carrier phase control is also determined in accordance with duty ratios Da and Db. As such, it is possible to previously obtain the relationship between duty ratios Da, Db and phase difference φ obtained by carrier phase control, and previously store the relationship as a map (hereinafter may be also referred to as "phase difference map") or a function (hereinafter may be also referred to as a "phase difference calculation formula") in control device 40.

It is possible to calculate phase difference φ for performing the carrier phase control based on duty ratios Da and Db having been calculated under the PWM control for performing the current control of DC power supplies 10a and 10b in the PB mode. Then, it is possible to achieve DC/DC conversion with high efficiency with reduced losses in switching element S1 to S4 by generating carrier waves CWa and CWb so as to obtain phase difference φ as calculated.

Description has been made as to the condition in which DC power supplies 10a and 20 are both in powering condition, with reference to FIGS. 27 to 31B. Similar carrier phase control can be executed in other conditions.

FIG. 32 is a table for describing the carrier phase control according to the first embodiment of the present invention in each operating condition of the DC power supplies.

Referring to FIG. 32, in a condition A, both of DC power supplies 10a and 10b are in powering condition described above. As shown in FIG. 27, phase difference φ of the carrier waves is adjusted to achieve the phase of current such that the falling timing (local maximum) of electric current I(L1) coincides with the rising timing (local minimum) of electric current I(L2) at Tb shown in the drawing. Accordingly, it is possible to reduce the turn-on loss in switching element S2 as well as the turn-off loss in switching element S4 at Tb. Moreover, as described above, it is possible to reduce the conduction loss in switching element S4 during the period from Ta to Tb as well as the conduction loss in switching element S2 during the period from Tb to Tc.

In a condition B, both of DC power supplies 10a and 10b are in regenerative condition. In this condition, phase difference φ of the carrier waves is adjusted to achieve the phase of current such that the rising timing (local minimum) of electric current I(L1) coincides with the falling timing (local maximum) of electric current I(L2) at Tb shown in the drawing. Accordingly, it is possible to reduce the turn-on loss in switching element S4 as well as the turn-off loss in switching element S2 at Tb. Moreover, as described above, it is possible to reduce the conduction loss in switching element S2 during the period from Ta to Tb as well as the conduction loss in switching element S4 during the period from Tb to Tc.

In a condition C, DC power supply 10a is in a regenerative condition, while DC power supply 10b is in the powering condition. In this condition, phase difference φ of the carrier waves is adjusted to achieve the phase of current such that the falling timing (local maximum) of electric current I(L1) coincides with the falling timing (local maximum) of electric current I(L2) at Ta shown in the drawing. Accordingly, it is possible to reduce the turn-on loss in switching element S3 as well as the turn-off loss in switching element S1 at Ta. Moreover, as described above, it is possible to reduce the conduction loss in switching element S1 during the period from Ta to Tb as well as the conduction loss in switching element S3 during the period from Tc to Ta.

In a condition D, DC power supply 10a is in the powering condition, while DC power supply 10b is in the regenerative condition. In this condition, phase difference φ of the carrier waves is adjusted to achieve the phase of current such that the rising timing (local minimum) of electric current I(L1) coincides with the rising timing (local maximum) of electric current I(L2) at Tc shown in the drawing. Accordingly, it is possible to reduce the turn-on loss in switching element S1 as well as the turn-off loss in switching element S3 at Tc. Moreover, as described above, it is possible to reduce the conduction loss in switching element S1 during the period from Tb to Tc as well as the conduction loss in switching element S3 during the period from Tc to Ta.

As described above, the losses in switching elements S1 to S4 can be reduced by setting the inflection points (local maximum and local minimum) of electric currents I(L1) and I(L2) to occur at the same timing. However, phase difference ϕ for reducing the losses in switching elements S1 to S4 varies in accordance with the combination of powering/regenerative conditions of DC power supplies 10a and 10b. Thereby, it is preferred that the abovementioned phase difference map or phase difference calculation formula is set for each of the combinations of powering/regenerative conditions (conditions A to D in FIG. 32).

As described above, according to the variation of the first embodiment, the above-described carrier phase control can be combined in DC/DC conversion in the PB mode for controlling output voltage VH to be voltage command value VH*. Accordingly, it is possible to execute DC/DC conversion with high efficiency with reduced losses in switching elements S1 to S4 by allowing the full utilization of the effect that the electric currents counteract each other in DC/DC conversion performed by respective DC power supplies 10a and 10b also described with reference to FIGS. 7A to 8B.

Next, carrier phase control in the SB mode will be described.

Figure 33:
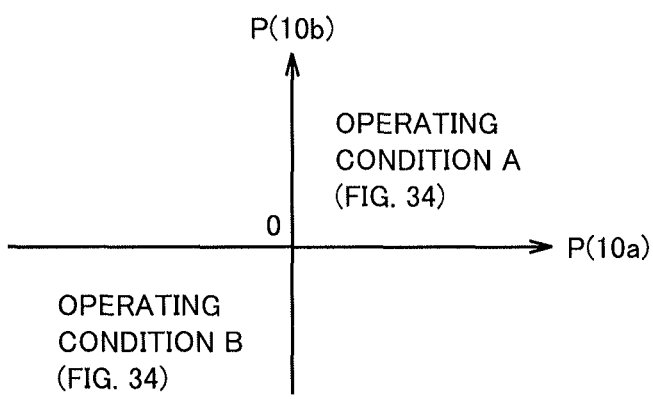
FIG. 33 describes the conditions of two DC power supplies in the SB mode.

DC power supplies 10a and 10b are connected in series in the SB mode as shown in FIG. 33, which generates only either the condition where both of DC power supplies 10a and 10b are in the powering condition (condition A in FIG. 32) or the condition where both of DC power supplies 10a and 10b are in the regenerative condition (condition B in FIG. 32).

As such, in the control operation in the SB mode, phase difference y between the carrier waves is set such that turn-on of switching element S2 coincides with turn-off of switching element S4, or such that turn-on of switching element S4 coincides with turn-off of switching element S2, as shown in conditions A and B in FIG. 32.

That is, by setting phase difference ϕ between carrier waves CWa and CWb such that the falling timing of control pulse signal SDa coincides with the rising timing of control pulse signal SDb, or such that the rising timing of control pulse signal SDa and the falling timing of control pulse signal SDb, the phase of current indicated by conditions A and B in FIG. 32 in which the rising timing (local minimum) coincides with the falling timing (local maximum) occur at the same timing between electric current I(L1) and electric current I(L2) will be achieved.

Duty ratios Da and Db in this condition will be considered. Da is expressed by the following Expression (5) by deforming Expression (1).

$$Da=(VH-Va)/VH \quad (5)$$

Similarly, Db is expressed by the following Expression (6) by deforming Expression (2).

$$Db=(VH-Vb)/VH \quad (6)$$

As shown in FIG. 10, control signal SG3 in the PB mode is generated based on the logical sum of control pulse signals SDa and SDb. Thereby, it is understood that, when phase difference ϕ is set such that the falling (or rising) timing of control pulse signal SDa coincides with the rising (or falling) timing of control pulse signal SDb, the ratio of the H level period of control signal SG3 in the PB mode is more than 1.0 if Vo>(Va+Vb) holds. Namely, when Vo>(Va+Vb) holds, control signal SG3 is fixed at the H level also by PWM control common to the PB mode with duty ratios Da and Db.

Figure 34:
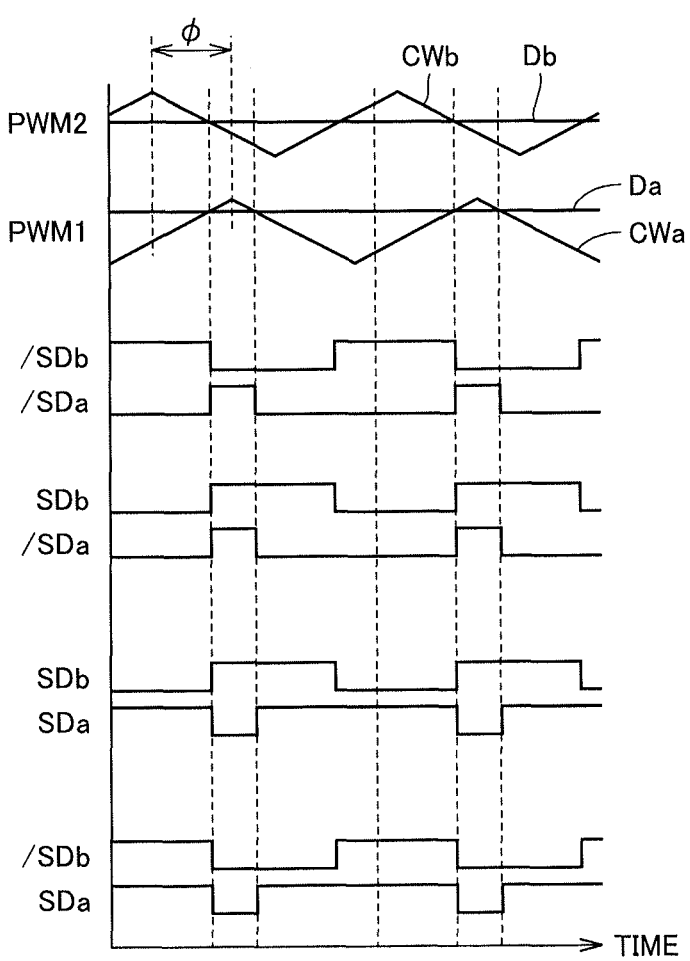
FIG. 34 is a waveform diagram showing control pulse signals in the SB mode when applying carrier phase control.

FIG. 34 is a waveform diagram showing control pulse signals in the SB mode when applying carrier phase control.

As shown in FIG. 34, control signal SG1 in the PB mode is generated based on the logical sum of control pulse signals /SDa and /SDb. When phase difference ϕ is set as described above, the rising timing of control pulse signal /SDa coincides with the rising timing of control pulse signal /SDb. Thereby, a duty ratio DSG1 of control signal SG1 is expressed by DSG1=(1−Da)+(1−Db). Namely, DSG1 is expressed by the following Expression (7).

$$DSG1=(Va+Vb)/VH \quad (7)$$

Meanwhile, duty ratio Dc is expressed by the following Expression (8) by deforming Expression (3).

$$Dc=1-(Va+Vb)/VH \quad (8)$$

Figures 35, 36:
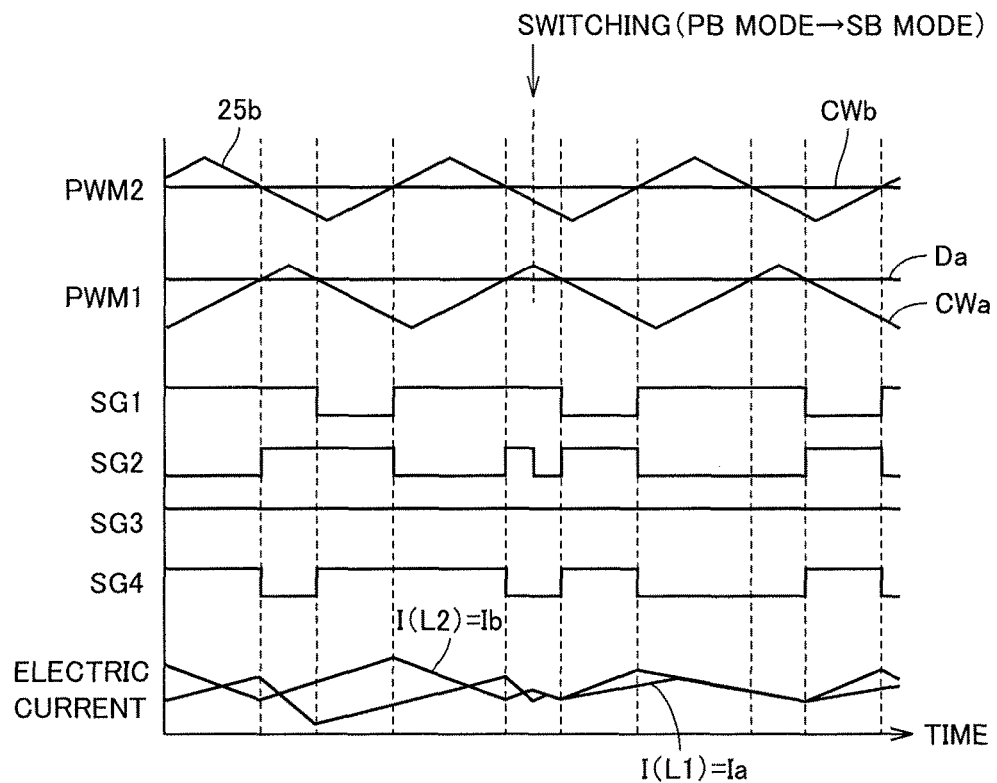
FIG. 35 is a table for describing settings of control signals in the SB mode.
FIG. 36 is a waveform diagram showing an example of operation in the PB mode and the SB mode in power converter control according to the variation of the present first embodiment.

Accordingly, when SG1=/SGc holds in accordance with logical calculation in the SB mode in FIG. 35, duty ratio DSG1 of control signal SG1 is expressed by the following Expression (9).

$$DSG1=1-Dc=(Va+Vb)/VH \quad (9)$$

As described above, when phase difference ϕ is set in accordance with the carrier phase control described above, it is possible to generate signals with a duly ratio equal to that of control pulse signal /SDc based on duty ratio Dc by performing logical calculation based on control pulse signals SDa and SDb with duty ratios Da and Db, specifically the logical sum of /SDa and /SDb. Namely, it is possible to generate control signal SG1 in the SB mode based on control pulse signals SDa and SDb.

As shown in FIG. 35, control signals SG2 and SG4 in the SB mode are inversion signals of control signal SG1. The result of logical calculation of not (/SDb or /SDa) is the logical product of SDa and SDb (SDb and SDa). Accordingly, control signals SG2 and SG4, which are to be set in accordance with control pulse signal SDc, can also be generated based on the logical calculation of control pulse signals SDa and SDb.

As described above, in the SB mode, carrier phase control is applied to set phase difference ϕ such that the transition timing of pulse coincides between control pulse signal SDa (/SDa) and control pulse signal SDb (/SDb). By generating carrier waves CWa and CWb to have such phase difference ϕ, control signals SG1 to SG4, which are to be set based on duty ratio Dc in the SB mode, can be generated in accordance with control pulse signals SDa and SDb based on duty ratios Da and Db, as shown in FIG. 35.

Specifically, as described above, control signal SG3 is a signal which is fixed at the H level by the logical sum of control pulse signals SDa and SDb. Besides, control signal SG1 can be generated by the logical sum of control pulse signals /SDa and/SDb so as to have a duty equivalent to that in the PWM control based on duty ratio Dc. In addition, in the SB mode, control signals SG2, SG4 set to be complementary to control signal SG1 can also be generated based on the logical sum of control pulse signals SDa and SDb.

Phase difference ϕ in the SB mode can also be calculated based on duty ratios Da and Db calculated in the SB mode in accordance with a preset phase difference map that stores the relation between duty ratios Da, Db and phase difference ϕ or phase difference calculation formula, similarly to the carrier phase control in the PB mode.

FIG. 36 shows a waveform diagram showing an example of operation in the PB mode and the SB mode in power converter control according to a variation of the present first embodiment.

Referring to FIG. 36, a command for switching from the PB mode to SB is issued at a peak of carrier wave CWa.

Before generating the switching command, control signals SG1 to SG4 are generated based on duty ratios Da and Db calculated by current control of each of DC power supplies 10a and 10b.

When the switching command is issued, control signals SG1 to SG4 in the SB mode can be generated immediately based on control pulse signals SDa and SDb at that time point in accordance with the logical calculation expressions shown in FIG. 35, without newly calculating duty ratio Dc.

Therefore, control signals SG1 to SG4 in the SB mode can be generated using duty ratios Da and Db in common to the other operation modes belonging to boosting mode including the PB mode. Particularly when switching operation modes, switching processing between the PB mode and the SB mode can be executed without causing delay in control.

Second Embodiment

In a second embodiment, descriptions will be made on power converter control for controlling the outputs of DC power supplies 10a and 10b. As will become apparent from the following descriptions in the second embodiment, one of the characteristics of power converter control according to the present second embodiment lies in that a common control calculation is applied to each operation mode.

Figure 37:
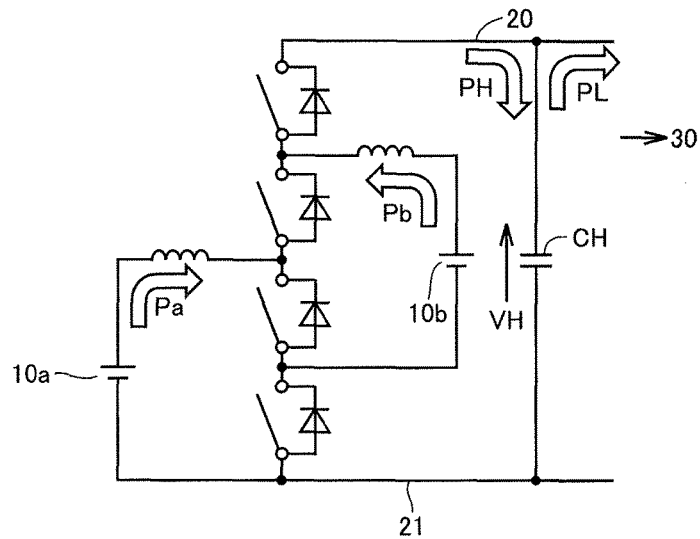
FIG. 37 is a conceptual view describing a basic concept of power converter control according to a present second embodiment.

FIG. 37 is a diagram describing a basic concept of power converter control according to the present second embodiment.

Referring to FIG. 37, output voltage VH rises in the condition where total electric power PH is larger than load power PL (PH>PL), but decreases in the condition where PH<PL holds. Therefore, in the power converter control according to the present second embodiment, the command value for total electric power PH is set in accordance with voltage deviation $\Delta$VH of output voltage VH relative to voltage command value VH*. Furthermore, by distributing total electric power PH between output power Pa and output power Pb, the output of each of DC power supplies 10a and 10b is subjected to power control (current control).

(Control Operation in PB Mode)

First, the control operation in the PB mode will be described.

Figure 38:
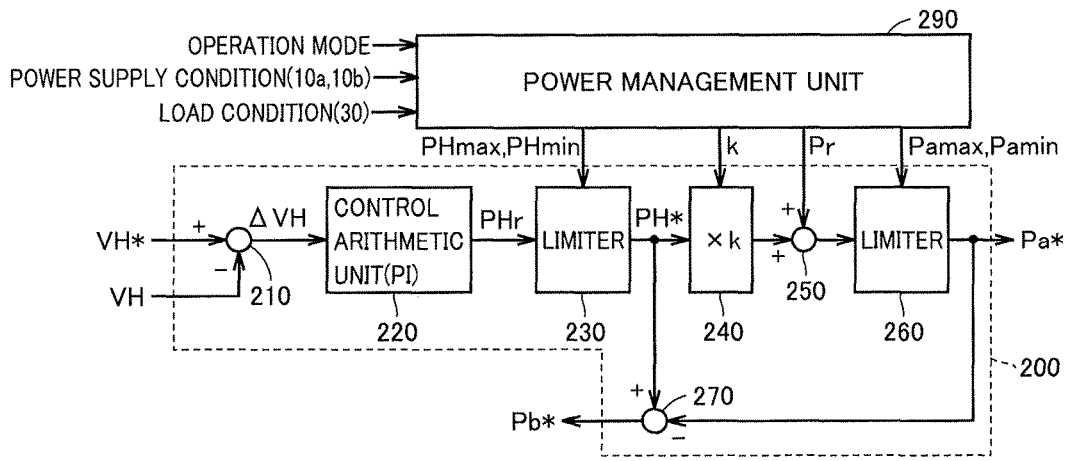
FIG. 38 is a first block diagram for describing the power converter control according to the present second embodiment.
Figure 39:
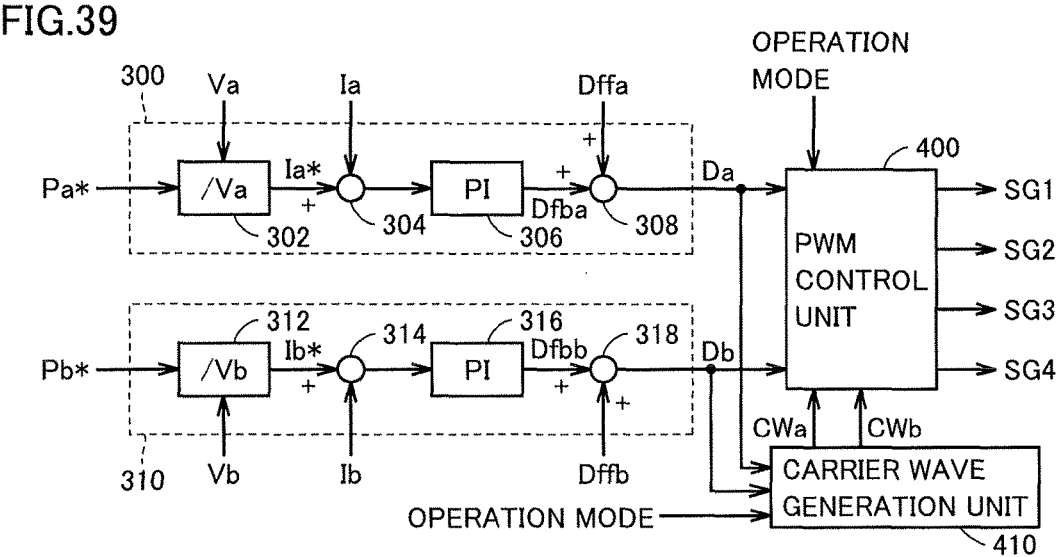
FIG. 39 is a second block diagram for describing the power converter control according to the present second embodiment.

FIGS. 38 and 39 are block diagrams for describing power converter control according to the present first embodiment. FIG. 38 shows a configuration for a control calculation for setting a power command value for each DC power supply, and FIG. 39 shows a configuration for a control calculation of controlling the output of each DC power supply in accordance with the set power command value.

Referring to FIG. 38, control device 40 includes a voltage control unit 200 and a power management unit 290.

Power management unit 290 sets power upper limit value PHmax and power lower limit value PHmin for total electric power PH, power upper limit value Pamax and power lower limit value Pamin for DC power supply 10a, as well as power distribution ratio k between DC power supplies 10a and 10b, based on the operating conditions of DC power supplies 10a, 10b and/or load 30. Power upper limit value PHmax and power lower limit value PHmin can also be set for total electric power PH of DC power supplies 10a and 10b as a whole. For example, setting can be made such that PHmax=Pamax+Pbmax and PHmin=Pamin+Pbmin hold.

As also described in the first embodiment, in the PB mode, power distribution ratio k can be set at any value such that 0≤k≤1.0 holds. As described above, power distribution ratio k can be determined based on the conditions of DC power supplies 10a and 10b (e.g., balance between SOCs or balance between upper limit power and lower limit power), output power level (PH) or the like, for example. As will be described later in detail, power distribution ratio k is switched in accordance with the operation mode.

Power management unit 290 further sets a circulation power value Pr for performing charging/discharging between DC power supplies 10a and 10b.

Circulation power value Pr corresponds to output power from DC power supply 10a for charging DC power supply 10b. For example, in a power running operation, when setting such that Pr>0 holds upon setting k at 1, DC power supply 10b can be charged while supplying total electric power PH to electric power line 20 with the output power of DC power supply 10a. On the contrary, when setting such that Pr<0 holds upon setting k at 0, DC power supply 10a can be charged while supplying total electric power PH to electric power line 20 with the output power of DC power supply 10b.

In a regeneration operation (PH<0), when setting such that Pr>0 holds upon setting k at 0, DC power supply 10b can be charged with both of the regenerative power from load 30 and the output power from DC power supply 10a. On the contrary, when setting such that Pr<0 holds upon setting k at 1, DC power supply 10a can be charged with both of the regenerative power from load 30 and the output power from DC power supply 10b.

When circulation power value Pr is not set (Pr=0), charging/discharging between DC power supplies 10a and 10b is not executed. When DC power supplies 10a and 10b have unbalanced SOCs, for example, power management unit 290 sets circulation power value Pr so as to promote charging of a DC power supply lower in SOC.

Voltage control unit 200 sets power command values Pa* and Pb* for DC power supplies 10a and 10b, based on the voltage deviation of output voltage VH. Voltage control unit 200 has a deviation arithmetic unit 210, a control arithmetic unit 220, a limiter 230, a power distribution unit 240, a circulation power addition unit 250, a limiter 260, and a subtraction unit 270.

Deviation arithmetic unit 210 calculates voltage deviation $\Delta$VH ($\Delta$VH=VH*−VH) in accordance with the difference between voltage command value VH* and a detected value of output voltage VH. Control arithmetic unit 220 calculates total electric power PHr required for voltage control, based on voltage deviation $\Delta$VH. For example, control arithmetic unit 220 sets PHr by a PI operation in accordance with Expression (10) below.

$$PHr = Kp \cdot \Delta VH + \Sigma(Ki \cdot \Delta VH) \quad (10)$$

In Expression (10), Kp is a proportional control gain, and Ki is an integral control gain. A capacitance value of smoothing capacitor CH is also reflected in these control gains. By setting total electric power PHr in accordance with Expression (10), feedback control for reducing voltage deviation $\Delta$VH can be achieved.

Alternatively, when load power PL can be estimated from the operating condition of load 30, it is also possible to set required total electric power PHr in accordance with Expression (11) further reflecting this estimated value PL*. Then, output voltage VH can be controlled in such a manner as to provide feedforward of power consumption in load 30.

$$Phr = Kp \cdot \Delta VH + \Sigma(Ki \cdot \Delta VH) + PL^* \quad (11)$$

Limiter 230 restricts power command value PH* so as to fall within the range of PHmax to PHmin set by power management unit 290. If PHr>PHmax holds, limiter 230 sets PH* at PHmax. Similarly, when PHr<PHmim holds, limiter 230 sets PH* at PHmin. When PHmax≥PHr≥PHmin holds, PH* is set at PHr as it is. Total electric power command value PH* is thereby settled.

Power distribution unit 240 calculates output power k·PH* that should be shared by DC power supply 10a based on total electric power command value PH* and power distribution ratio k. Circulation power addition unit 250 adds k·Pa* calculated by power distribution unit 240 and circulation power value Pr set by power management unit 290 to thereby calculate electric power Par required of DC power supply 10a (Par=k·Pa*+Pr).

Limiter 260 restricts power command value Pa* for DC power supply 10a so as to fall within the range of Pamax to Pamin set by power management unit 290. If Par>Pamax holds, limiter 260 modifies Pa* to be Pamax. Similarly, when PHa<Pamim holds, limiter 260 modifies Pa* to be Pamin. When Pamax>Par>Pamin holds, Pa* is set at Par as it is. Power command value Pa* for DC power supply 10a is thereby settled.

Subtraction unit 270 subtracts power command value Pa* from total electric power command value PH*, thereby setting power command value Pb* for DC power supply 10b (Pb*=PH*−Pa*).

Figure 40:
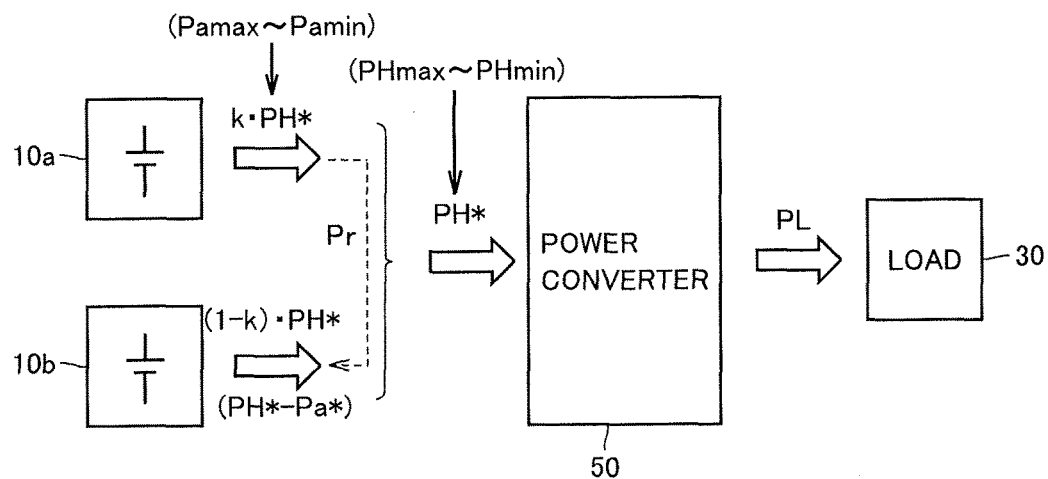
FIG. 40 is a conceptual view for describing a power flow in the power supply system in the PB mode by means of the power converter control according to the second embodiment.

FIG. 40 is a conceptual view for describing a power flow in the power supply system by means of the power command values set in accordance with FIG. 38.

Referring to FIG. 40, total electric power command value PH* necessary for controlling output voltage VH to be voltage command value VH* is distributed between power command values Pa* and Pb* in accordance with power distribution ratio k. That is, setting is basically made such that Pa*=k·PH and Pb*=(1−k)·PH* hold. Accordingly, upon controlling the power ratio between DC power supplies 10a and 10b, electric power in accordance with total electric power command value PH* for controlling output voltage VH can be input/output to/from electric power line 20.

Furthermore, by setting circulation power value Pr, DC power supply 10b can be charged with output power from DC power supply 10a (Pr>0), or DC power supply 10a can be charged with output power from DC power supply 10b (Pr<0).

Since power command value Pa* is reliably restricted to fall within the range of Pamax to Pamin by limiter 260, DC power supply 10a can be protected from overpower. That is, overcharge and overdischarge of DC power supply 10a can be prevented.

Moreover, by restricting load power PL to fall within the range of PHmin to PHmax, while reliably restricting total electric power command value PH* by limiter 230 to fall within the range of PHmax to PHmin, DC power supply 10b can also be protected from overpower. That is, overcharge and overdischarge of DC power supply 10b can also be prevented.

Referring to FIG. 39, control device 40 includes current control units 300, 310 for controlling the outputs from DC power supplies 10a and 10b in accordance with power command values Pa* and Pb*, a PWM (Pulse Width Modulation) control unit 400, and a carrier wave generation unit 410. Current control unit 300 controls the output from DC power supply 10a by current control. Current control unit 310 controls the output from DC power supply 10a by current control.

Current control unit 300 has a current command generation unit 302, a deviation arithmetic unit 304, a control arithmetic unit 306, and an FF addition unit 308.

Current command generation unit 302 sets a current command value Ia* for DC power supply 10a based on power command value Pa* and a detected value of voltage Va (Ia*=Pa*/Va). Deviation arithmetic unit 304 calculates current deviation ΔIa in accordance with the difference between current command value Ia* and a detected value of electric current Ia (ΔIa=Ia*−Ia). Control arithmetic unit 306 calculates a control amount Dfba for current feedback control based on current deviation ΔIa. For example, control arithmetic unit 306 calculates control amount Dfba by a PI operation in accordance with Expression (12) below.

$$Dfba = Kp \cdot \Delta Ia + \Sigma(Ki \cdot \Delta Ia) \quad (12)$$

In Expression (12), Kp is a proportional control gain, and Ki is an integral control gain. These control gains are set independently of Expression (10).

On the other hand, an FF control amount Dffa for voltage feedforward control is set in accordance with Expression (13) in line with Da=(VH−Va)/VH obtained by solving Expression (1) for Da.

$$Dffa = (VH^* - Va)/VH^* \quad (13)$$

FF addition unit 308 adds an FB control amount Dfba and FF control amount Dffa, thereby calculating duty ratio Da for power control of DC power supply 10a. Duty ratio Da corresponds to the duty ratio of a period during which the lower arm element (switching elements S3 and S4) of the boost chopper circuit (FIGS. 7A and 7B) is turned on when performing DC/DC conversion between voltage Va of DC power supply 10a and output voltage VH, similarly to Expression (1).

Similarly, current control unit 310 corresponding to DC power supply 10b has a current command generation unit 312, a deviation arithmetic unit 314, a control arithmetic unit 316, and an FF addition unit 318.

Current command generation unit 312 sets a current command value Ib* for DC power supply 10b based on power command value Pb* and a detected value of voltage Vb (Ib*=Pb*/Vb). Deviation arithmetic unit 314 calculates a current deviation ΔIb (ΔIb=Ib*−Ib) in accordance with the difference between current command value Ib* and a detected value of electric current Ib. Control arithmetic unit 316 calculates a control amount Dfbb for current feedback control based on current deviation ΔIb. For example, control arithmetic unit 316 calculates control amount Dfbb by a PI operation in accordance with Expression (14) below.

$$Dfbb = Kp \cdot \Delta Ib + \Sigma(Ki \cdot \Delta Ib) \quad (14)$$

In Expression (8), Kp is a proportional control gain, and Ki is an integral control gain. These control gains are set independently of Expressions (10) and (12).

On the other hand, a FF control amount Dffb for voltage feedforward control is set in accordance with Expression (15) in line with Db=(VH−Vb)/VH obtained by solving Expression (2) for Db. In Expression (15), voltage command value VH* may be a detected value of output voltage VH.

$$Dffb = (VH^* - Vb)/VH^* \quad (15)$$

FF addition unit 318 adds FB control amount Dfbb and FF control amount Dffb, thereby calculating duty ratio Db for power control of DC power supply 10b. Duty ratio Db corresponds to the duty ratio of a period during which the lower arm element (switching elements S2 and S3) of the boost chopper circuit (FIGS. 8A and 8B) is turned on, similarly to Expression (2).

PWM control unit 400 generates control signals SG1 to SG4 for switching elements S1 to S4 by pulse width modulation control based on duty ratios Da and Db set by current control units 300 and 310 as well as carrier waves CWa and CWb received from carrier wave generation unit 410. Since the pulse width modulation control and generation of control signals SG1 to SG4 performed by PWM control unit 400 are executed similarly to those described with reference to FIGS. 9 and 10, detailed description thereof will not be repeated. Carrier wave generation unit 410 preferably generates carrier waves CWa and CWb by applying the carrier phase control described in the variation of the first embodiment.

With the power converter control according to the second embodiment as described above, in DC/DC conversion in the PB mode, the voltage deviation of output voltage VH is converted into power command values to perform current control on the outputs of respective DC power supplies 10a and 10b, so that output voltage VH can be controlled to be voltage command value VH*. Accordingly, it is possible to reliably protect each of DC power supplies 10a and 10b from overpower on an output power basis. It is also possible to simply control power distribution ratio k and circulation power value Pr between DC power supplies 10a and 10b.

Particularly, for one of DC power supplies 10a and 10b, the power command value can be restricted directly. In the exemplary configuration shown in FIGS. 12A and 12B, limiter 260 can reliably restrict power command value Pa* for DC power supply 10a to fall within the range where Pamin≤Pa*≤Pamax holds. Accordingly, overpower of DC power supply 10a can be prevented strictly.

By restricting total electric power command value PH* to fall within the range of PHmin to PHmax to set power command value Pb* for DC power supply 10b, and restricting load power PL to fall within the range of PHmin to PHmax, DC power supply 10b can also be protected indirectly from overpower. In the exemplary configuration shown in FIG. 38, however, DC power supply 10a for which power command value Pa* is directly restricted by limiter 260 will be protected from overpower more strictly than DC power supply 10b. Therefore, it is preferable to provide a configuration in which the power command value for a DC power supply which needs to be protected from overpower more strictly is restricted directly by limiter 260.

(Control Operation in Other Boosting Modes)

As shown in FIG. 3, the boosting mode in which output voltage VH is controlled to be voltage command value VH* includes the aB mode, the bB mode and the SB mode, in addition to the PB mode. For the aB mode, the bB mode and the SB mode, output voltage VH is also controlled to be voltage command value VH* sharing the control configuration in accordance with FIGS. 38 and 39.

Figures 41, 42:
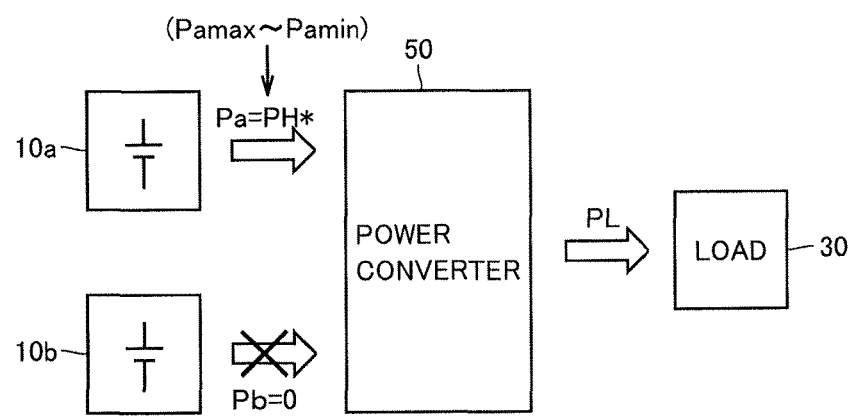
FIG. 41 is a table describing settings of control signals and control data in each operation mode belonging to a boosting mode.
FIG. 42 is a conceptual view for describing a power flow in the power supply system in the aB mode achieved by the power converter control according to the second embodiment.

FIG. 41 is a table describing settings of control signals and control data in each operation mode belonging to the boosting mode.

Referring to FIG. 41, the control configurations shown in FIGS. 38 and 39 are shared by the respective operation modes in the boosting mode. The difference between the operation modes is handled by changing power distribution ratio k, a DC power supply for which current feedback control is to be executed, and the operation logic of control signals SG1 to SG4.

As already described, in the PB mode, power distribution ratio k can be set freely within the range where 0≤k≤1.0 holds, and circulation power value Pr can also be set at any value on a control basis. As described above, in the PB mode, electric currents Ia and Ib of both of DC power supplies 10a and 10b are controlled in accordance with current command values Ia* and Ib* set based on the power command value for controlling output voltage VH.

In the aB mode, bidirectional DC/DC conversion between DC power supply 10a and electric power line 20 (load 30) is executed by the boost chopper circuit formed by switching elements S1 to S4 by the switching operation shown in FIGS. 7A and 7B, without using DC power supply 10b. Therefore, in the aB mode, switching elements S1 to S4 are controlled in accordance with control pulse signal SDa based on duty ratio Da for controlling the output from DC power supply 10a. Specifically, on/off of switching elements S3 and S4 constituting the lower arm element of the boost chopper circuit shown in FIGS. 7A and 7B is controlled in common in accordance with control pulse signal SDa. Similarly, on/off of switching elements S1 and S2 constituting the upper arm element of the boost chopper circuit is controlled in common in accordance with control pulse signal /SDa.

Referring to FIGS. 41 and 38, also in the aB mode, total electric power command value PH* is set by deviation arithmetic unit 210, control arithmetic unit 220 and limiter 230 based on voltage deviation ΔVH of output voltage VH, similarly to the PB mode. Since DC power supply 10b is not used, power upper limit value PHmax and power lower limit value PHmin supplied to limiter 230 can be set to be equivalent to power upper limit value Pamax and power lower limit value Pamin of DC power supply 10a. Accordingly, in the aB mode, the operation command value for load 30 is generated limitedly within the range where Pamin≤PL≤Pamax holds.

Since DC power supply 10b is not used in the aB mode (to avoid charging/discharging), circulation power value Pr is fixed at 0. Furthermore, by fixing power distribution ratio k at 1.0, power command value Pa* is set at PH*, while power command value Pb* is set at 0. On this occasion, it is also possible by limiter 260 to protect power command value Pa* from deviating from the range of Pamax to Pamin, that is, to protect DC power supply 10a from overpower. Therefore, in the aB mode, it is also possible to cause one of limiters 230 and 260 not to operate.

Furthermore, in the configuration of FIG. 39, the current feedback control is executed only for DC power supply 10a. That is, similarly to the PB mode, current control unit 300 calculates duty ratio Da by the feedback control indicated by Expression (12) based on the current deviation between current command value Ia* set in accordance with power command value Pa* and a detected value of electric current Ia as well as the feedforward control indicated by Expression (13) based on the voltage ratio (Da=Dfba+Dfba).

On the other hand, since control pulse signal SDb is unnecessary in the aB mode as described above, the operation of current control unit 310 can be stopped. That is, the calculation of duty ratio Db is stopped.

FIG. 42 shows a conceptual view for describing a power flow in the power supply system in the aB mode.

Referring to FIG. 42, in the aB mode, power command value PH* for controlling output voltage VH to be voltage command value VH* is entirely distributed to DC power supply 10a. That is, load power PL is covered only by DC power supply 10a. Since circulation power value Pr is fixed at 0, the charging/discharging between DC power supplies 10a and 10b does not occur.

Also in the aB mode, power command value Pa* is reliably restricted by limiter 260 and/or 290 to fall within the range of Pamax to Pamin. Accordingly, DC power supply 10a used alone can be protected from overpower. By calculating duty ratio Da by the feedback control of electric current Ia of DC power supply 10a in the aB mode, voltage deviation ΔVH can be promptly cancelled as compared to the control for calculating duty ratio Da by the feedback control of output power VH.

In the bB mode, bidirectional DC/DC conversion between DC power supply 10b and electric power line 20 (load 30) is executed by the boost chopper circuit formed by switching elements S1 to S4 by the switching operation shown in FIGS. 8A and 8B, without using DC power supply 10a. Therefore, in the bB mode, switching elements S1 to S4 are controlled in accordance with control pulse signal SDb based on duty ratio Db for controlling the output from DC power supply 10b. Specifically, on/off of switching elements S2 and S3 constituting the lower arm element of the boost chopper circuit shown in FIGS. 8A and 8B is controlled in common in accordance with control pulse signal SDb. Similarly, on/off of switching elements S1 and S4 constituting the upper arm element of the boost chopper circuit is controlled in common in accordance with control pulse signal /SDb.

Referring to FIGS. 41 and 38, also in the bB mode, total electric power command value PH* is set based on voltage deviation ΔVH of output voltage VH, similarly to the PB mode and aB mode. Since DC power supply 10a is not used in the bB mode, power upper limit value PHmax and power lower limit value PHmin supplied to limiter 230 can be set to be equivalent to power upper limit value Pbmax and power lower limit value Pbmin of DC power supply 10b. Similarly, circulation power value Pr is fixed at 0.

Furthermore, by fixing power distribution ratio k at 0, power command value Pb* is set at PH*, while power command value Pa* is set at 0. In this case, the restriction by limiter 260 is unnecessary. That is, in the bB mode, DC power supply 10b can be directly protected from overpower by limiter 230.

Furthermore, in the configuration of FIG. 39, the current feedback control is executed only for DC power supply 10b. That is, similarly to the PB mode, current control unit 310 calculates duty ratio Db by the feedback control indicated by Expression (14) based on the current deviation between current command value Ib* set in accordance with power command value Pb* and a detected value of electric current Ib as well as the feedforward control indicated by Expression (15) based on the voltage ratio (Db=Dfbb+Dffb).

On the other hand, since control pulse signal SDa is unnecessary in the bB mode as described above, the operation of current control unit 300 can be stopped. That is, the calculation of duty ratio Da is stopped.

Figure 43:
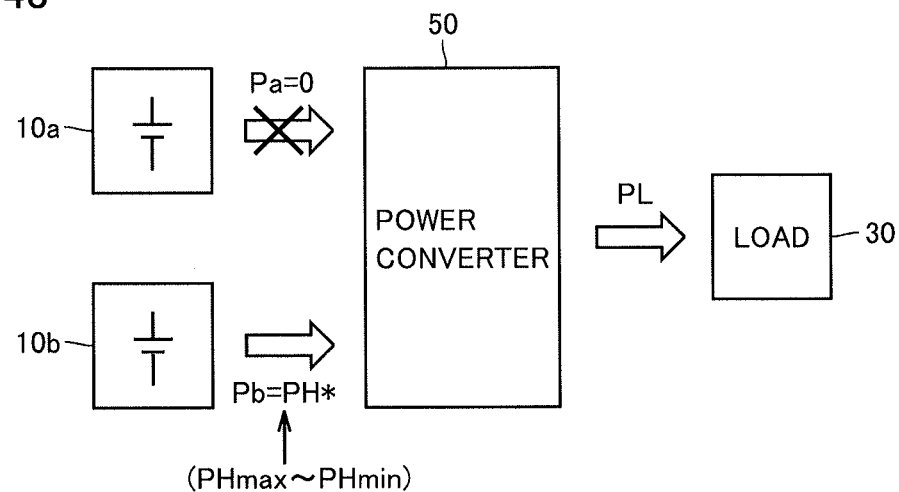
FIG. 43 is a conceptual view for describing a power flow in the power supply system in the bB mode achieved by the power converter control according to the second embodiment.

FIG. 43 shows a conceptual view for describing a power flow in the power supply system in the bB mode.

Referring to FIG. 43, in the bB mode, power command value PH* required for controlling output voltage VH to be voltage command value VH* is entirely distributed to DC power supply 10b. That is, load power PL is covered only by DC power supply 10b. Since circulation power value Pr is fixed at 0, the charging/discharging between DC power supplies 10a and 10b does not occur.

Also in the bB mode, power upper limit value PHmax and power lower limit value PHmin supplied to limiter 230 can be set to be equivalent to power upper limit value Pbmax and power lower limit value Pbmin of DC power supply 10b. Accordingly, power command value Pb* is reliably restricted to fall within the range of Pbmax to Pbmin. In the bB mode, the operation command value for load 30 will be generated limitedly within the range where Pbmin≤PL≤Pbmax holds. As a result, DC power supply 10b used alone can be protected from overpower. By performing the feedback control of electric current Ib of DC power supply 10b in the bB mode, occurred voltage deviation ΔVH can be promptly cancelled as compared to the control for directly cancelling DC voltage VH by feedback control.

Next, a control operation in the SB mode will be described.

Figure 44:
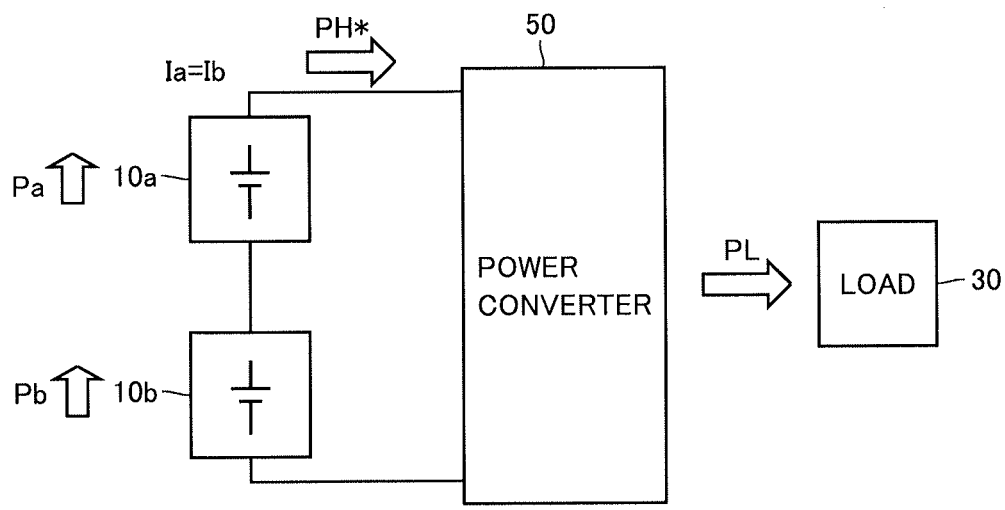
FIG. 44 is a conceptual view for describing a power flow in the power supply system in the SB mode achieved by the power converter control according to the second embodiment.

FIG. 44 shows a conceptual view for describing a power flow in the power supply system in the SB mode.

Referring to FIG. 44, in the SB mode, bidirectional DC/DC conversion is executed between DC power supplies 10a and 10b connected in series and electric power line 20 (load 30). Therefore, a common electric current flows through DC power supply 10a and DC power supply 10b (Ia=Ib). For this reason, output power Pa of DC power supply 10a and output power Pb of DC power supply 10b cannot be controlled directly. That is, the ratio between electric power Pa and electric power Pb in the SB mode is automatically determined by the ratio between voltages Va and Vb in accordance with Expression (4) above.

Referring again to FIG. 41, in the SB mode, power distribution ratio k is set based on the present values (detected values) of voltages Va and Vb of DC power supplies 10a and 10b in accordance with Expression (16) obtained in line with Expression (4).

$$k=Va/(Va+Vb) \tag{16}$$

Since the charging/discharging between DC power supplies 10a and 10b cannot be performed in the SB mode, circulation power value Pr is set at 0.

Accordingly, in the configuration of FIG. 38, total electric power command value PH* is set based on voltage deviation ΔVH of output voltage VH, similarly to the SB mode. Total electric power command value PH* can be set by limiter 230 to fall within the range of PHmax to PHmin. Furthermore, in accordance with Expression (11), total electric power command value PH* is distributed between power command values Pa* and Pb* in accordance with power distribution ratio k between DC power supplies 10a and 10b connected in series based on voltages Va and Vb at present. On this occasion, power command value Pa* is restricted by limiter 260 to fall within the range of Pamax to Pamin.

Since Ia=Ib holds in the SB mode as shown in FIG. 44, current feedback control is executed for only one of DC power supplies 10a and 10b. For example, current feedback control is executed for DC power supply 10a for which the power command value can be directly restricted, that is, which is strictly protected from overpower.

Referring again to FIG. 39, current control unit 300 calculates duty ratio Da by the feedback control indicated by Expression (12) based on the current deviation between current command value Ia* set in accordance with power command value Pa* and a detected value of electric current Ia as well as the feedforward control indicated by Expression (13) based on the voltage ratio (Da=Dfba+Dfba), similarly to the PB mode.

On the other hand, current feedback control is not executed in current control unit 310 by setting the control gains in control arithmetic unit 316, specifically, Kp and Ki in Expression (14) at zero. Therefore, current control unit 310 calculates duty ratio Db only by the feedforward control based on voltage Vb (Db=Dffb). FF control amount Dffb can be set in accordance with Expression (15).

PWM control unit 400 generates control signals SG1 to SG4 for switching elements S1 to S4 by the pulse width modulation control based on duty ratios Da and Db set by current control units 300 and 310 as well as carrier waves CWa and CWb received from carrier wave generation unit 410. As described above, also in the SB mode, by combining the carrier phase difference control described in the variation of the first embodiment, control signals SG1 to SG4 in the SB mode can be generated using control pulse signals SDa (/SDa) and SDb (/SDb) (FIG. 35).

As described above, with the power converter control according to the present second embodiment, for the control operation of power converter 50 shown in FIG. 1, the control configurations shown in FIGS. 38 and 39 can be shared among the respective operation modes belonging to the boosting mode of controlling output voltage VH to be voltage command value VH*.

Specifically, by switching power distribution ratio k as well as the control gains for current control units 300 and 310 among the operation modes, it is possible to apply the common control calculation in accordance with FIGS. 12A, 12B and 13 to the respective operation modes. Therefore, it is possible to reduce a control calculation load in control of power converter 50 in which a plurality of operation modes are selectively applied.

Furthermore, since duty ratio Da can be calculated by the current feedback control for DC power supply 10a, voltage deviation ΔVH in the SB mode can be promptly cancelled, as compared to the control for calculating the duty ratio (Dc) by the voltage feedback control for output voltage VH. Moreover, since the operation modes can be smoothly switched by sharing the control calculation among the respective operation modes, controllability can be improved further.

Third Embodiment

In a third embodiment, descriptions will be made on application of power converter control to a power converter having a different configuration from FIG. 1.

Figure 45:
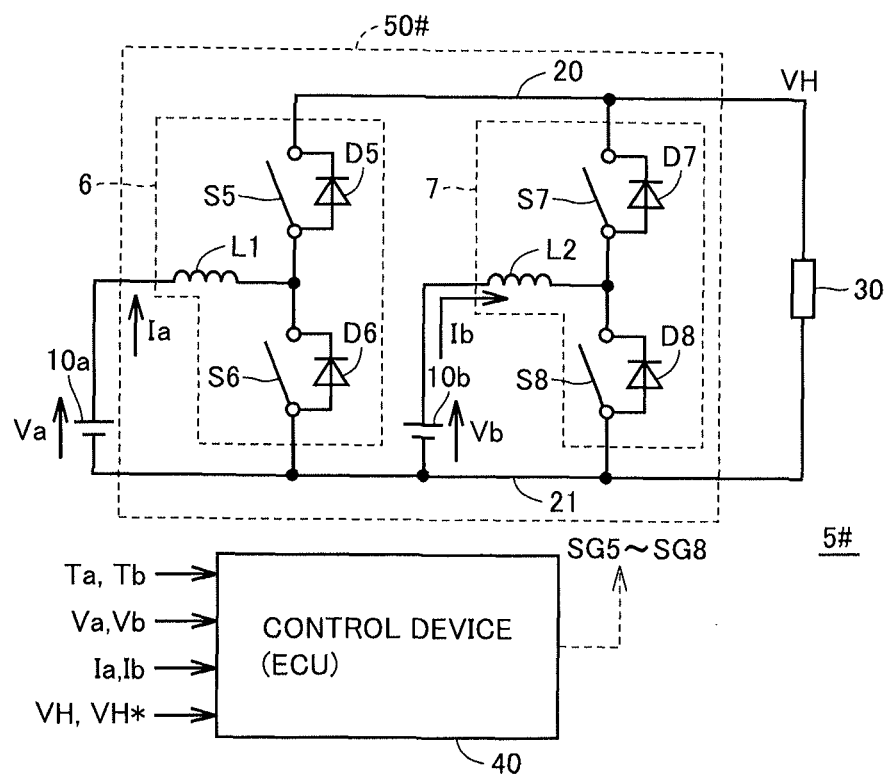
FIG. 45 is a circuit diagram showing a configuration of a power supply system including a power converter according to a third embodiment of the present invention.

FIG. 45 is a circuit diagram showing an example of configuration of a power supply system 5# according to the third embodiment of the present invention.

Referring to FIG. 45, power supply system 5# according to the third embodiment of the present invention is different from power supply system 5 according to the first embodiment in that power supply system 5# includes a power converter 50# instead of power converter 50. Since the remaining configuration of power supply system 5# is similar to that of power supply system 5, detailed description thereof will not be repeated.

Power converter 50# according to the third embodiment has boost chopper circuits 6 and 7. Boost chopper circuit 6 executes bidirectional DC/DC conversion between DC power supply 10a and electric power line 20 connected to load 30. Boost chopper circuit 6 includes switching elements S5, S6 and reactor L1.

Boost chopper circuit 7 executes bidirectional DC/DC conversion between DC power supply 10b and electric power line 20 common to DC power supply 10a. Boost chopper circuit 7 includes switching elements S7, S8 and reactor L2.

For switching elements S5 to S8, antiparallel diodes D5 to D8 are arranged, respectively. On/off of switching elements S5 to S8 can be controlled in response to control signals SG5 to SG8 from control device 40, respectively.

In this way, power converter 50# is configured such that boost chopper circuits 6 and 7 are independently provided for DC power supplies 10a and 10b, respectively, different from power converter 50 according to the present embodiment. Boost chopper circuits 6 and 7 can be controlled independently.

Control device 40 generates control signals SG5 to SG8 controlling on/off of switching elements S5 to S8 in order to control output voltage VH.

FIG. 46 shows a plurality of operation modes possessed by power converter 50# shown in FIG. 45.

Referring to FIG. 46, in power converter 50#, other boosting modes and the direct connection modes excluding the SB mode and the SD mode in power converter 50 can be selected. That is, the operation mode in power converter 50# has the PB mode, the aB mode and the bB mode belonging to the boosting mode as well as the PD mode, the aD mode and the bD mode belonging to the direct connection mode.

In the PB mode, by controlling boost chopper circuits 6 and 7 independently, control can be exerted similarly to the PB mode in the first embodiment. That is, in accordance with the configurations shown in FIGS. 38 and 39, power distribution ratio k (0≤k≤1.0) and circulation power value Pr can be set in accordance with the operating conditions of DC power supplies 10a and 10b. Accordingly, with the configuration of FIG. 38, power command values Pa* and Pb* for DC power supplies 10a and 10b can be set from total electric power command value PH* for controlling output voltage VH to be voltage command value VH* reflecting power distribution ratio k and circulation power value Pr.

Furthermore, in accordance with the configuration of FIG. 39, duty ratios Da and Db can be calculated so as to control both of electric currents Ia and Ib of DC power supplies 10a and 10b in accordance with current command values Ia* and Ib* set based on the power command values for controlling output voltage VH. Since boost chopper circuits 6 and 7 are controlled independently, control signals SG5 and SG6 for switching elements S5 and S6 of boost chopper circuit 6 are generated based on control pulse signal SDa. Specifically, control signal SG6 for switching element S6 constituting the lower arm element becomes equal to /SGa, and control signal SG5 for switching element S5 constituting the upper arm element becomes equal to SGa.

Similarly, control signals SG7 and SG8 for switching elements S7 and S8 of boost chopper circuit 7 are generated based on control pulse signal SDb. Specifically, control signal SG8 for switching element S8 constituting the lower arm element becomes equal to /SGb, and control signal SG7 for switching element S7 constituting the upper arm element becomes equal to SGb.

Also in the PB mode in power converter 50#, the outputs of respective DC power supplies 10a and 10b can be subjected to current control by converting the voltage deviation of output voltage VH into power command values to set power command values Pa* and Pb* in accordance with the control configurations shown in FIGS. 38 and 39. Furthermore, limiters 230 and 260 enable reliable protection from overpower on an output power basis. Moreover, power distribution ratio k and circulation power value Pr between DC power supplies 10a and 10b can be simply controlled.

In the PB mode in power converter 50#, the power losses in switching elements S5 to S8 cannot be reduced even when applying the carrier phase control, since the electric current path of switching elements S5 and S6 does not overlap the electric current path of switching elements S7 and S8. Therefore, it is not necessary to apply the carrier phase control, and phase difference φ can be fixed (representatively, φ is fixed at 0).

In the aB mode, output voltage VH can be controlled to be voltage command value VH* by bidirectional DC/DC conversion between DC power supply 10a and electric power line 20 by operating boost chopper circuit 6 alone, without using DC power supply 10b. That is, similarly to the aB mode in power converter 50 (first embodiment), by setting power distribution ratio k at 1.0 and circulation power value Pr at 0, power command value Pa* for DC power supply 10a used can be set (Pa*=PH*) upon performing electric power protection by limiter 230 or 260 such that Pamin≤Pa*≤Pamax holds.

Furthermore, in the configuration of FIG. 39, current control unit 300 corresponding to DC power supply 10a operates similarly to the PB mode in power converter 50 to calculate duty ratio Da by current feedback control (current command value Ia*) and feedforward control based on the voltage ratio (Da=Dfba+Dfba). On the other hand, in the aB mode, since calculation of control pulse signal SDb is unnecessary, the operation of current control unit 310 can be stopped.

In the aB mode, switching elements S7 and S8 constituting boost chopper circuit 7 are maintained off. On the other hand, switching elements S5 and S6 constituting boost chopper circuit 6 are turned on/off in accordance with control pulse signal SDa (/SDa) generated by pulse width modulation control based on duty ratio Da.

In the bB mode, output voltage VH can be controlled to be voltage command value VH* by bidirectional DC/DC conversion between DC power supply 10b and electric power line 20 by operating boost chopper circuit 7 alone, without using DC power supply 10a. Accordingly, similarly to the bB mode in power converter 50 (first embodiment), by setting power distribution ratio k at 0 and circulation power value Pr at 0, power command value Pb* for DC power supply 10b used can be set (Pb*=PH*) upon performing electric power protection by limiter 230 such that Pbmin≤Pb*≤Pbmax holds.

In the configuration of FIG. 39, current control unit 310 corresponding to DC power supply 10b operates similarly to the PB mode in power converter 50 to calculate duty ratio Db by current feedback control (current command value Ib*) and feedforward control based on the voltage ratio (Db=Dfbb+Dfbb). On the other hand, in the bB mode, since calculation of control pulse signal SDa is unnecessary, the operation of current control unit 300 can be stopped.

In the bB mode, switching elements S5 and S6 constituting boost chopper circuit 6 are maintained off. On the other hand, switching elements S7 and S8 constituting boost chopper circuit 7 are turned on/off in accordance with control pulse signal SDb (/SDb) generated by pulse width modulation control based on duty ratio Db.

In the PD mode, switching elements S5 and S7 are kept on, while switching elements S6 and S8 are kept off. Accordingly, output voltage VH becomes equivalent to output voltages Va and Vb of DC power supplies 10a and 10 (strictly, the higher one of Va and Vb), similarly to the SD mode in power converter 50. Similarly to power converter 50, since the voltage difference between Va and Vb will generate a short-circuit current at DC power supplies 10a and 10b, the PD mode can be applied limitedly when the voltage difference is small.

In the aD mode, switching element S5 is kept on, while switching elements S6 to S8 are kept off. Accordingly, similarly to the aD mode in power converter 50, DC power supply 10b is brought into the state disconnected from electric power line 20, and output voltage VH becomes equivalent to voltage Va of DC power supply 10a (VH=Va). As described above, Va>Vb is a necessary condition for applying the aD mode.

In the bD mode, switching element S7 is kept on, while switching elements S5, S6 and S8 are kept off. Accordingly, similarly to the bD mode in power converter 50, DC power supply 10a is brought into the state disconnected from electric power line 20, and output voltage VH becomes equivalent to voltage Vb of DC power supply 10b (VH=Vb). As described above, Vb>Va is a necessary condition for applying the bD mode.

In this way, also in power converter 50# according to the third embodiment, the control configurations shown in FIGS. 38 and 39 can be shared among the plurality of operation modes (PB mode, aB mode, bB mode) belonging to the boosting mode in which output voltage VH is controlled to be voltage command value VH*, similarly to power converter 50 described in the first embodiment. Moreover, the PD mode, the aD mode and the bD mode can be achieved as direct connection modes, similarly to power converter 50.

Specifically, by switching power distribution ratio k and the like among the operation modes, it is possible to apply the common control calculation in accordance with FIGS. 38 and 39 to each operation mode. Therefore, it is possible to reduce a control calculation load in control of power converter 50# in which the plurality of operation modes are selectively applied. Furthermore, since duty ratios Da and Db of boost chopper circuits 6 and 7 can be calculated by feedback control of electric currents Ia and Ib, occurred voltage deviation ΔVH can be promptly cancelled as compared to the control of performing calculation by feedback control of output voltage VH.

Alternatively, in the PB mode, it is also possible to subject the output of one of DC power supplies 10a and 10b to control (voltage control) so as to compensate for voltage deviation ΔVH of output voltage VH (ΔVH=VH*−VH), and to subject the output of the other one of DC power supplies 10a and 10b to control (current control) so as to compensate for the current deviation between electric currents Ia and Ib, as described in PTD 3.

In the PB mode in power converter 50#, the electric current cancellation effect does not occur as in the PB mode in power converter 50, converter loss Plcv in the PB mode is likely to increase more than in power converter 50, particularly when load power is large.

Also in power supply system 5# according to the third embodiment, selection of operation mode is controlled by the configuration shown in FIG. 18, similarly to the first embodiment.

Figures 47, 48, 49:
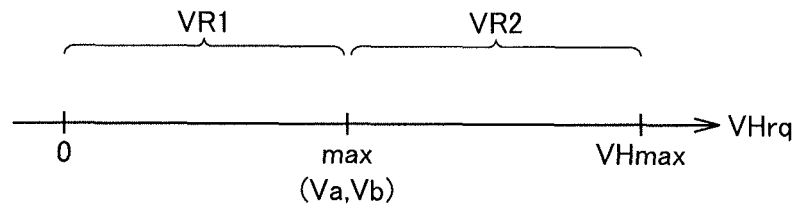
FIG. 47 is a conceptual view for describing the definition of voltage ranges of a load request voltage in the power supply system according to the third embodiment.
FIG. 48 is a table for describing selection of operation mode in each voltage range in the power supply system according to the third embodiment.
FIG. 49 is a table showing modification of operation mode selection performed by the operation mode modification unit in each voltage range in the power supply system according to the third embodiment.

FIG. 47 shows the definition of voltage ranges VR1 and VR2 of load request voltage VHrq in power supply system 5#.

Referring to FIG. 47, since there is no series mode (SD mode and SB mode) in power supply system 5#, it is not necessary to consider (Va+Vb) as the border as in FIG. 16. As a result, load request voltage VHrq is set at either voltage range VR1 (VHrq≤max (Va, Vb) similar to FIG. 16 or VR2 (max (Va, Vb)<VHreq≤VHmax).

FIG. 48 is a table for describing selection of operation mode in each voltage range.

Referring to FIG. 48, also in power converter 50#, output voltage VH cannot be controlled to be a voltage lower than max (Va, Vb), similarly to power converter 50. Thus, when load request voltage VHrq is in voltage range VR1, it is not possible to match output voltage VH with load request voltage VHrq.

Therefore, selection of operation mode in voltage range VR1 is similar to that of the first embodiment. That is, the aD mode, the bD mode and the PD mode are selected as "an applicable operation mode group." That is, when Va>Vb holds, only the aD mode is applicable, while the bD mode and the PD mode are not applicable. Similarly, when Vb>Va holds, only the bD mode is applicable, while the aD mode and the PD mode are not applicable. In this way, if the voltage difference between DC power supplies 10a and 10b is large, there is no choice to select the efficiency priority mode, and the aD mode or the bD mode is designated by mode selection instructing signal MD*.

On the other hand, in the case where the voltage difference between Va and Vb is small so that it can be regarded that Va=Vb holds, operation mode control unit 150 selects an operation mode from among the aD mode, the bD mode and the PD mode included in the applicable operation mode group. Basically, when supplying identical total electric power PH from DC power supplies 10a and 10b by the direct connection mode, converter loss Plcv in power converter 50# is minimized in the PD mode because of the effect of distribution of electric currents. Therefore, the PD mode is selected as the efficiency priority mode when Va=Vb holds in voltage range VR1.

In voltage range VR2 (VHrq>max (Va, Vb)), boosting by means of power converter 50# is necessary. Therefore, the aB mode, the bB mode and the PB mode belonging to the boosting mode are selected as the applicable operation mode group. On the other hand, the aD mode, the bD mode and the PD mode are not applicable.

When applying the operation modes belonging to the boosting mode, it is possible to match output voltage VH with load request voltage VHrq by setting VH* at VHrq. Therefore, it is not necessary to compare load loss Plld among the aB mode, the bB mode and the PB mode. Therefore, operation mode selection unit 160 can execute selection of the efficiency priority mode depending on the operating condition of load 30 in accordance with the comparison of converter loss Plcv in power converter 50#. For example, by configuring converter loss estimation units 162 to 164 in accordance with the characteristics of power converter 50# in the configuration of FIG. 19, loss comparison unit 168 can compare estimated values of converter losses Plcv calculated by converter loss estimation units 162 to 164, respectively.

In each of voltage ranges VR1 and VR2, further taking the power supply losses in DC power supplies 10a and 10b into consideration, the sum of converter loss Plcv and the power supply losses can also be compared among the operation modes.

FIG. 49 shows a list of modification of operation mode in each voltage range in power supply system 5#.

Referring to FIG. 49, in voltage range VR1, the aD mode, the bD mode or the PD mode is selected as the efficiency priority mode in accordance with the relation between voltages Va and Vb as described above, similarly to power supply system 5. In these efficiency priority modes, however, even when SOC and/or output power reach/reaches the power supply restriction values in either of the DC power supplies, that DC power supply cannot be protected. Therefore, if SOC and/or output power reach/reaches the power supply restriction values in either of the DC power supplies, operation mode modification unit 170 generates mode selection instructing signal MD* so as to select the PB mode. On this occasion, voltage command value VH* is set to be at least higher than max (Va, Vb) as described above.

In voltage range VR2, the efficiency priority mode is selected in accordance with evaluation of total loss Ptl. Then, if SOC and/or the output power of DC power supply 10a reach/reaches the power supply restriction values when the aB mode has been selected, or if SOC and/or the output power of DC power supply 10b reach/reaches the power supply restriction values when the bB mode has been selected, operation mode modification unit 170 generates mode selection instructing signal MD* so as to select the PB mode.

In this way, also in power supply system 5# according to the third embodiment, the operation mode is basically selected such that total loss Ptl is minimized mainly depending on the operating condition of load 30, and if SOC and/or the output power of a DC power supply reach/reaches the restriction values, the operation mode can be modified so as to avoid further charging/discharging of that DC power supply. As a result, the operation mode in power converter 50# can be appropriately selected so as to simultaneously achieve improvement in overall efficiency of the system and protection of each DC power supply from overcharge and overdischarge.

Although the present embodiments have illustrated power converters 50 and 50# executing DC/DC conversion between two DC power supplies 10a, 10b and common electric power line 20, it is also possible to control operation mode selection similarly in a configuration in which three or more DC power supplies are provided. For example, power converter 50# can be extended such that boost chopper circuits are provided in parallel corresponding to respective n DC power supplies (n≥3), respectively. Particularly as to the control configuration (FIGS. 38 and 39) described in the second embodiment, it is possible to set the power distribution ratio among n DC power supplies (n≥3), and to execute restriction of power command values equivalent to that obtained by limiter 260 (FIG. 39) for (n−1) DC power supplies. Power protection for the remaining one of the DC power supplies at this time will be indirectly guaranteed by restriction of total electric power command value PH* imposed by limiter 230 (FIG. 39) and a limiter (not shown) for load power. With the configuration of power converter 50#, as to converters arranged in parallel, it is also possible to apply not only the boost choppers as illustrated but also a boost/step-down converter to at least one DC power supply instead of the boost choppers.

Furthermore, it is described for confirmation that load 30 may be implemented by any apparatus that can operate with DC voltage VH. That is, although the example in which load 30 is configured to include a traction motor for an electric powered vehicle has been described in the present embodiments, the application of the present invention is not limited to such a case.

It should be understood that the embodiments disclosed herein are illustrative and non-restrictive in every respect. The scope of the present invention is defined by the claims not by the description above, and is intended to include any modification within the meaning and scope equivalent to the terms of the claims.

REFERENCE SIGNS LIST 5, 5# power supply system; 6, 7 boost chopper circuit; 10a, 10b DC power supply; 15 line; 20 electric power line; 21 grounded line; 30 load; 32 inverter; 35 motor-generator; 36 motive power transmission gear; 37 driving wheel; 40 control device; 50, 50# power converter; 101, 102 operating point; 110, 120 active region; 111-113 characteristic line; 150 operation mode control unit; 160 operation mode selection unit; 161, 165 load loss estimation unit; 162-164, 166, 167 converter loss estimation unit; 168 loss comparison unit; 170 operation mode modification unit; 171a, 171b internal resistance estimation unit; 172-174, 176, 177 power supply loss estimation unit; 190 VHrq setting unit; 200 voltage control unit; 210, 304, 314 deviation arithmetic unit; 220, 306, 316 control arithmetic unit; 230, 230, 260, 260 limiter; 240 power distribution unit; 250 circulation power addition unit; 270 subtraction unit; 290 power management unit; 300, 310 current control unit; 302, 312 current command generation unit; 308, 318 addition unit; 350, 351, 360, 361, 370-374 electric current path; 400 PWM control unit; 410 carrier wave generation unit; CH smoothing capacitor; CW, CWa, CWb carrier wave; D1-D8 antiparallel diode; Da, Db Dc duty ratio; Dfba, Dfbb FB control amount; Dffa, Dffb FF control amount; Ia, Ib electric current (DC power supply); Ia*, Ib* current command value; L1, L2 reactor; MD mode selection instructing signal; MD1 mode selection signal; N1-N3 node; PH total electric power; PH* total electric power command value; PHmax, Pamax, Pbmax power upper limit value (discharging); PHmin, Pamin, Pbmin power lower limit value (charging); PL load power; Pa, Pb output power (DC power supply); Plcv converter loss; Plld load loss; Pr circulation power value; Ptl total loss; S1-S8 switching element; SDa, SDb, SDc control pulse signal; SG1-SG8 control signal (switching element); Ta, Tb temperature (DC power supply); VH output voltage; VH* voltage command value (output voltage); VHmax upper limit voltage (output voltage); VHrq load request voltage; VR1-VR3 voltage range; Va, Vb voltage (DC power supply); k power distribution ratio.

The invention claimed is:

1. A power supply system, comprising:
   a load;
   an electric power line connected to said load;
   a plurality of DC power supplies;
   a power converter connected across said plurality of DC power supplies and said electric power line; and
   a control device configured to control an operation of said power converter,
   said power converter configured to include a plurality of switching elements and to operate with one operation mode among a plurality of operation modes being applied, in said plurality of operation modes, power conversion between said plurality of DC power supplies and said electric power line being performed in different manners,
   said control device including
      a request voltage setting unit configured to set a request voltage for an output voltage output by said power converter to said electric power line in accordance with an operating condition of said load,
      an operation mode selection unit configured to select a first operation mode in which a power loss in said power supply system is minimized from an operation mode group in which said power converter can output an output voltage more than or equal to said request voltage among said plurality of operation modes, and
      an operation mode modification unit configured to, when at least one of SOC and input/output power of any DC power supply among said plurality of DC power supplies has reached a restriction value, select, from said operation mode group, a second operation mode in which power distribution between said plurality of DC power supplies can be controlled, in replacement of said first operation mode.

2. The power supply system according to claim 1, wherein said first operation mode when said operation mode modification unit has selected said second operation mode is an operation mode in which the power distribution between said plurality of DC power supplies cannot be controlled freely.

3. The power supply system according to claim 1, wherein said first operation mode includes an operation mode, among said plurality of operation modes, in which on/off of said plurality of switching elements is controlled to execute DC voltage conversion between one DC power supply of said plurality of DC power supplies and said electric power line and to maintain the remaining DC power supply in a condition electrically disconnected from said electric power line, and
said second operation mode includes an operation mode, among said plurality of operation modes, in which on/off of said plurality of switching elements is controlled to execute DC voltage conversion in parallel between at least two DC power supplies among said plurality of DC power supplies and said electric power line.

4. The power supply system according to claim 1, wherein said plurality of DC power supplies are formed by first and second DC power supplies,
said electric power line includes a first electric power line on a higher voltage side and a second electric power line on a lower voltage side,
said plurality of switching elements include
   a first switching element electrically connected across a first node and said first electric power line,
   a second switching element electrically connected across a second node and said first node,
   a third switching element electrically connected across a third node electrically connected to a negative electrode terminal of said second DC power supply and said second node, and
   a fourth switching element electrically connected across said third node and said second electric power line electrically connected to a negative electrode terminal of said first DC power supply, and
said power converter further includes
   a first reactor electrically connected in series to said first DC power supply across said second node and said second electric power line, and
   a second reactor electrically connected in series to said second DC power supply across said first node and said third node.

5. The power supply system according to claim 4, wherein said plurality of operation modes include
   a first mode of executing DC voltage conversion in parallel between said first and second DC power supplies and said first and second electric power lines by controlling on/off of said first to fourth switching elements, and
   a second mode of executing DC voltage conversion between said first and second DC power supplies connected in series and said first and second electric power lines by keeping said third switching element on and controlling on/off of said first, second and fourth switching elements, and
when said request voltage is higher than the sum of output voltages of said first and second DC power supplies, said first operation mode is said second mode, and said second operation mode is said first mode.

6. The power supply system according to claim 5, wherein said control device
   calculates a first duty ratio for controlling output from said first DC power supply and a second duty ratio for controlling output from said second DC power supply, and
   generates signals for controlling on/off of said first to fourth switching elements based on first and second control pulse signals respectively obtained in accordance with pulse width modulations by comparing a first carrier wave with said first duty ratio and comparing a second carrier wave with said second duty ratio, and a phase difference between said first carrier wave and said second carrier wave is controlled to be variable in accordance with said first and second duty ratios such that transition timing of a pulse of said first control pulse signal coincides with transition timing of a pulse of said second control pulse signal.

7. The power supply system according to claim 5, wherein
said power supply system is mounted on a hybrid vehicle including an engine and a motor for producing vehicle driving force, said hybrid vehicle is configured to allow a user to select a predetermined driving mode of giving first priority to use efficiency of accumulated energies in said plurality of DC power supplies, said load includes said motor electrically connected to said electric power line, and when input/output power of any one of said plurality of DC power supplies reaches a restriction value under a condition in which said second mode has been selected as said first operation mode by said operation mode selection unit and said predetermined driving mode has been selected, said control device maintains selection of said first operation mode and restricts output of said motor such that the input/output power of each of said DC power supplies becomes smaller than said restriction value.

8. The power supply system according to claim 5, wherein said control device calculates overall input/output power from said first and second DC power supplies as a whole to the electric power line based on a deviation between a voltage detection value of said electric power line and a voltage command value, switches a power distribution ratio between said first and second DC power supplies in accordance with a change of said operation mode, and sets a first power command value for said first DC power supply and a second power command value for said second DC power supply in accordance with said overall input/output power and said power distribution ratio, calculates a first duty ratio for controlling output from said first DC power supply based on a deviation of a current detection value of said first DC power supply relative to a first current command value obtained by dividing said first power command value by the output voltage of said first DC power supply, calculates a second duty ratio for controlling output from said second DC power supply based on a deviation of a current detection value of said second DC power supply relative to a second current command value obtained by dividing said second power command value by the output voltage of said second DC power supply, and generates signals for controlling on/off of said first to fourth switching elements based on first and second control pulse signals respectively obtained in accordance with pulse width modulations by comparing a first carrier wave with said first duty ratio and comparing a second carrier wave with said second duty ratio.

9. The power supply system according to claim 8, wherein said power distribution ratio is set to be variable in accordance with operating conditions of said first and second DC power supplies in said first mode, and is fixed at a ratio based on voltages of said first and second DC power supplies in said second mode.

10. The power supply system according to claim 8, wherein said control device in said first mode, calculates the first and second duty ratios for said first and second DC power supplies by current feedback control based on said first current command value, in said second mode, calculates said first and second duty ratios by executing current feedback control based on said second current command value in one of said first and second DC power supplies, while in the other one of said first and second DC power supplies, executing feedforward control based on the output voltage of the DC power supply and said voltage command value, without executing said current feedback control, and in each of said first and second modes, generates said signals for controlling on/off of said first to fourth switching elements based on a first control pulse signal obtained by comparing said first duty ratio with said first carrier wave and a second control pulse signal obtained by comparing said second duty ratio with said second carrier wave, and in each of said first and second modes, a phase difference between said first carrier wave and said second carrier wave is controlled to be variable in accordance with said first and second duty ratios having been calculated such that transition timing of a pulse of said first control pulse signal coincides with transition timing of a pulse of said second control pulse signal.

11. The power supply system according to claim 8, wherein said control device further sets a circulation power value for charging/discharging between said first DC power supply and said second DC power supply in said first mode, and restricts said first power command value to fall within a power range set depending on the operating condition of said first DC power supply in accordance with said overall input/output power and said power distribution ratio as well as said circulation power value, and sets said second power command value by subtracting said first power command value from said overall input/output power.

12. The power supply system according to claim 4, wherein said plurality of operation modes include a first mode of executing DC voltage conversion in parallel between said first and second DC power supplies and said first and second electric power lines by controlling on/off of said first to fourth switching elements, a second mode of executing DC voltage conversion between said first and second DC power supplies connected in series and said first and second electric power lines by keeping said third switching element on and controlling on/off of said first, second and fourth switching elements, and a third mode of maintaining the state where said first and second DC power supplies are connected in series to said first and second electric power lines by keeping said first to fourth switching elements on/off, and when said request voltage is less than or equal to the sum of output voltages of said first and second DC power supplies, said first operation mode is said third mode, and said second operation mode is said first mode.

13. The power supply system according to claim 12, wherein said plurality of operation modes further include a fourth mode of executing DC voltage conversion between one of said first and second DC power supplies and said electric power lines by controlling on/off of said first to fourth switching elements, and when said request voltage is higher than a higher one of output voltages of said first and second DC power supplies, said first operation mode is said fourth mode, and said second operation mode is said first mode.

14. The power supply system according to claim 13, wherein said plurality of operation modes further include a fifth mode of maintaining the state where one of said first and second DC power supplies is electrically connected to said first and second electric power lines and the other one of said first and second DC power supplies is electrically disconnected from said first and second electric power lines by keeping said first to fourth switching elements on/off, and a sixth mode of maintaining the state where said first and second DC power supplies are connected in parallel to said first and second electric power lines by keeping said first to fourth switching elements on/off, and when said request voltage is lower than a higher one of the output voltages of said first and second DC power supplies, said first operation mode is one of said fifth and sixth modes, and said second operation mode is said first mode.

15. The power supply system according to claim 12, wherein said power supply system is mounted on a hybrid vehicle including an engine and a motor for producing vehicle driving force, said hybrid vehicle is configured to allow a user to select a predetermined driving mode of giving first priority to use efficiency of accumulated energies in said plurality of DC power supplies, said load includes said motor electrically connected to said electric power line, and when input/output power of any one of said plurality of DC power supplies reaches a restriction value under a condition in which said third mode has been selected as said first operation mode by said operation mode selection unit and said predetermined driving mode has been selected, said control device maintains selection of said first operation mode and restricts output of said motor such that the input/output power of each of said DC power supplies becomes smaller than said restriction value.

16. The power supply system according to claim 1, wherein said operation mode modification unit is configured to, when said SOC and said input/output power of each of said DC power supplies become smaller than said restriction value during selection of said second operation mode, calculate an estimated value of the input/output power of each of said DC power supplies if the first operation mode is applied instead of said second operation mode, and to instruct return to said first operation mode when said estimated value of each of said DC power supplies has not reached said restriction value, and to maintain selection of said second operation mode when said estimated value has reached said restriction value in any one of said plurality of DC power supplies.

17. The power supply system according to claim 1, wherein, in the case where said second operation mode has been selected by said operation mode modification unit when the SOC of any one of said plurality of DC power supplies has reached said restriction value, said control device controls said power converter to charge the DC power supply by setting the sum of the output power from other DC power supplies except the DC power supply whose SOC has reached said restriction value to be higher than request power of said load.

* * * * *